(12) United States Patent
Kawazu et al.

(10) Patent No.: US 11,686,630 B2
(45) Date of Patent: Jun. 27, 2023

(54) IMAGING DEVICE AND CALIBRATION METHOD

(71) Applicant: Sony Semiconductor Solutions Corporation, Kanagawa (JP)

(72) Inventors: Naoki Kawazu, Kanagawa (JP); Keita Sasaki, Kanagawa (JP); Takumi Oka, Kanagawa (JP); Mohammad Munirul Haque, San Jose, CA (US); Nobuhiko Fujimori, Kumamoto (JP); Makoto Satou, Kanagawa (JP); Masahiro Baba, Tokyo (JP); Satoshi Yamamoto, Kanagawa (JP); Yuichi Motohashi, Tokyo (JP); Atsushi Suzuki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 263 days.

(21) Appl. No.: 16/964,928

(22) PCT Filed: Jan. 23, 2019

(86) PCT No.: PCT/JP2019/001986
§ 371 (c)(1),
(2) Date: Jul. 24, 2020

(87) PCT Pub. No.: WO2019/151065
PCT Pub. Date: Aug. 8, 2019

(65) Prior Publication Data
US 2021/0041305 A1 Feb. 11, 2021

(30) Foreign Application Priority Data
Jan. 31, 2018 (JP) .................. 2018-015381

(51) Int. Cl.
*G01K 15/00* (2006.01)
*G06K 7/01* (2006.01)
(Continued)

(52) U.S. Cl.
CPC ............. *G01K 15/005* (2013.01); *G06K 7/01* (2013.01); *H04N 25/75* (2023.01); *H04N 25/79* (2023.01)

(58) Field of Classification Search
CPC .... G01K 15/005; G01K 15/00; G06K 7/0095; G06K 7/01; H04N 5/379; H04N 5/369;
(Continued)

(56) References Cited

U.S. PATENT DOCUMENTS 8,734,006 B2 * 5/2014 Crafts ................... G01K 7/01
374/170
9,360,381 B2 * 6/2016 Arisaka ............... G01K 15/005
(Continued)

FOREIGN PATENT DOCUMENTS

CN 204332958 U 5/2015
CN 107426512 A 12/2017
(Continued)

OTHER PUBLICATIONS

International Search Report and Written Opinion dated Mar. 29, 2019 in connection with International Application No. PCT/JP2019/001986.

*Primary Examiner* — John R Lee
(74) *Attorney, Agent, or Firm* — Wolf, Greenfield & Sacks, P.C.

(57) ABSTRACT

To obtain an imaging device that can improve temperature detection accuracy. An imaging device of the present disclosure includes a processing unit formed on a first semiconductor substrate and capable of performing predetermined image processing on the basis of image data obtained
(Continued)

by an imaging unit, a temperature sensor formed on the first semiconductor substrate and capable of generating a detection signal according to a temperature, and a first pad electrode formed on the first semiconductor substrate and electrically insulated from a circuit formed on the first semiconductor substrate.

16 Claims, 31 Drawing Sheets

(51) Int. Cl.
  *H04N 5/378* (2011.01)
  *H04N 5/369* (2011.01)
  *H04N 25/75* (2023.01)
  *H04N 25/79* (2023.01)

(58) Field of Classification Search
  CPC ........ H04N 5/378; H04N 25/70; H04N 25/71; H04N 25/75; H04N 25/79
  See application file for complete search history.

(56) References Cited

U.S. PATENT DOCUMENTS

| | | | |
|---|---|---|---|
| 10,352,782 B2* | 7/2019 | Jokinen | G01K 7/01 |
| 10,852,197 B2* | 12/2020 | Geetla | H03K 21/38 |
| 2007/0272873 A1 | 11/2007 | Jadrich | |
| 2012/0182450 A1 | 7/2012 | Sato et al. | |
| 2012/0265473 A1 | 10/2012 | Arisaka et al. | |
| 2014/0036051 A1 | 2/2014 | Saito | |
| 2015/0117486 A1* | 4/2015 | Yang | G01K 7/01 |
| | | | 374/1 |
| 2017/0339360 A1 | 11/2017 | Cho et al. | |
| 2021/0041305 A1* | 2/2021 | Kawazu | H04N 5/378 |
| 2022/0074797 A1* | 3/2022 | Kosaka | H04N 5/378 |
| 2022/0279121 A1* | 9/2022 | Kawazu | H04N 5/232411 |

FOREIGN PATENT DOCUMENTS

| | | |
|---|---|---|
| JP | 2001-298160 A | 10/2001 |
| JP | 2007158664 A | 6/2007 |
| JP | 2007174500 A | 7/2007 |
| JP | 2007202067 A | 8/2007 |
| JP | 2007329655 A | 12/2007 |
| JP | 2011188224 A | 9/2011 |
| JP | 2011259407 A | 12/2011 |
| JP | 2012151664 A | 8/2012 |
| JP | 2012-220437 A | 11/2012 |
| JP | 2012256736 A | 12/2012 |
| JP | 2013175936 A | 9/2013 |
| JP | 2014225737 A | 12/2014 |
| JP | 2016009878 A | 1/2016 |
| JP | 2016009880 A | 1/2016 |
| WO | WO 2011/132393 A1 | 10/2011 |

* cited by examiner

[Fig. 1]
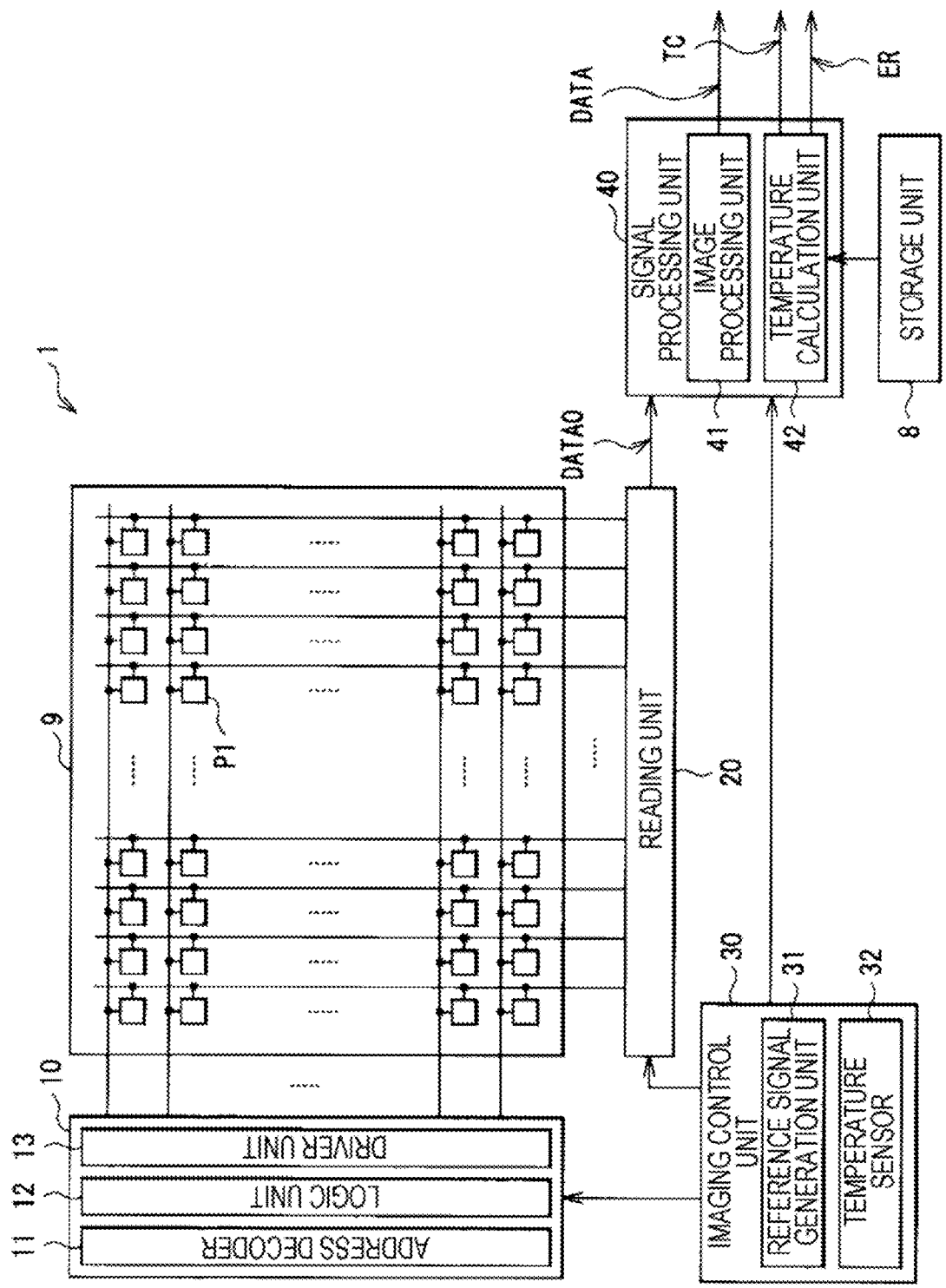

[Fig. 2]
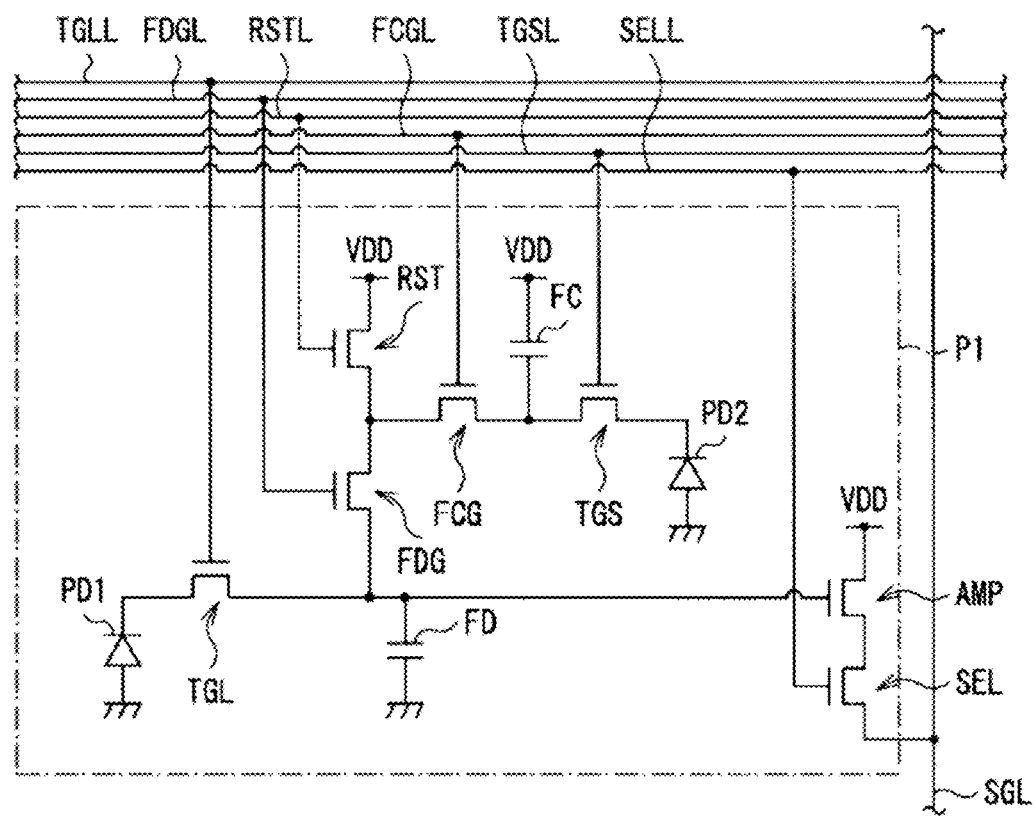

[Fig. 3]
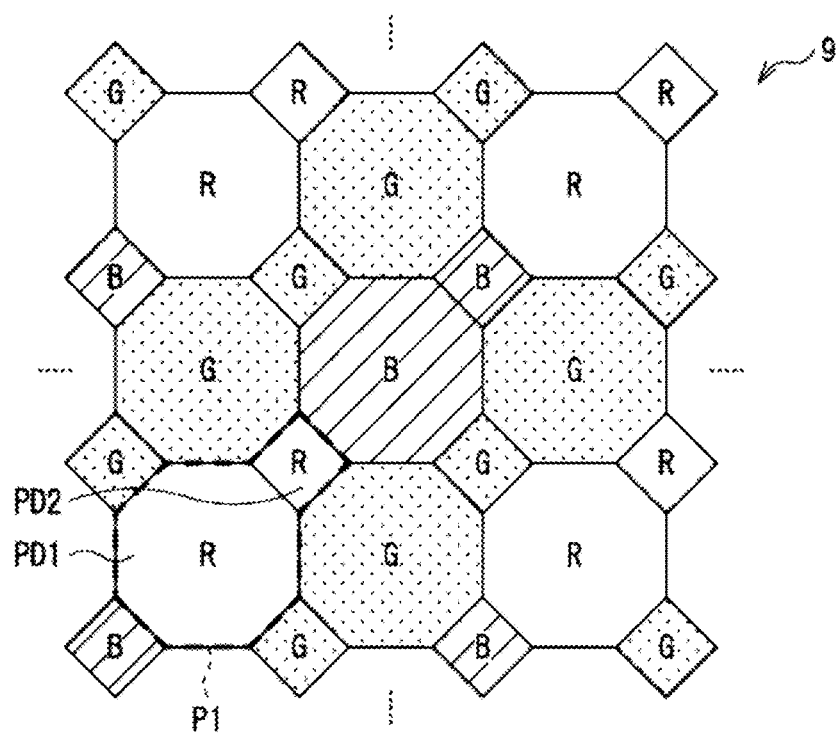

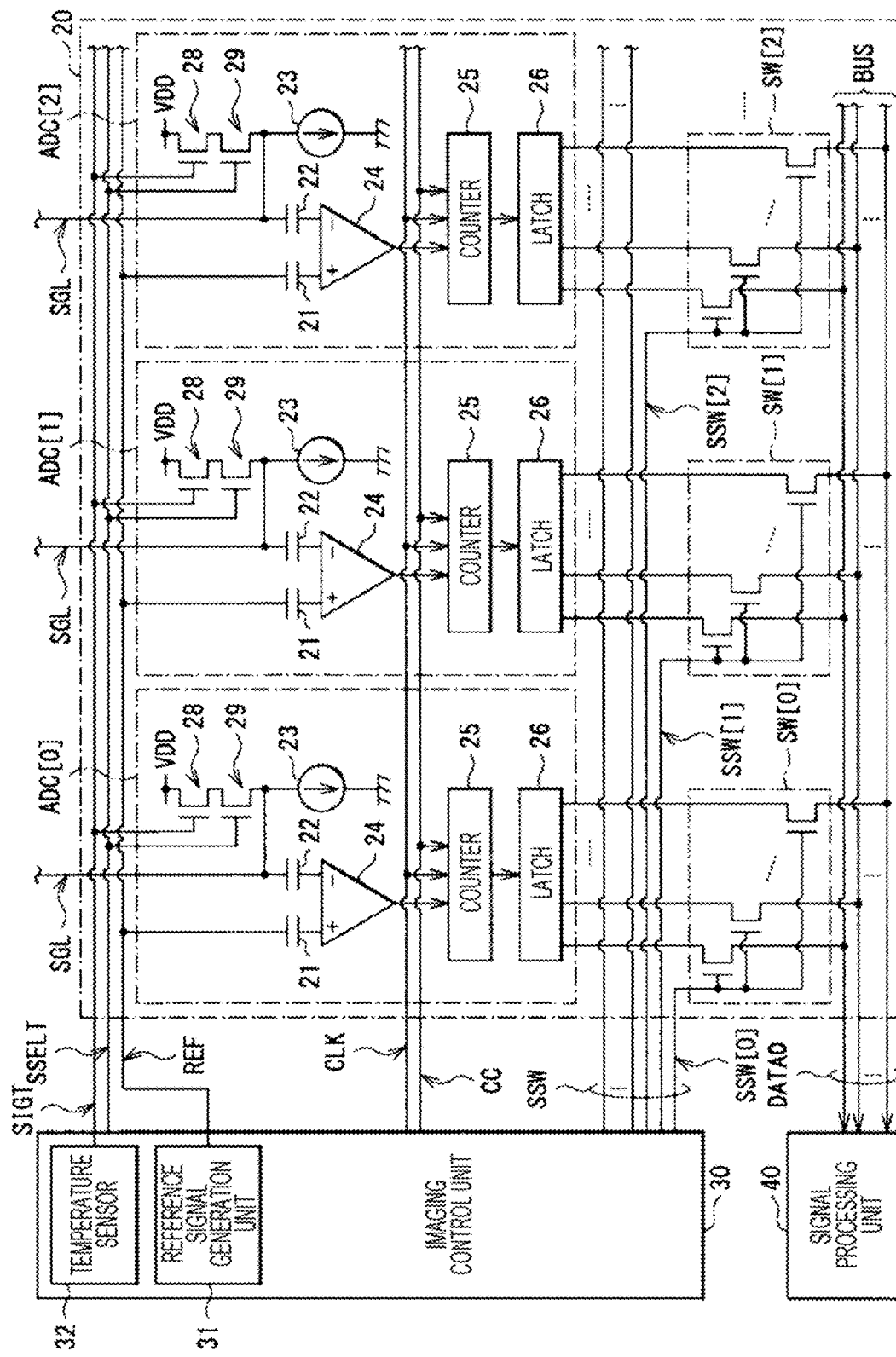
[Fig. 4]

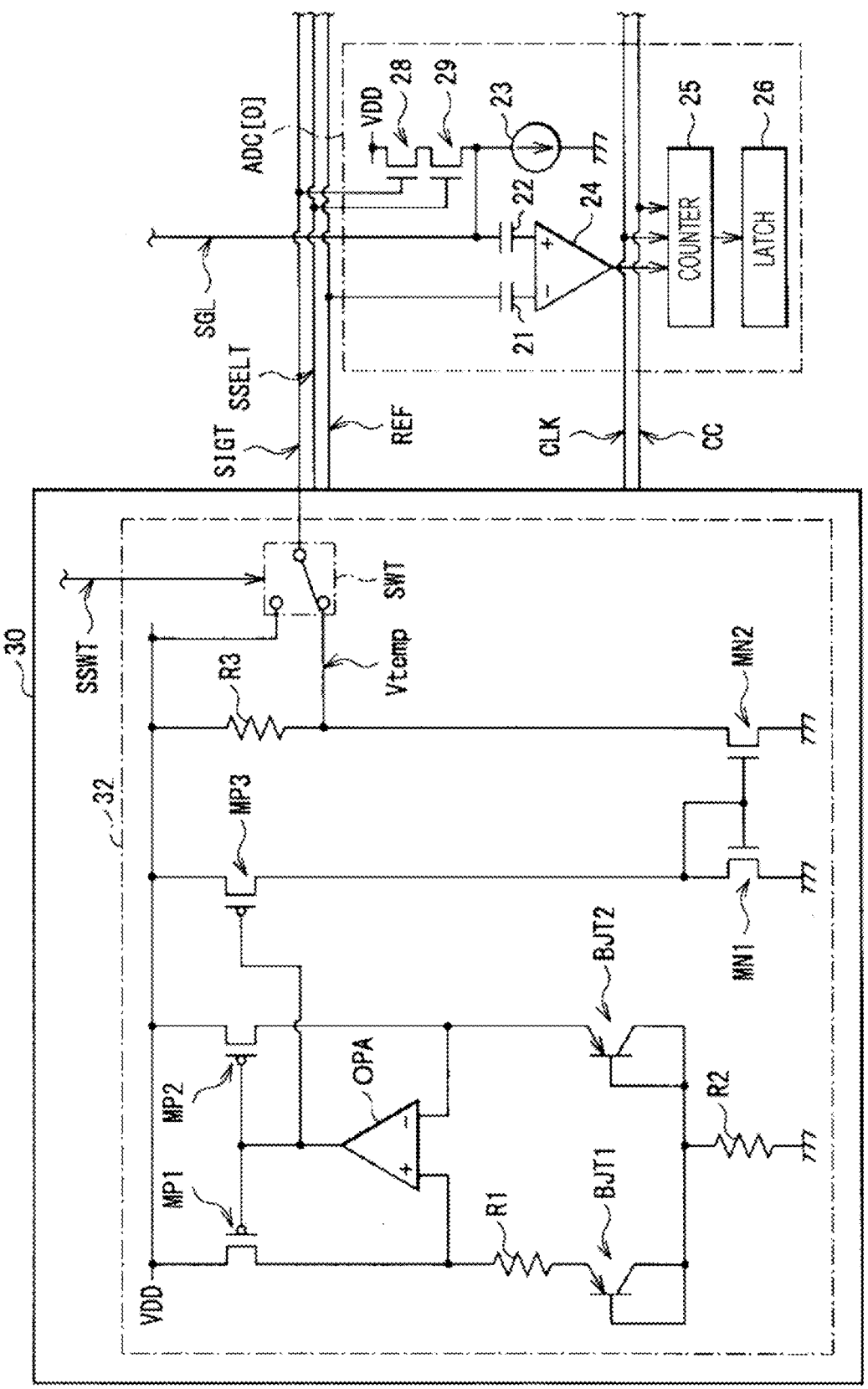
[Fig. 5]

[Fig. 6A]
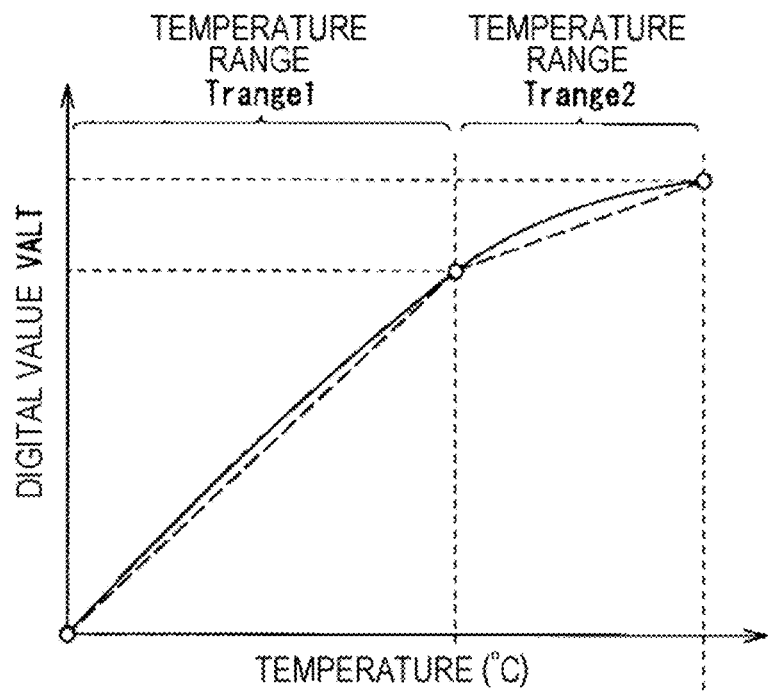
[Fig. 6B]
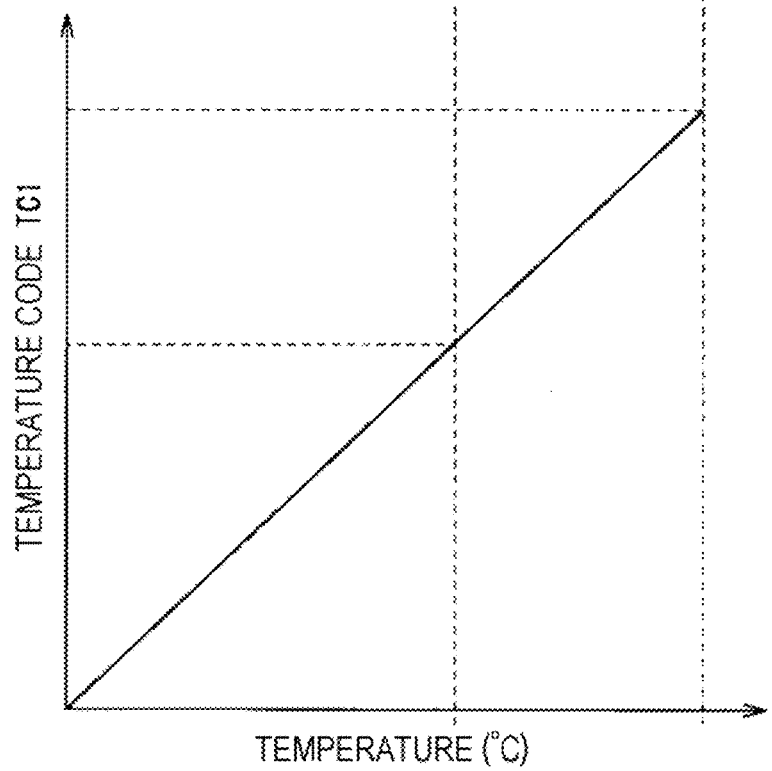

[Fig. 7]
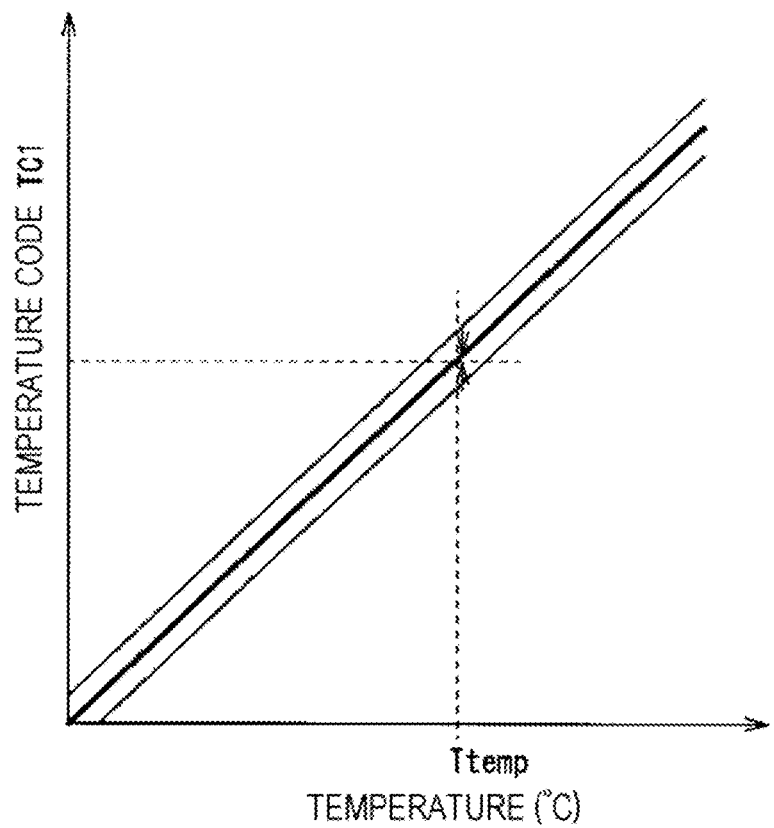
[Fig. 8A]
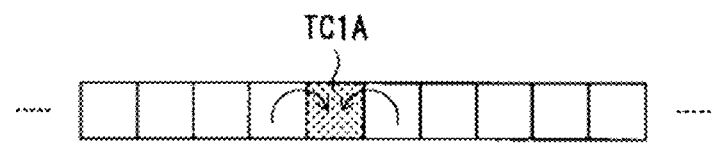
[Fig. 8B]
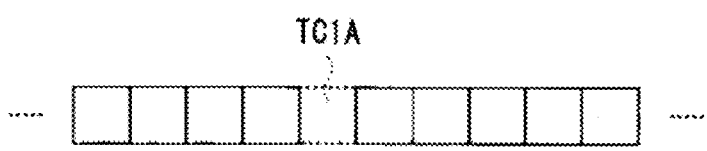

[Fig. 9]
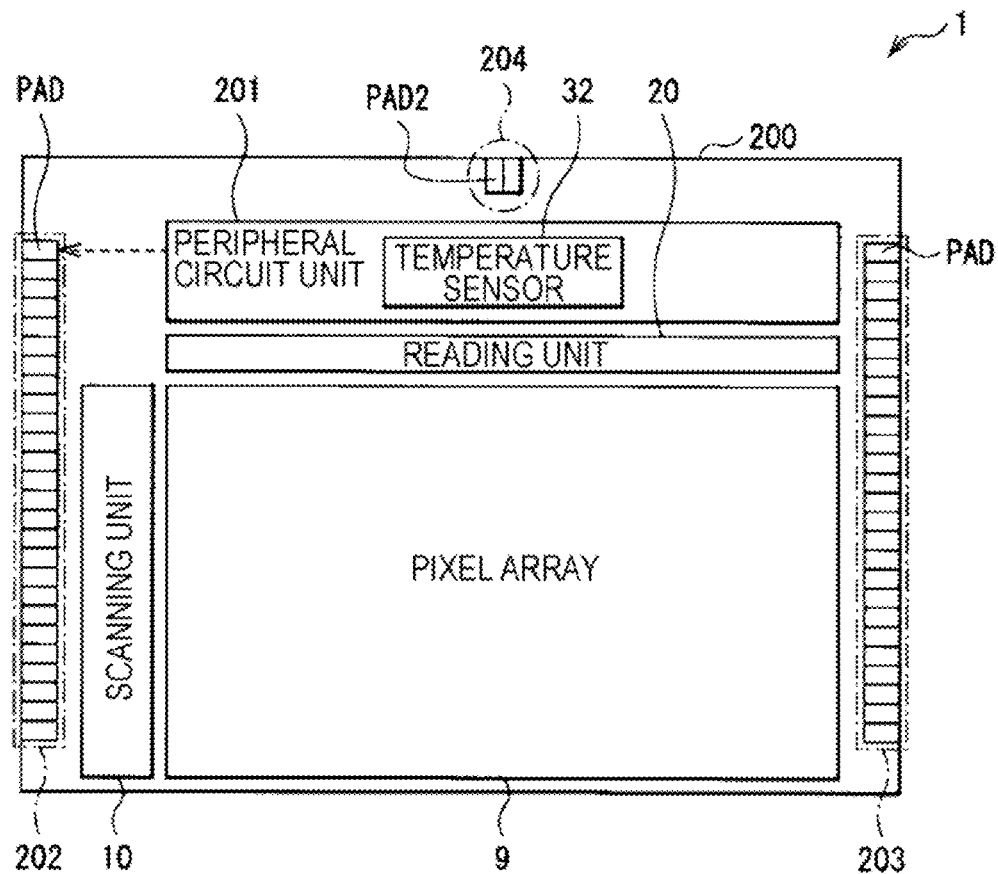
[Fig. 10]
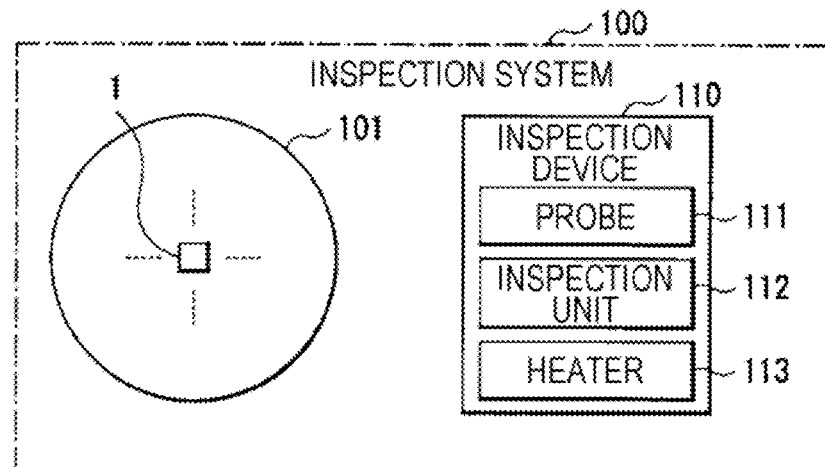

[Fig. 11]
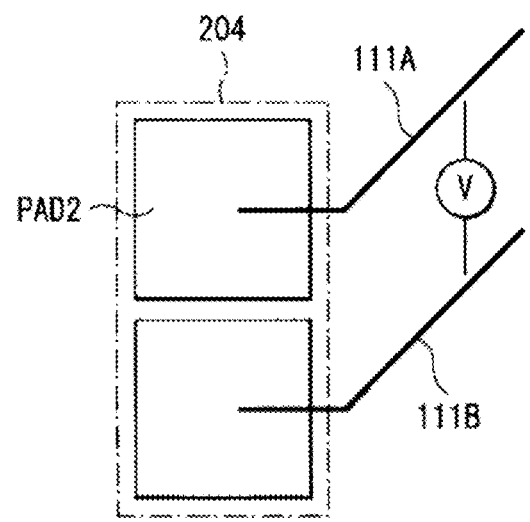
[Fig. 12]
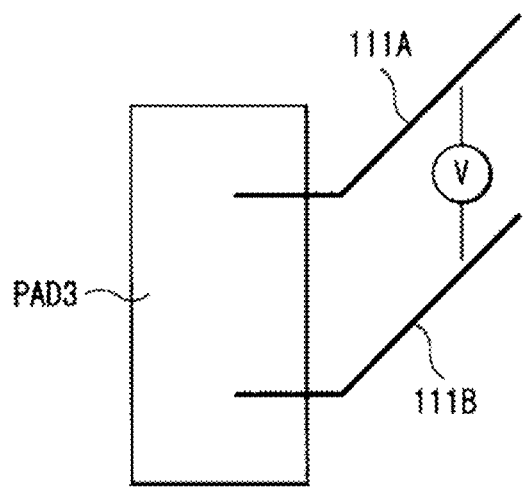

[Fig. 13]
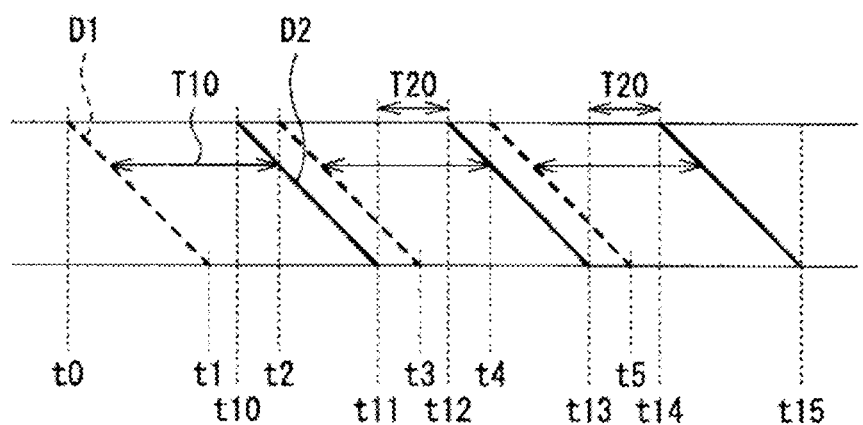

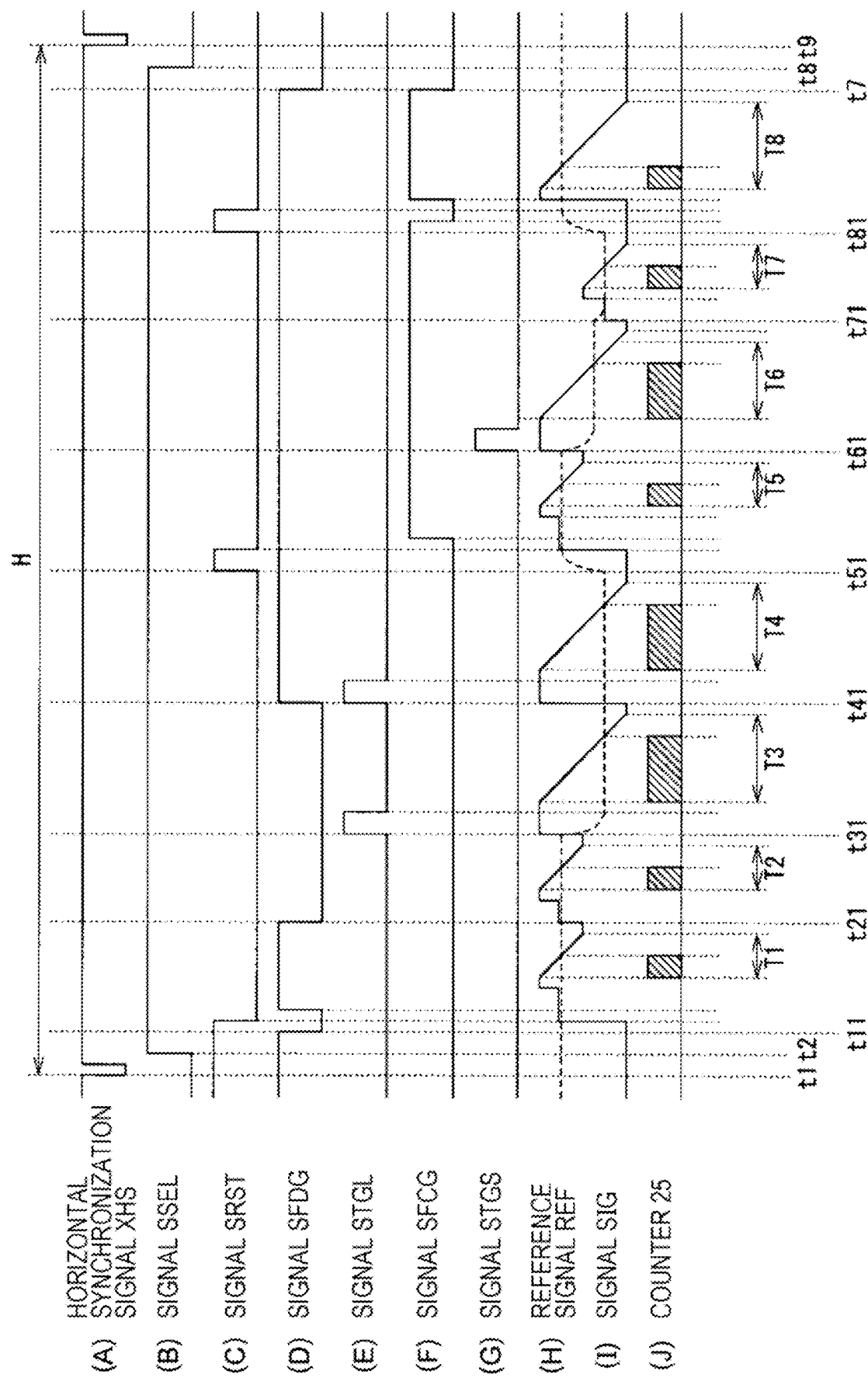
[Fig. 14]

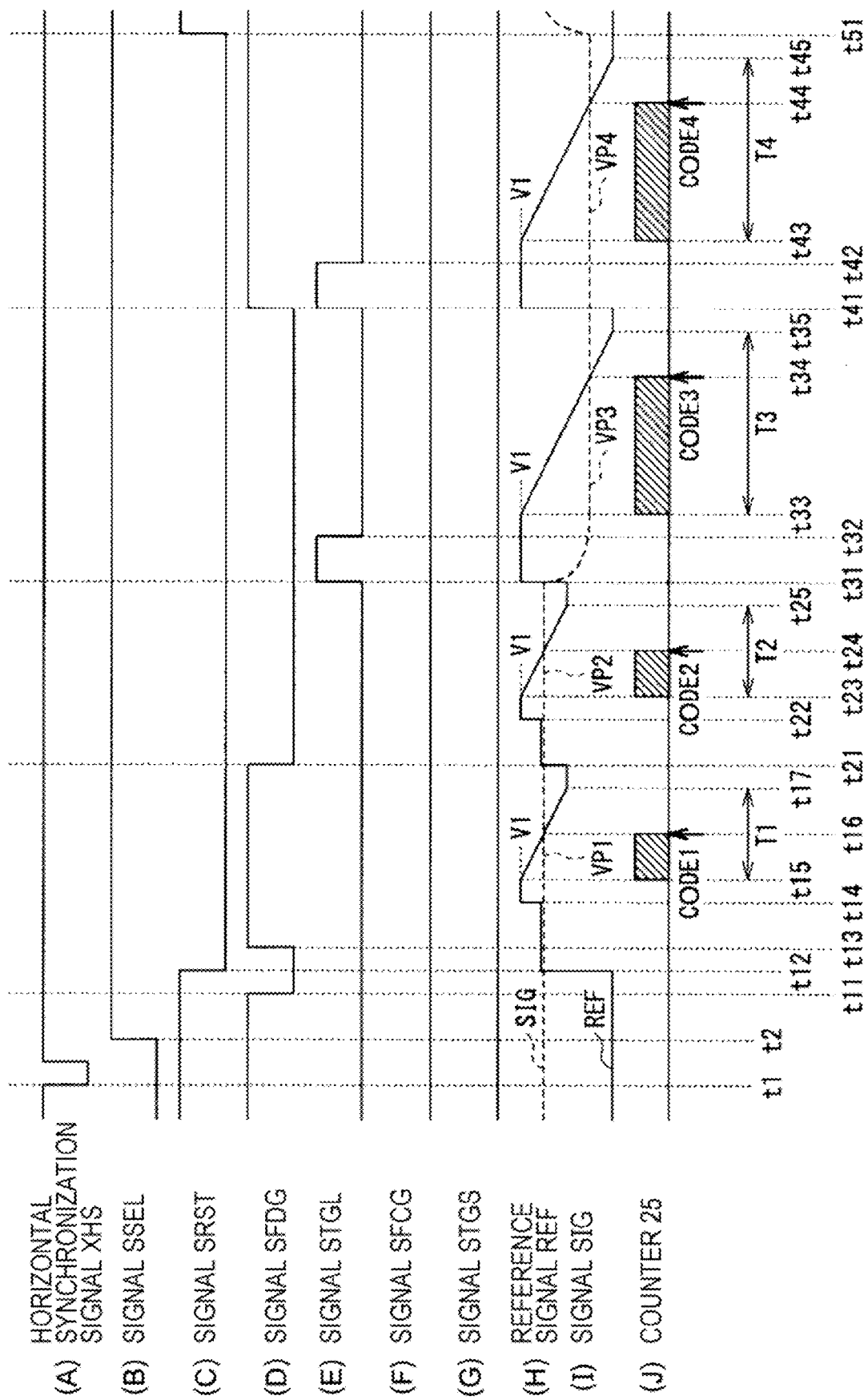

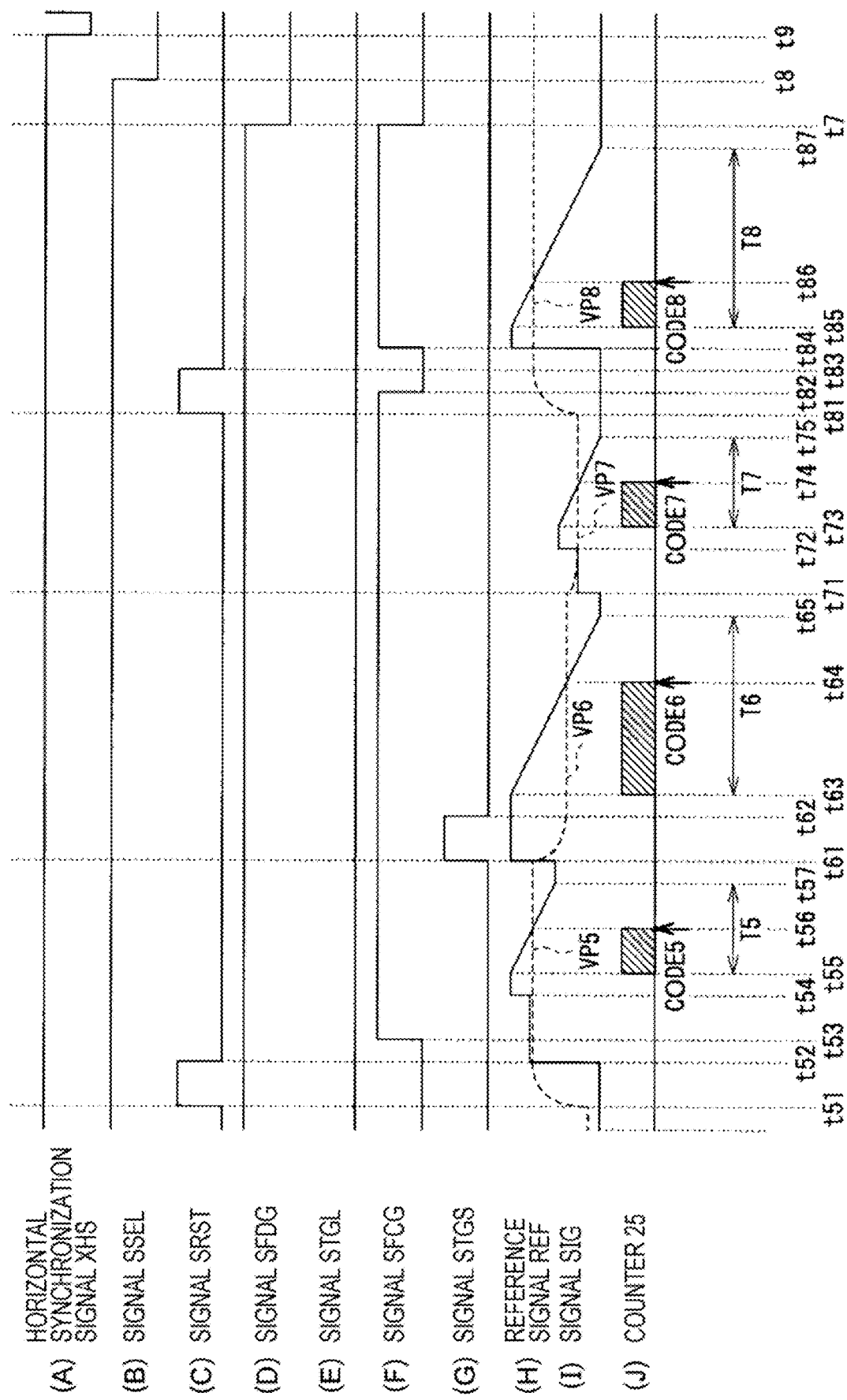

[Fig. 16A]
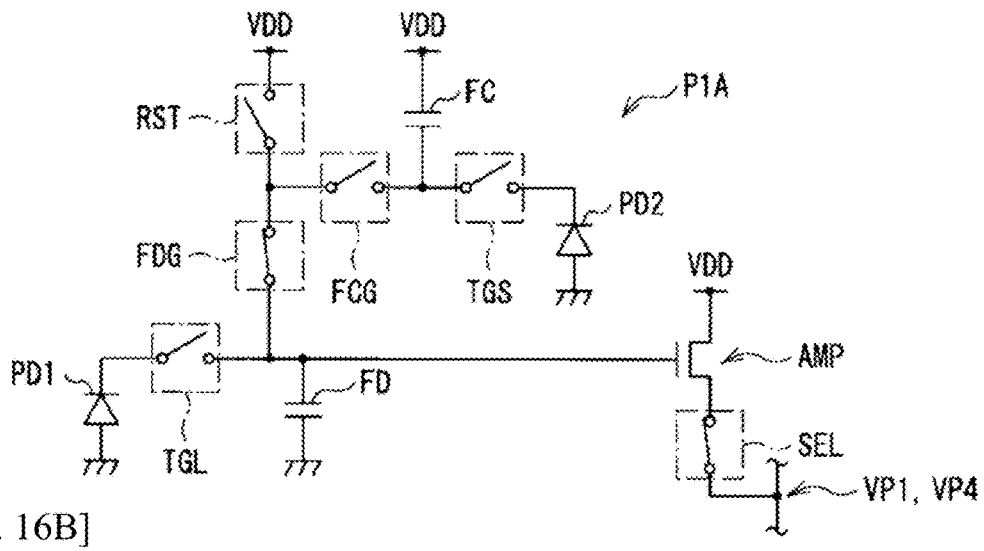
[Fig. 16B]
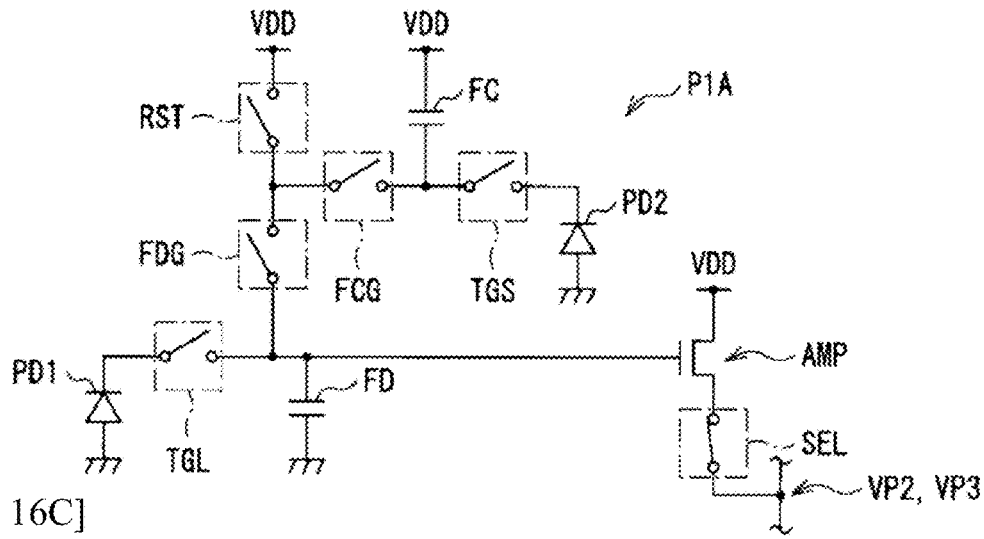
[Fig. 16C]
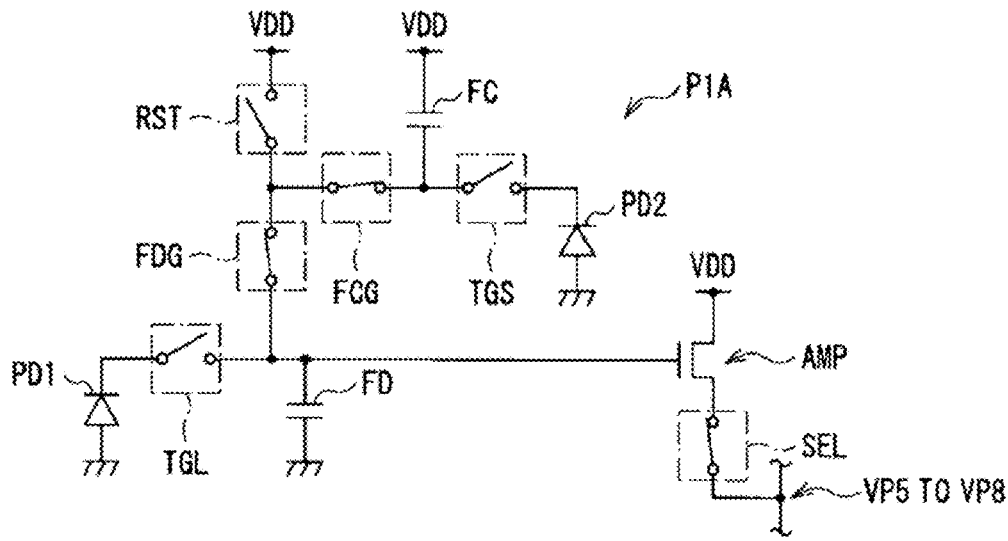

[Fig. 17]
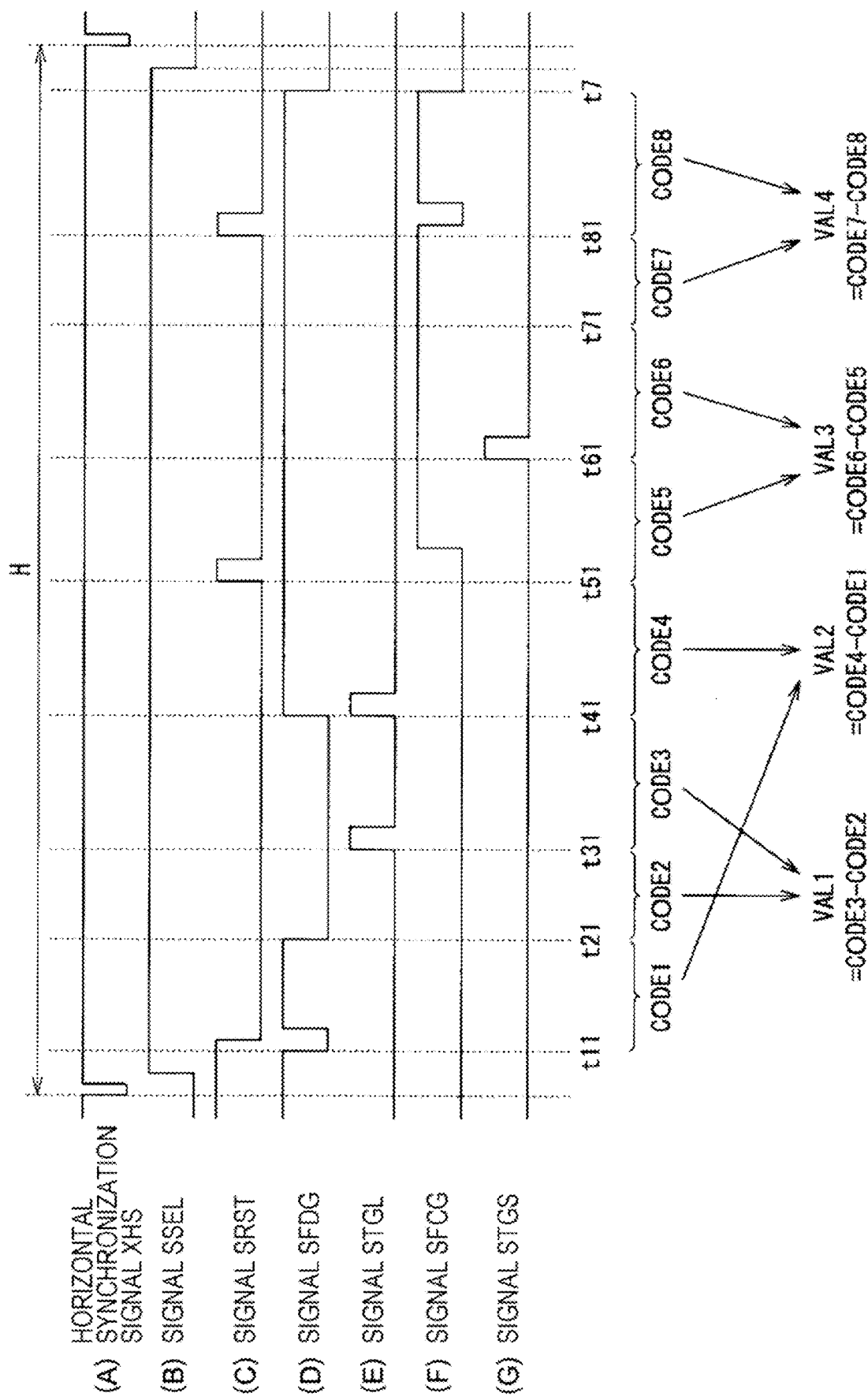

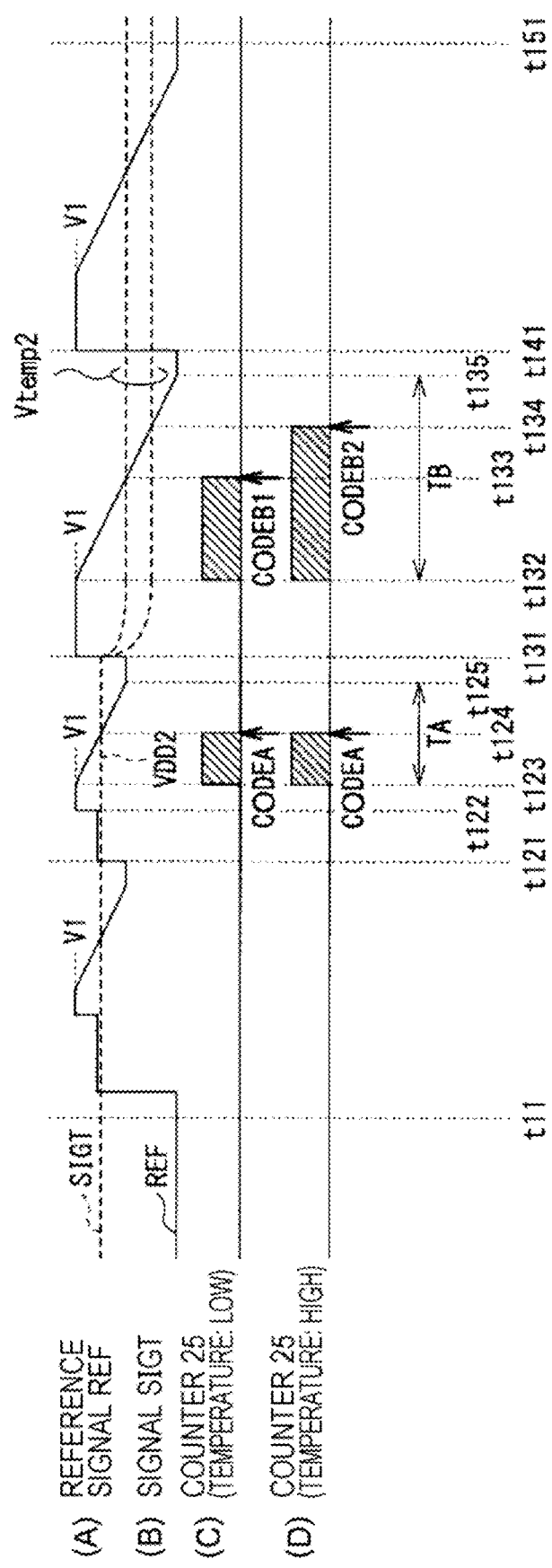

[Fig. 19]
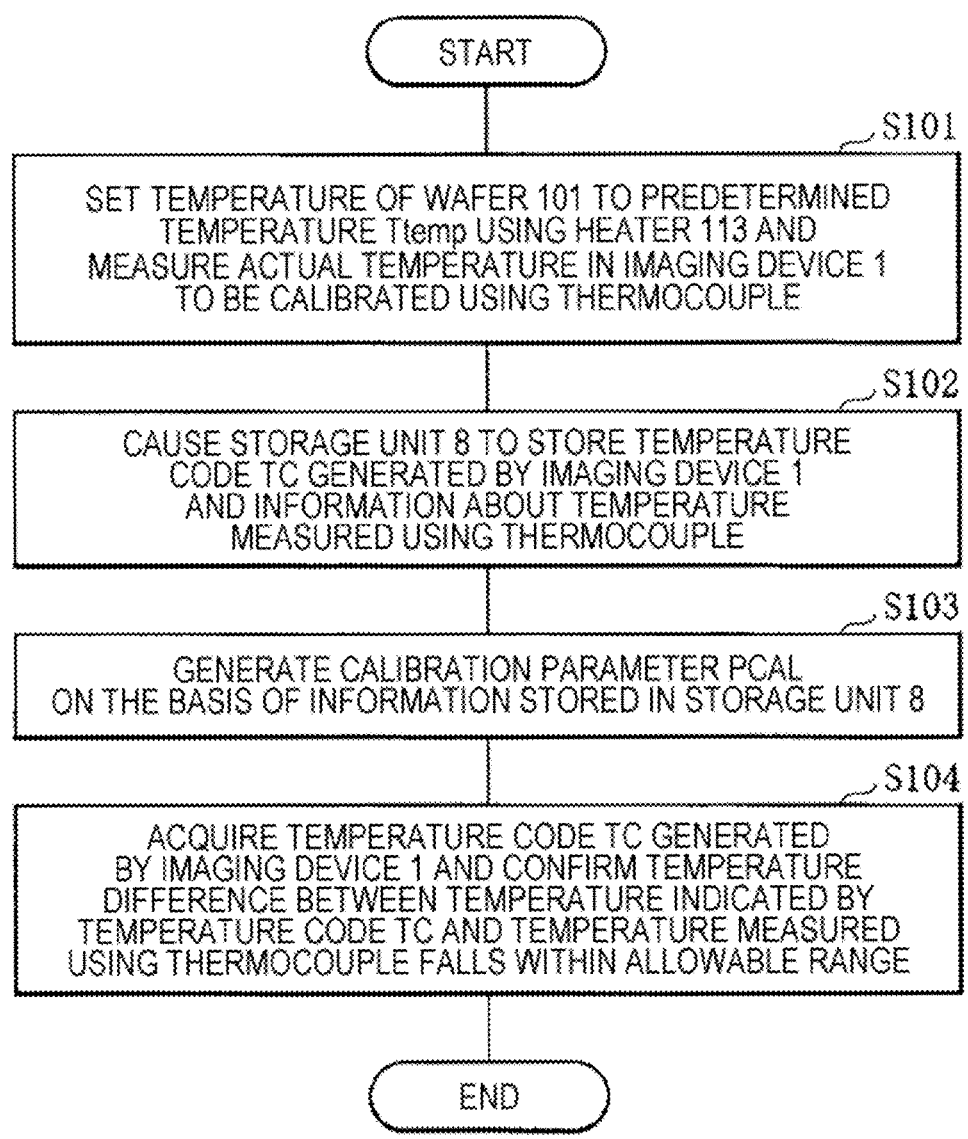

[Fig. 20]
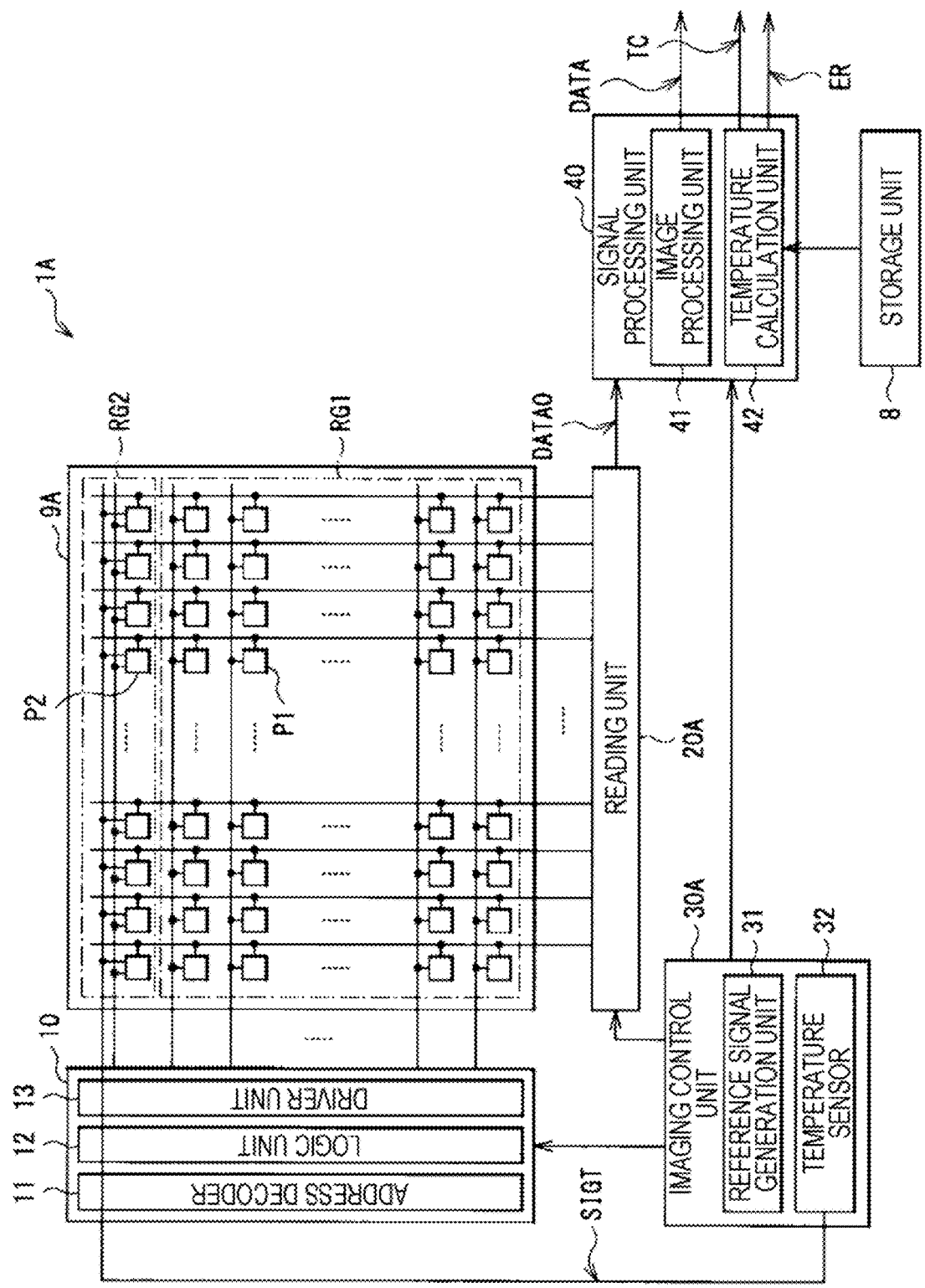

[Fig. 21]
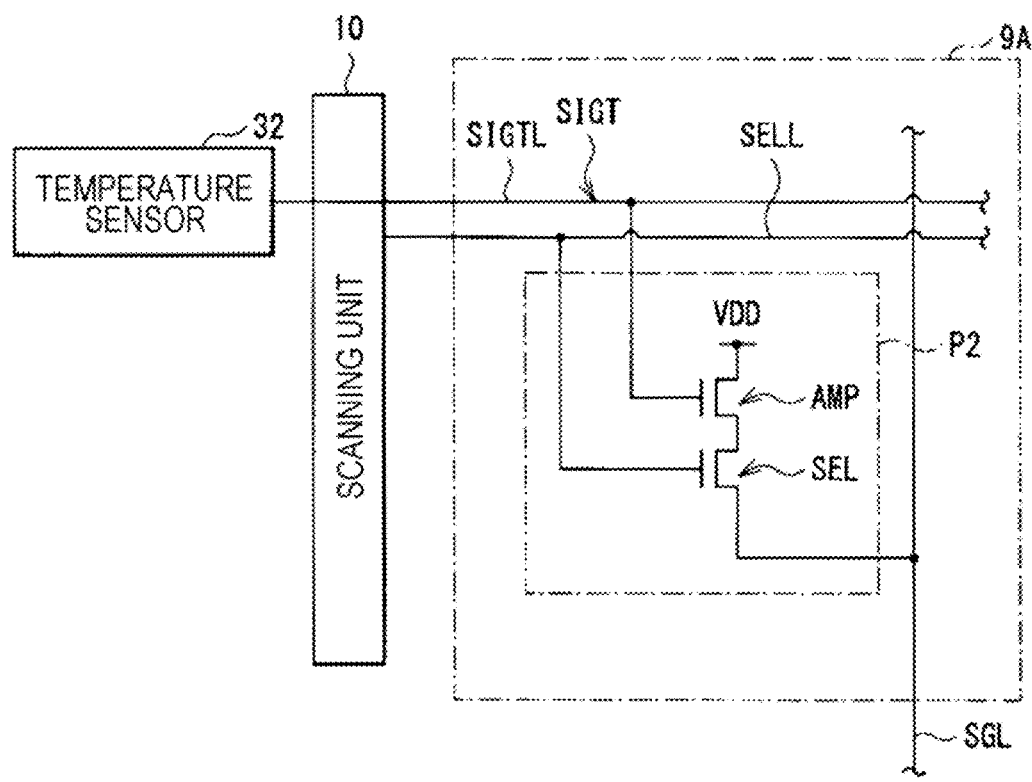

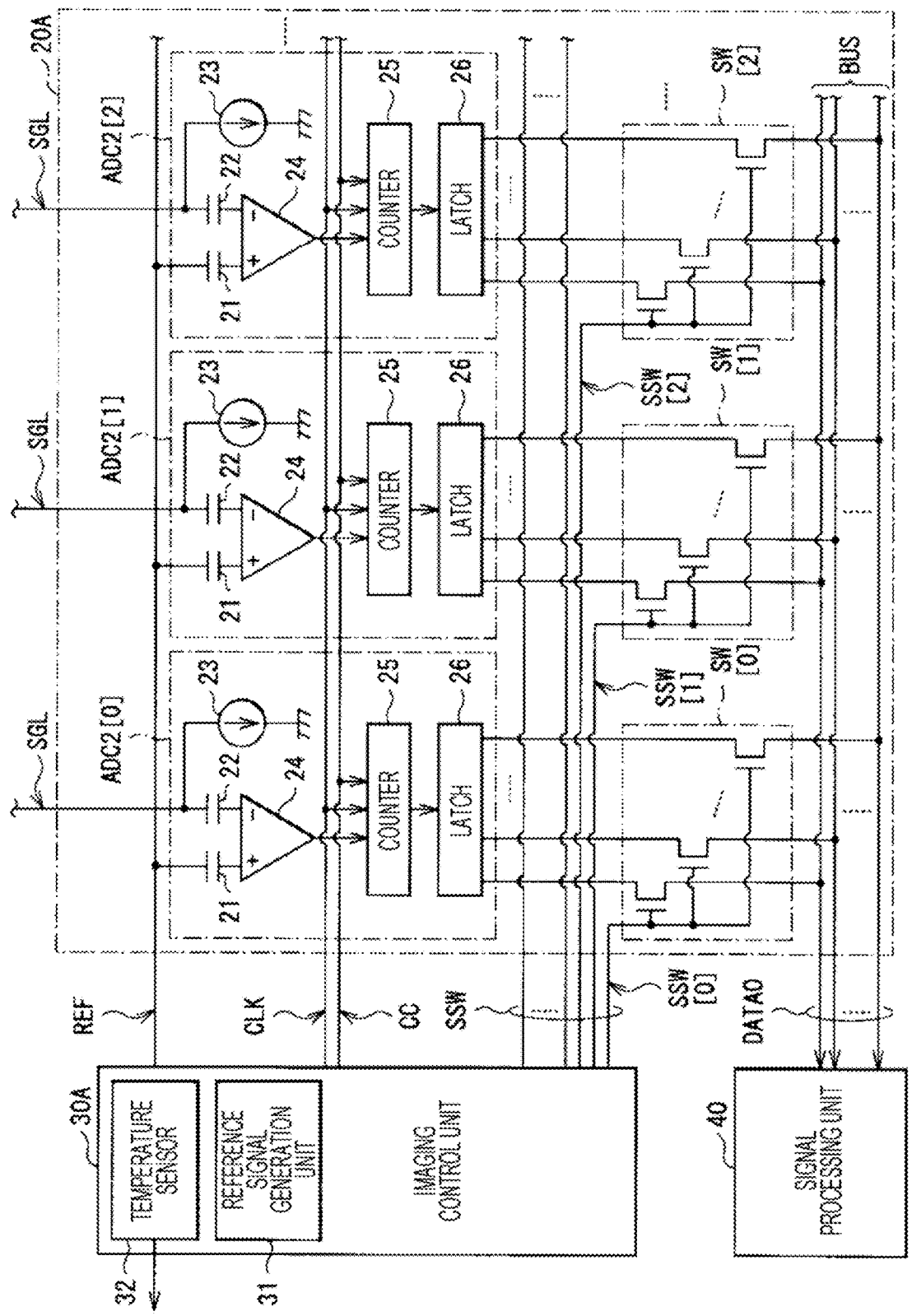
[Fig. 22]

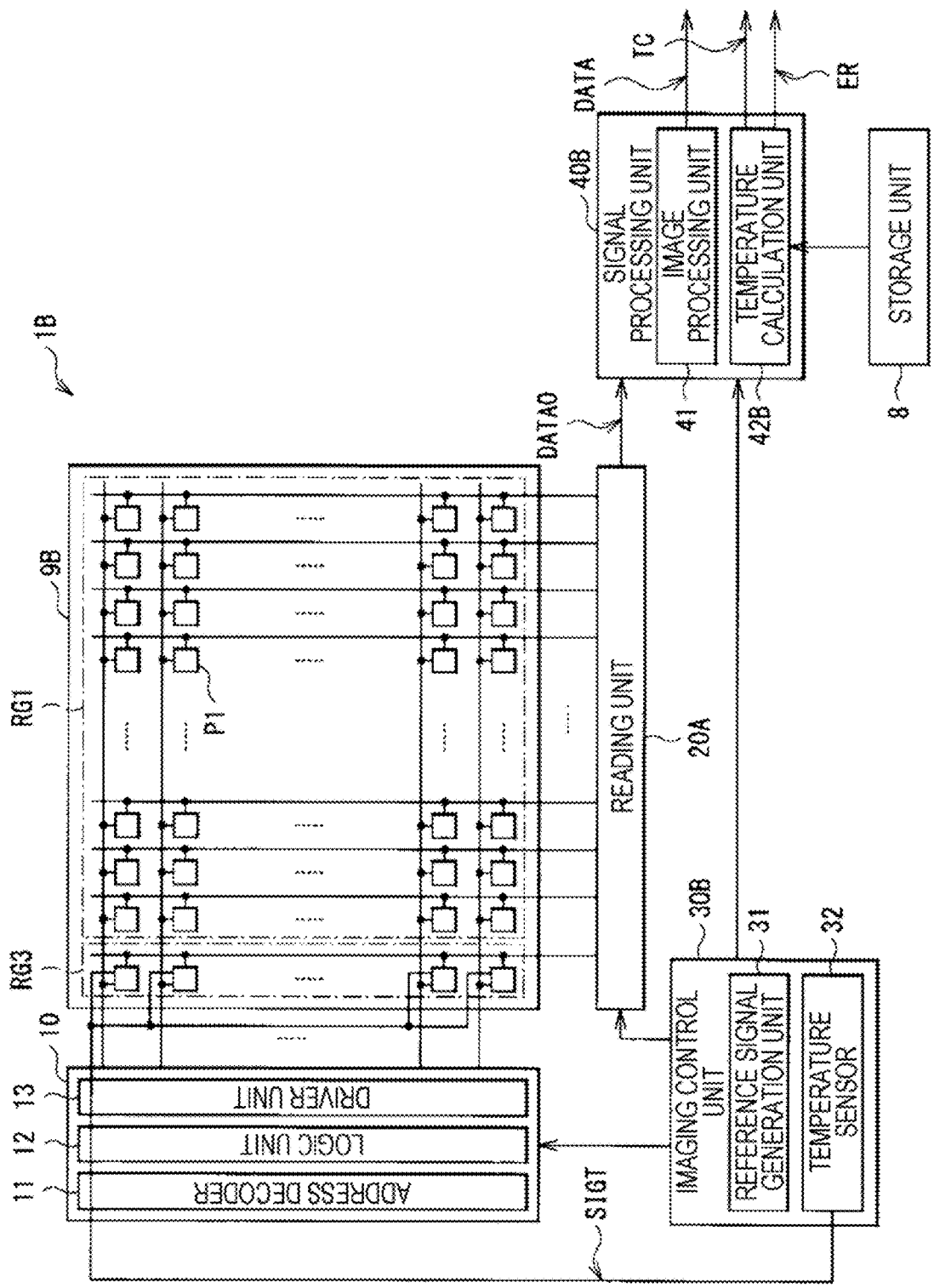
[Fig. 23]

[Fig. 24]
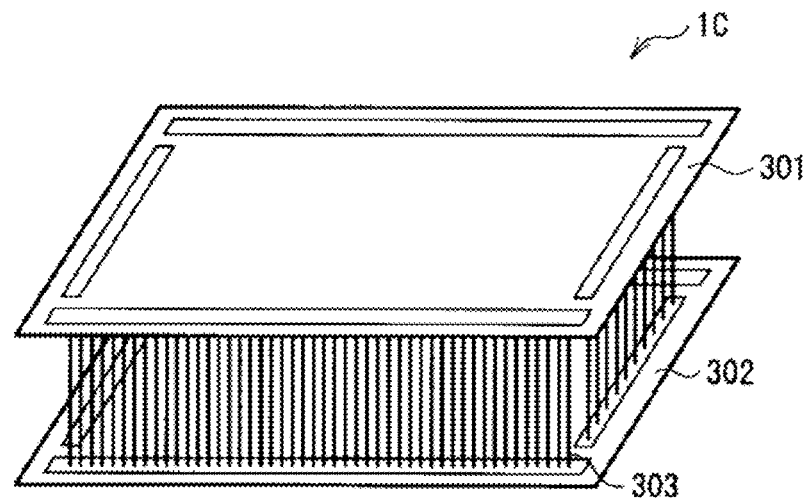
[Fig. 25]
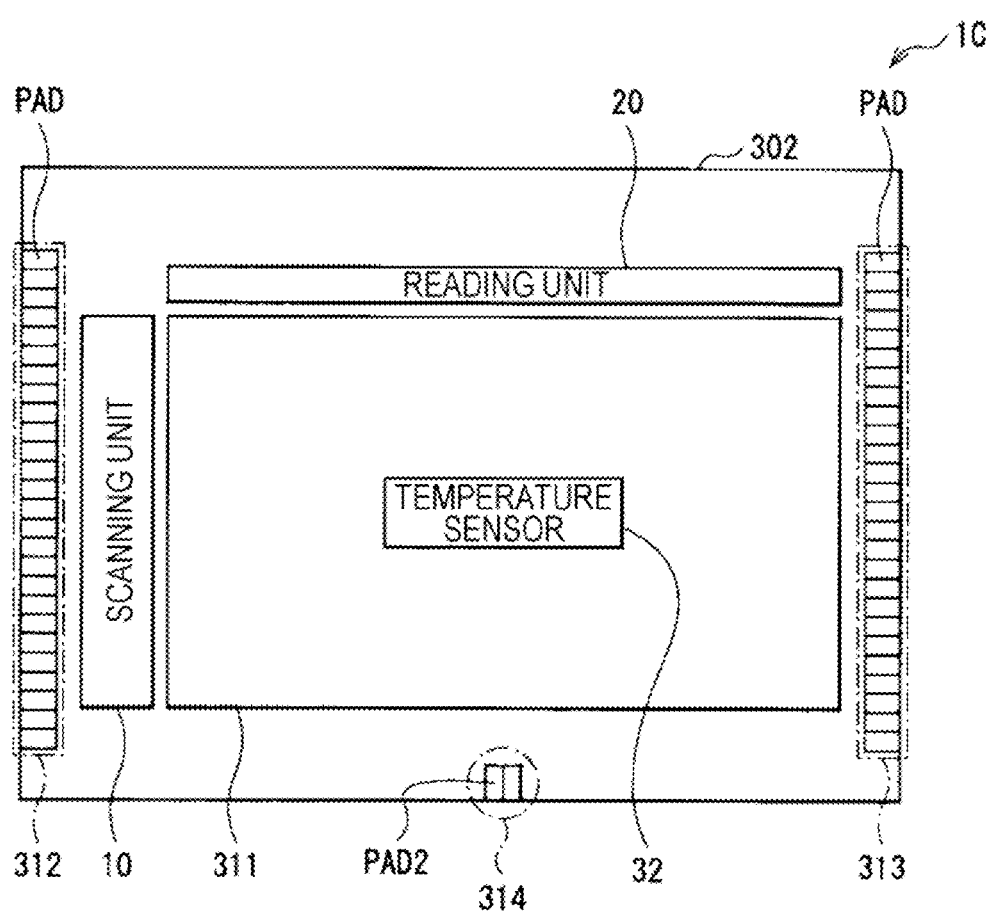

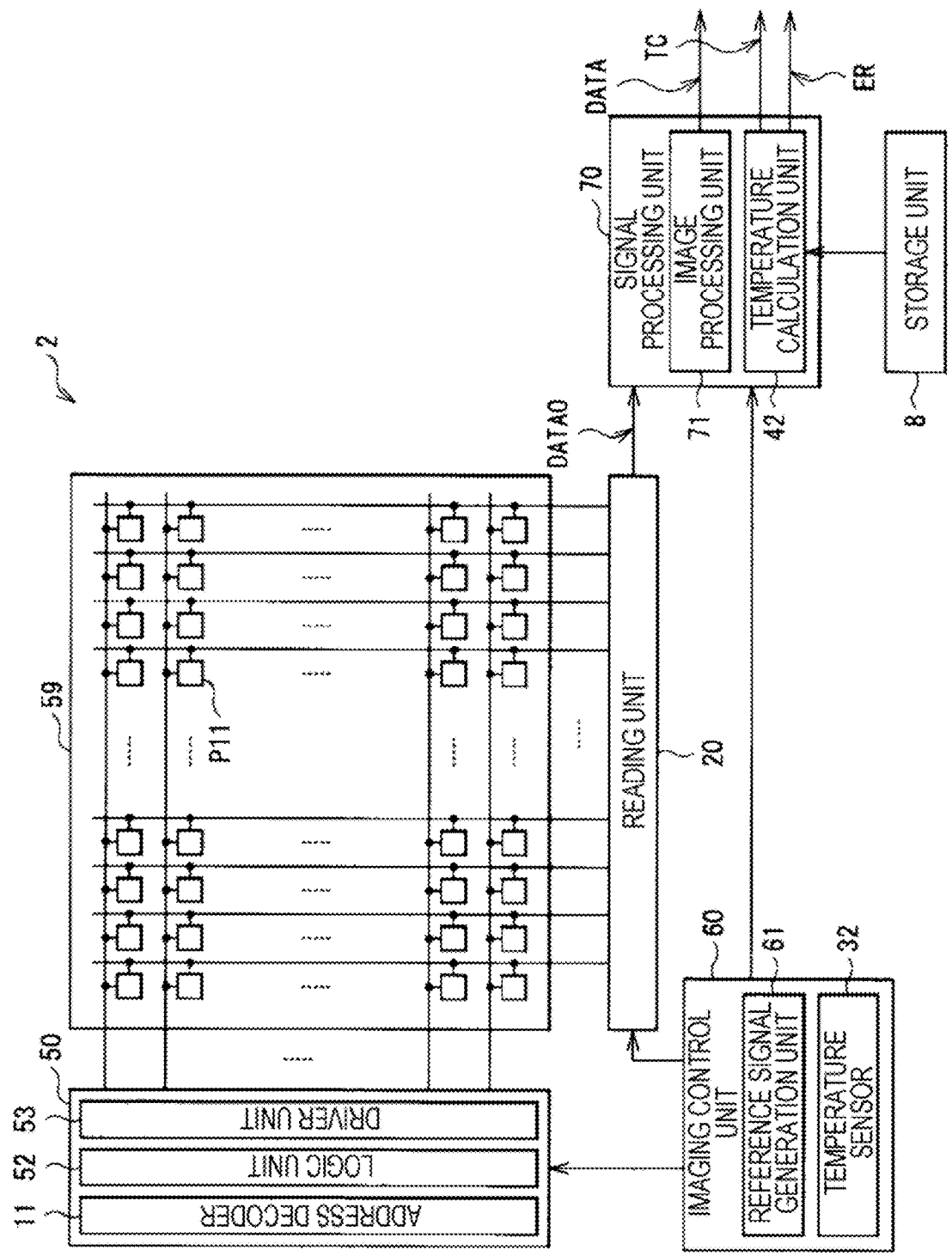
[Fig. 26]

[Fig. 27]
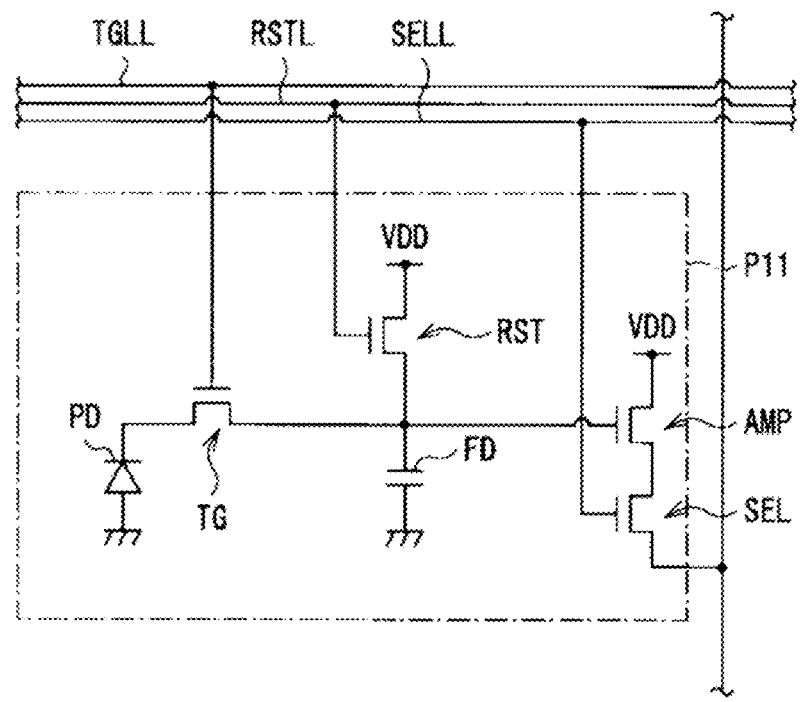
[Fig. 28]
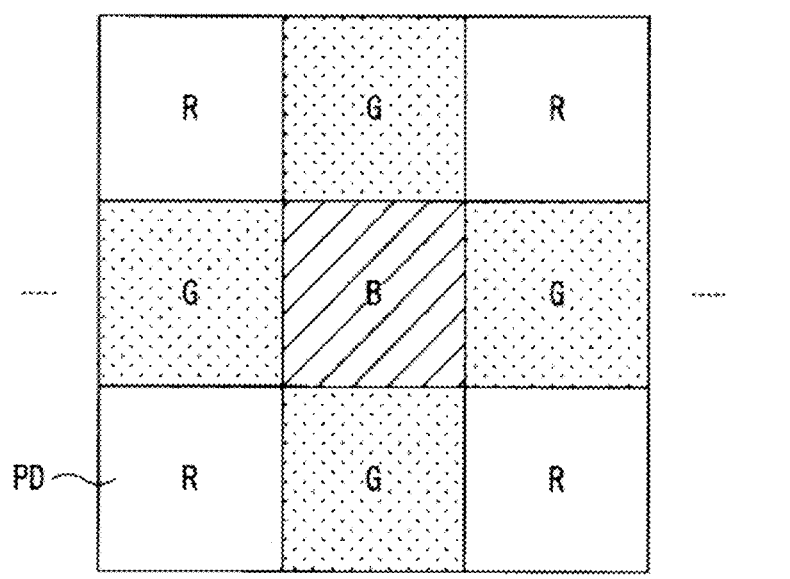

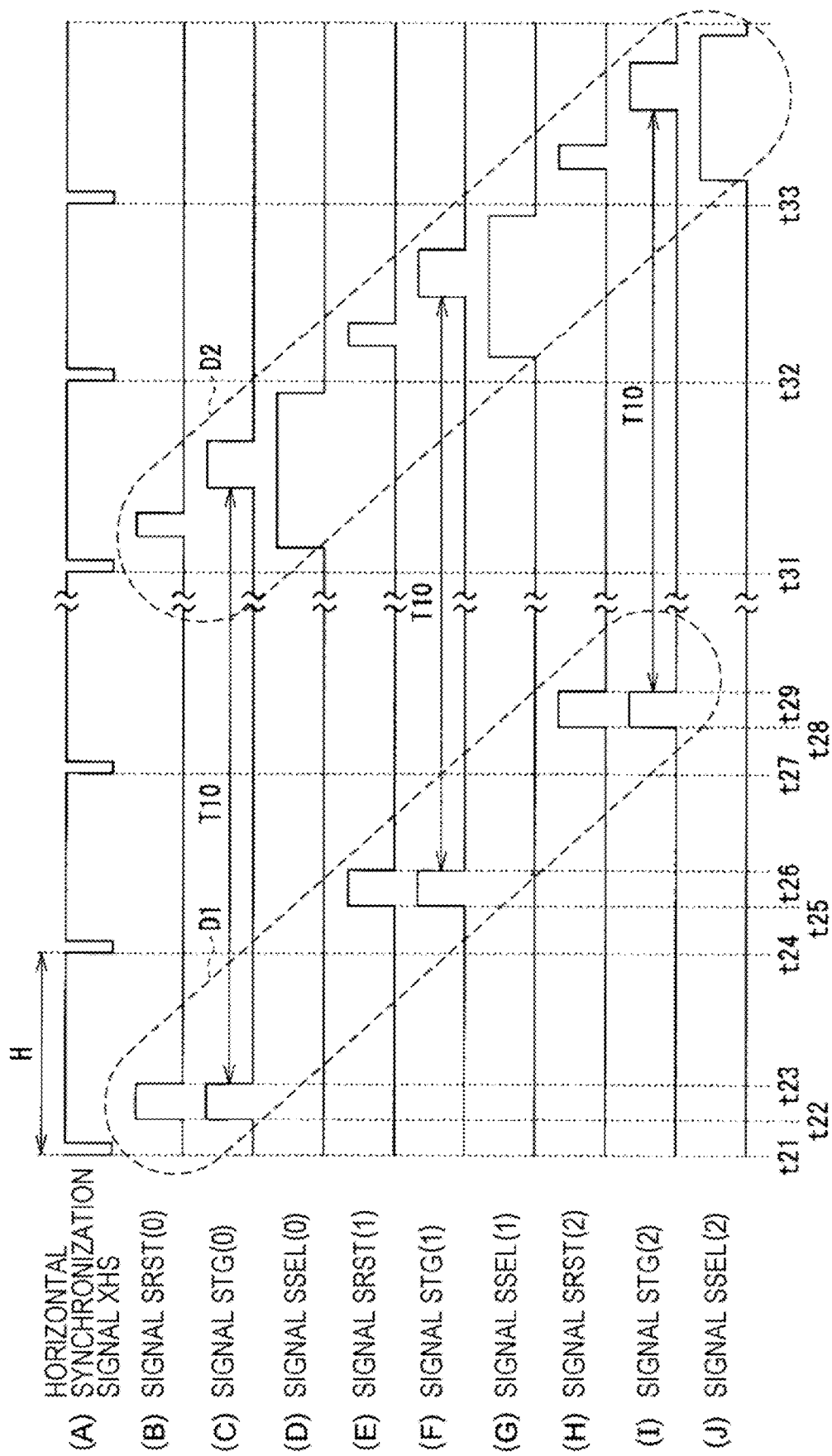

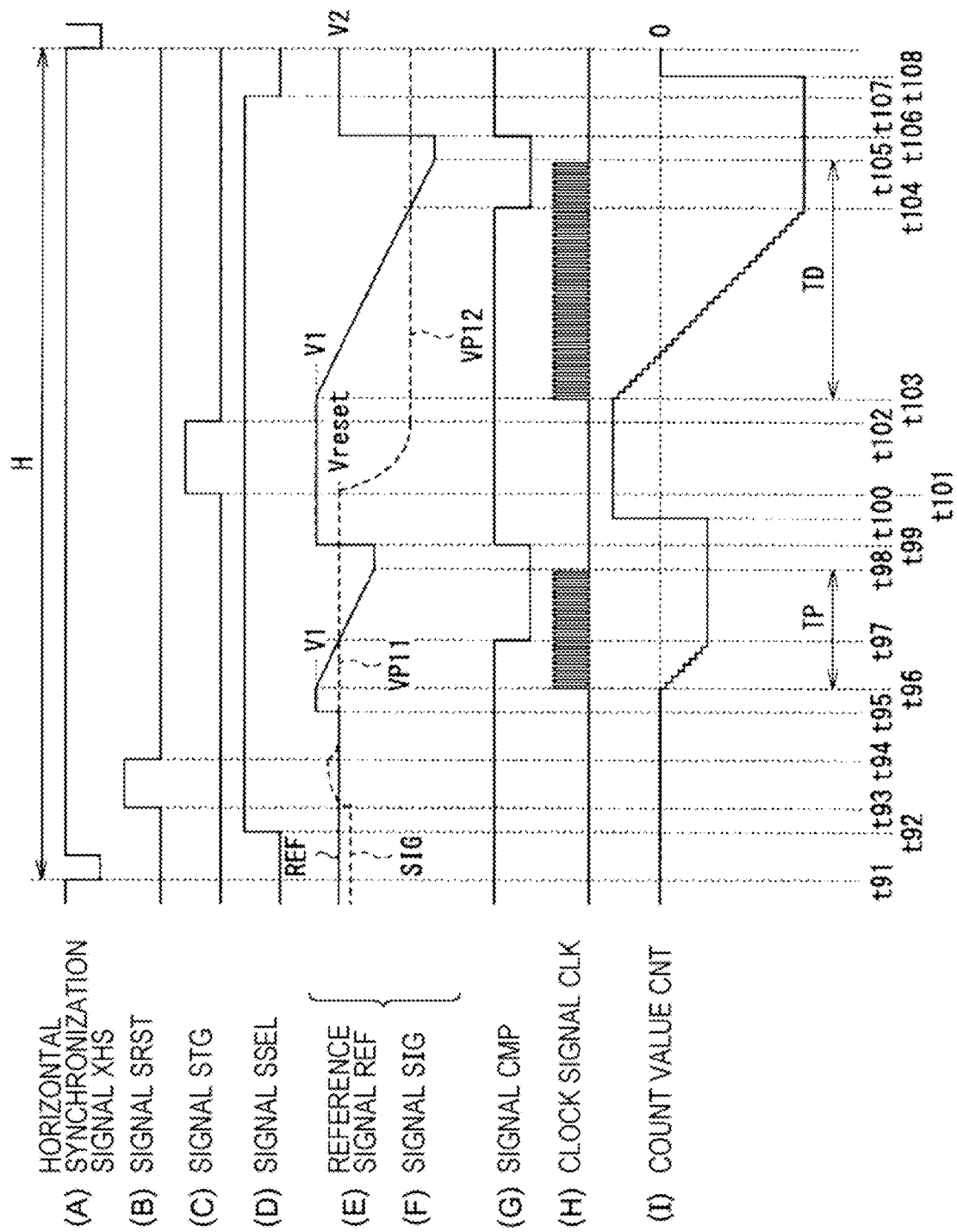
[Fig. 30]

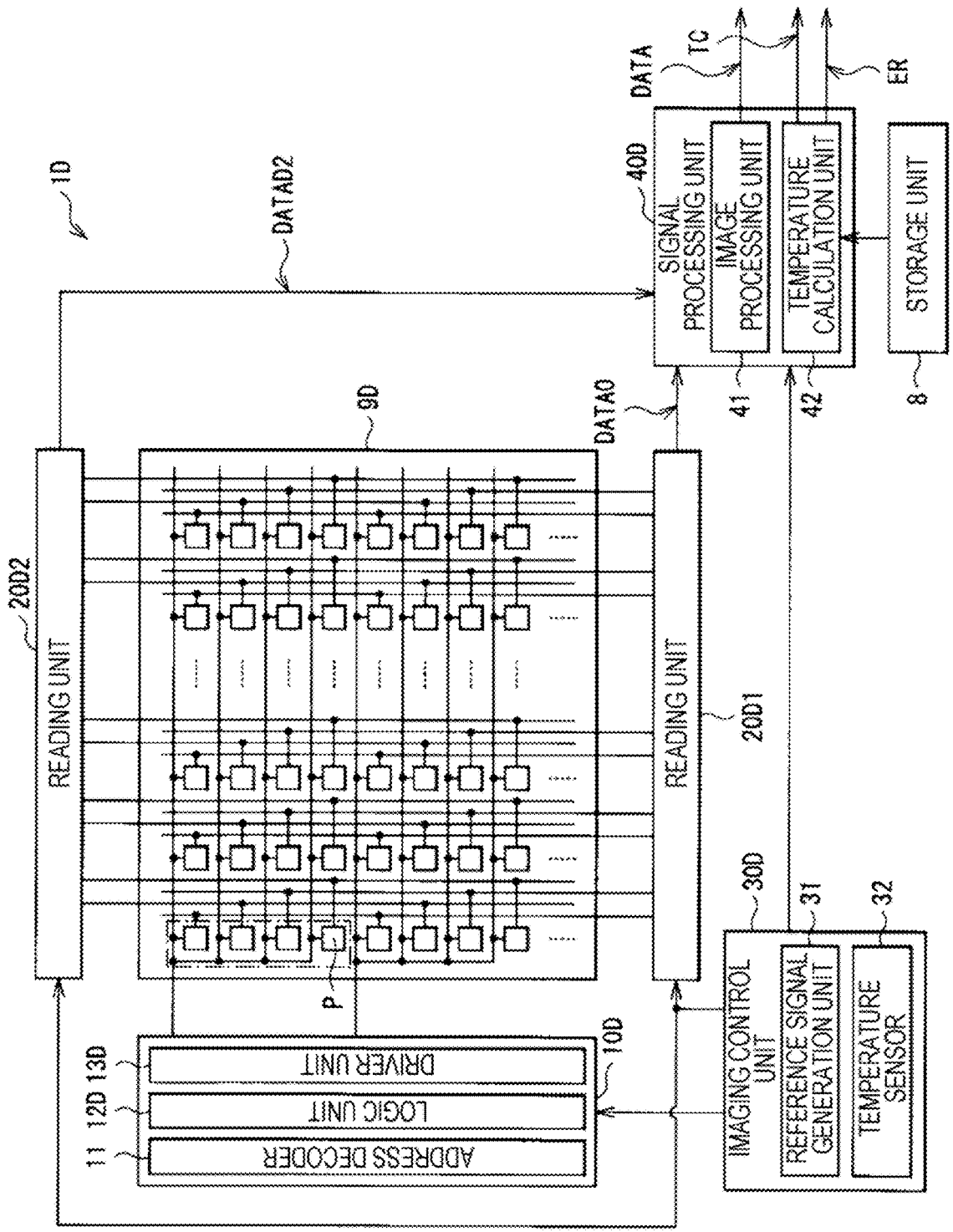
[Fig. 31]

[Fig. 32]
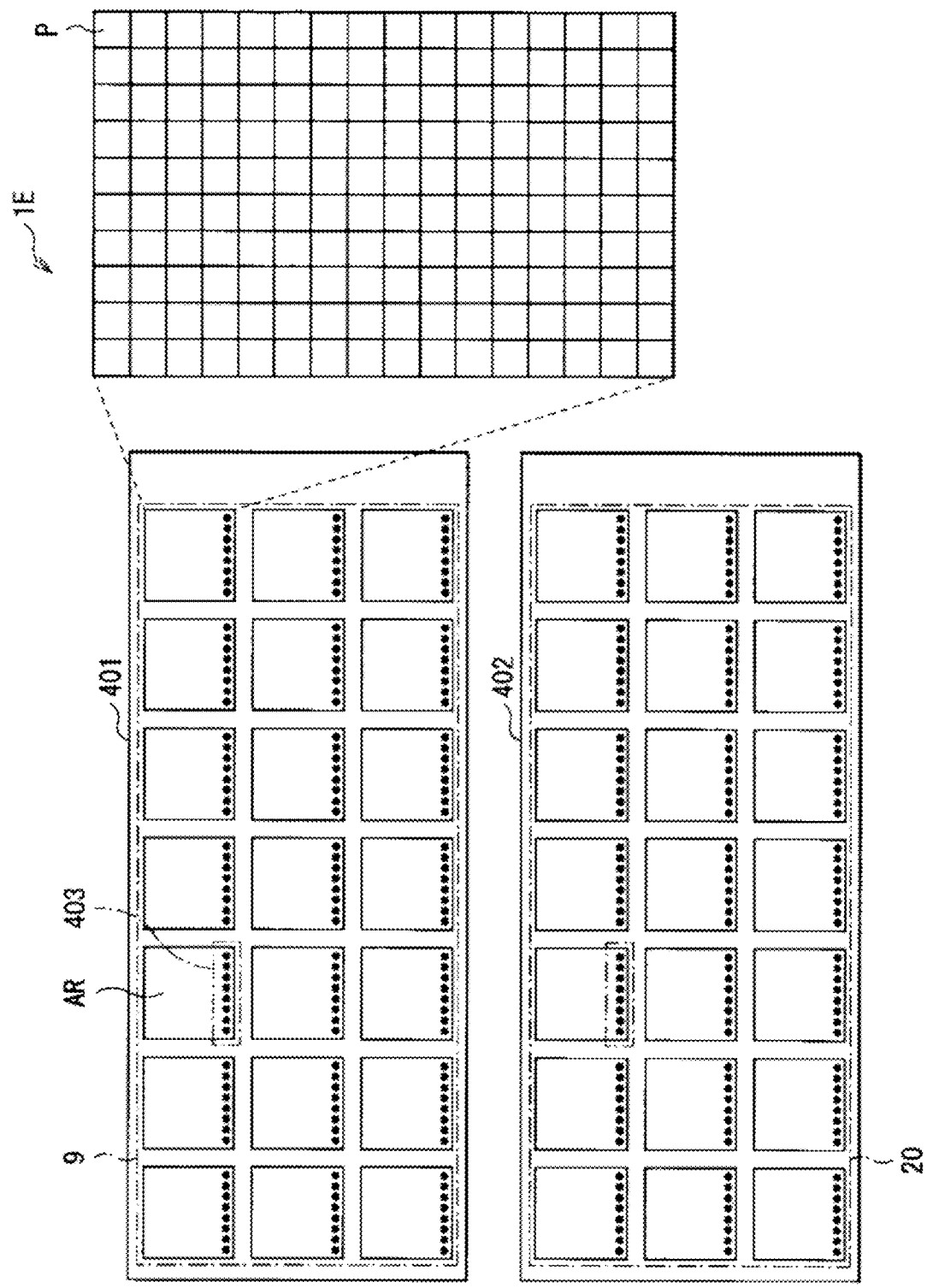

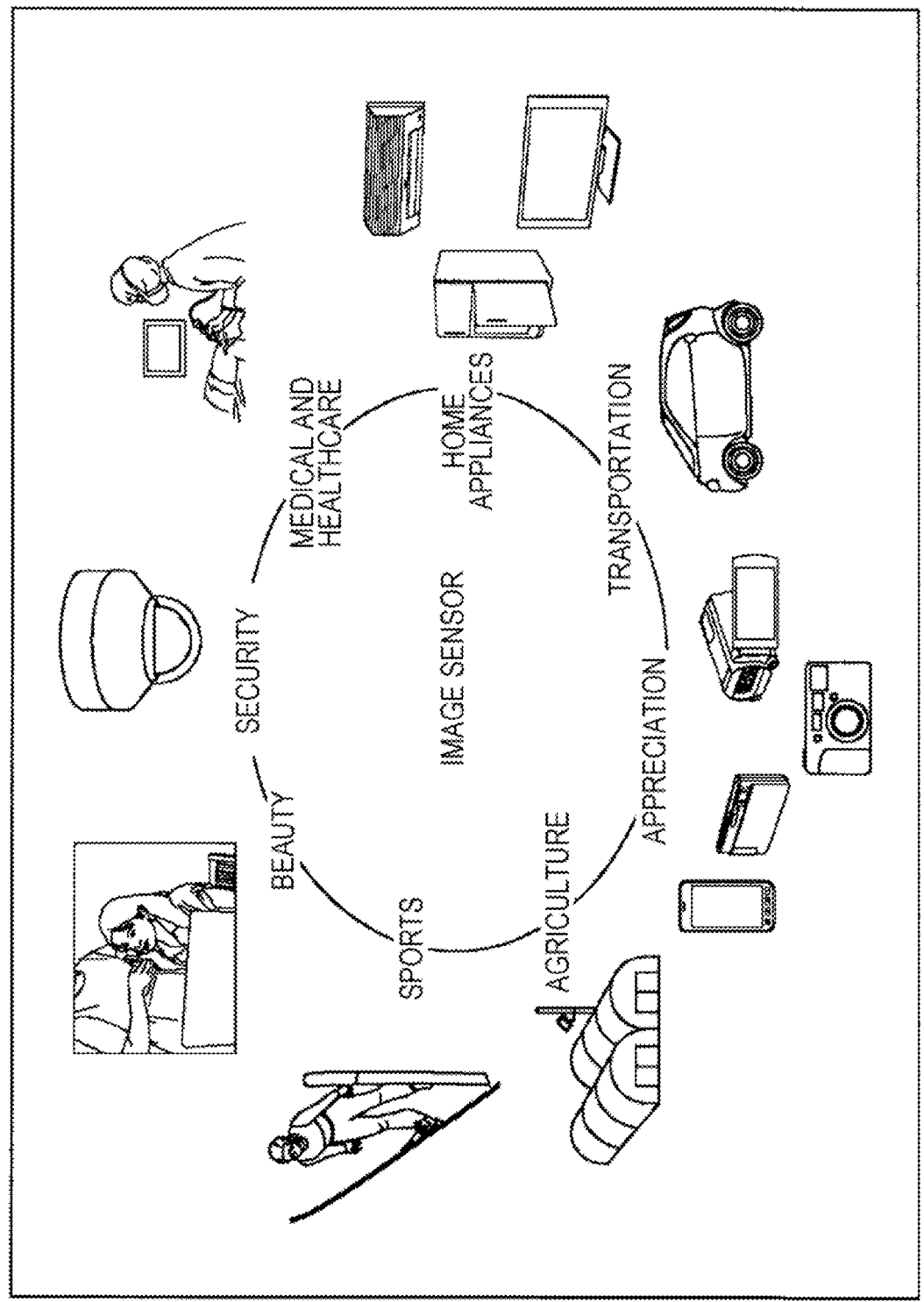
[Fig. 33]

[Fig. 34]
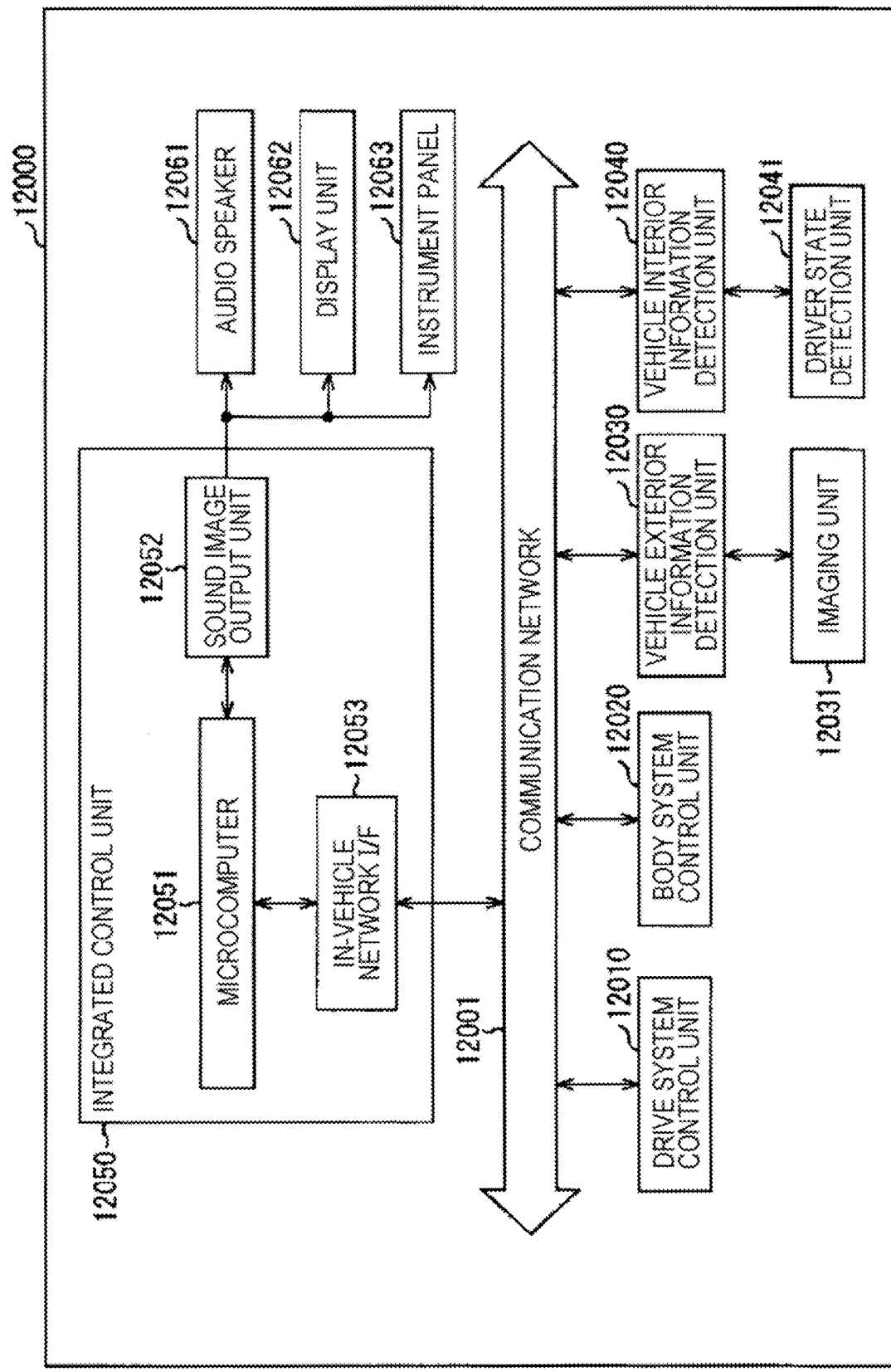

[Fig. 35]
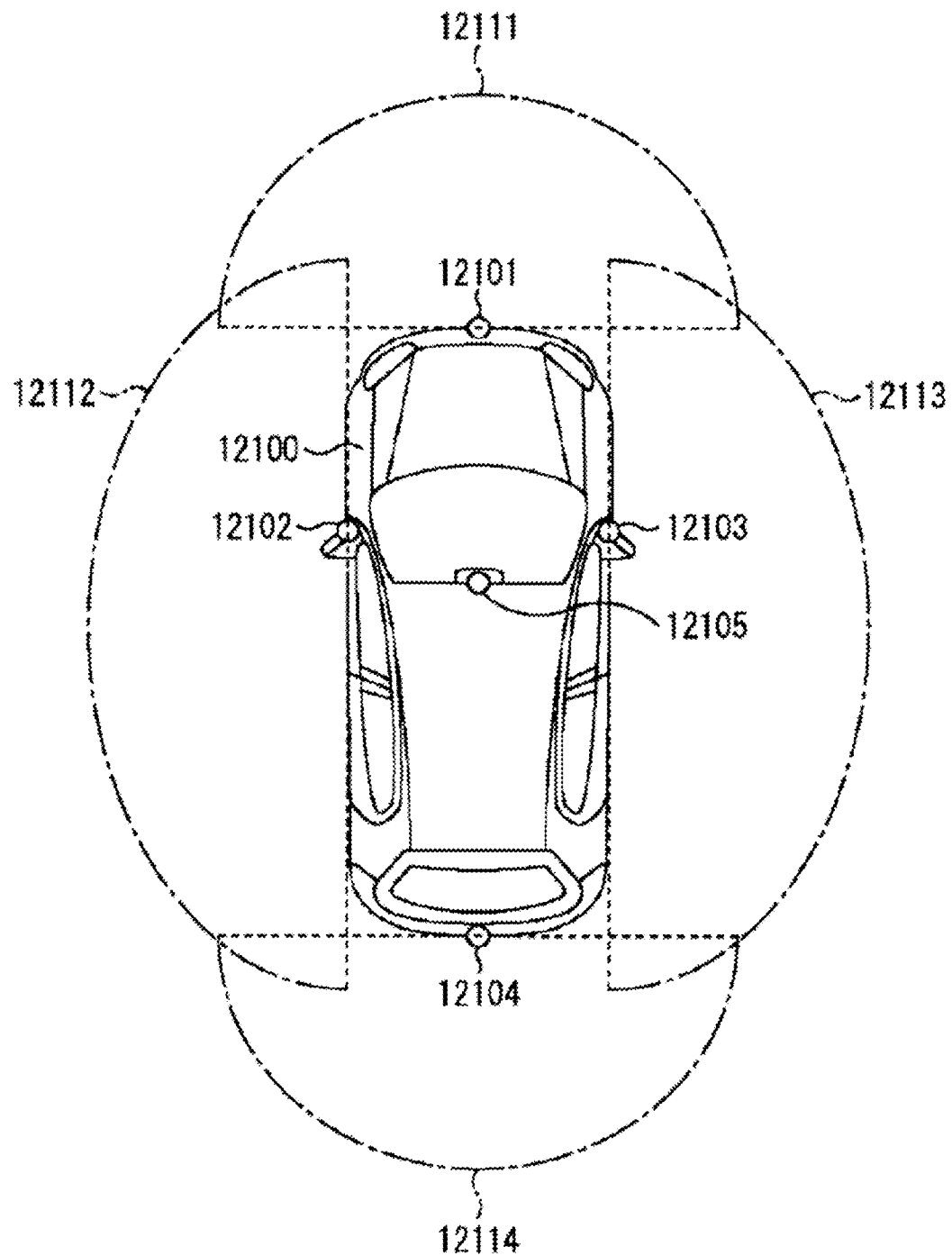

IMAGING DEVICE AND CALIBRATION METHOD

CROSS REFERENCE TO RELATED APPLICATIONS

This is a U.S. National Stage Application under 35 U.S.C. § 371, based on International Application No. PCT/JP2019/001986, filed in the Japanese Patent Office as a Receiving Office on Jan. 23, 2019, entitled "IMAGING DEVICE AND CALIBRATION METHOD", which claims priority under 35 U.S.C. § 119(a)-(d) or 35 U.S.C. § 365(b) to Japanese Patent Application Number JP 2018-015381, filed in the Japanese Patent Office on Jan. 31, 2018, each of which applications is hereby incorporated by reference in its entirety.

TECHNICAL FIELD

The present disclosure relates to an imaging device that captures an image and a method of calibrating a temperature measured in the imaging device.

BACKGROUND ART

In electronic devices, temperature detection is often performed. In such temperature detection, calibration is often performed to improve detection accuracy.

CITATION LIST

Patent Literature

PTL 1: JP 2012-220437 A

SUMMARY

Technical Problem

In the electronic devices, high temperature detection accuracy is desired. In imaging devices, high temperature detection accuracy is also expected.

Provision of an imaging device and a calibration method capable of improving temperature detection accuracy is desirable.

Solution to Problem

A first imaging device according to an embodiment of the present disclosure includes a processing unit, a temperature sensor, and a first pad electrode. The processing unit is formed on a first semiconductor substrate and is capable of performing predetermined image processing on the basis of image data obtained by the imaging unit. The temperature sensor is formed on the first semiconductor substrate and is capable of generating a detection signal according to a temperature. The first pad electrode is formed on the first semiconductor substrate and is electrically insulated from a circuit formed on the first semiconductor substrate.

A second imaging device according to an embodiment of the present disclosure includes an imaging unit, a processing unit, a temperature sensor, and a calculation unit. The processing unit is capable of performing predetermined image processing on the basis of image data obtained by the imaging unit. The temperature sensor is capable of generating a detection signal according to a temperature. The calculation unit is capable of generating a temperature code by performing different types of arithmetic processing from one another in a plurality of divided temperature ranges in each of which the temperature sensor is operable, on the basis of the detection signal.

A calibration method according to an embodiment of the present disclosure includes, by an inspection device, bringing a first pad electrode into contact with a thermocouple to measure a temperature, the first pad electrode being formed on a first semiconductor substrate on which a processing unit capable of performing predetermined image processing on the basis of image data obtained by an imaging unit is formed, and electrically insulated from a circuit formed on the first semiconductor substrate, by the inspection device, causing a storage unit formed on the first semiconductor substrate to store information about the measured temperature, by a temperature sensor formed on the first semiconductor substrate, generating a detection signal according to a temperature, by a calculation unit formed on the first semiconductor substrate, generating a temperature code by respectively performing different types of arithmetic processing from one another in a plurality of divided temperature ranges in each of which the temperature sensor is operable, on the basis of the detection signal, by the calculation unit, performing correction processing of correcting the temperature code, using the information stored in the storage unit, and by the inspection device, acquiring the corrected temperature code.

In the first imaging device according to an embodiment of the present disclosure, the processing unit, the temperature sensor, and the first pad electrode are formed on the first semiconductor substrate. In the processing unit, the predetermined image processing is performed on the basis of the image data obtained by the imaging unit. In the temperature sensor, the detection signal according to the temperature is generated. The first pad electrode is electrically insulated from the circuit formed on the first semiconductor substrate.

In the second imaging device according to an embodiment of the present disclosure, the predetermined image processing is performed in the processing unit on the basis of the image data obtained by the imaging unit. In the temperature sensor, the detection signal according to the temperature is generated. In the calculation unit, the different types of arithmetic processing are respectively performed in the plurality of temperature ranges on the basis of the detection signal, whereby the temperature code is generated.

In the calibration method according to an embodiment of the present disclosure, by the inspection device, the thermocouple is brought into contact with the first pad electrode formed on the first semiconductor substrate, so that the temperature is measured. Then, the calibration parameter is generated on the basis of the measured temperature. This calibration parameter is stored in the storage unit formed on the first semiconductor substrate. In the temperature sensor formed on the first semiconductor substrate, the detection signal according to the temperature is generated. In the calculation unit formed on the first semiconductor substrate, the different types of arithmetic processing are respectively performed in the plurality of temperature ranges on the basis of the detection signal, whereby the temperature code is generated. Then, in the calculation unit, the temperature code is corrected using the calibration parameter. Then, this temperature code is acquired by the inspection device.

Advantageous Effects of Invention

According to the first imaging device in an embodiment of the present disclosure, the first pad electrode formed on the first semiconductor substrate and electrically insulated from the circuit formed on the first semiconductor substrate is provided. Therefore, the temperature detection accuracy can be improved.

According to the second imaging device in an embodiment of the present disclosure, the temperature code is generated by respectively performing the different types of arithmetic processing in the plurality of temperature ranges. Therefore, the temperature detection accuracy can be improved.

According to the calibration method in an embodiment of the present disclosure, the temperature is measured by bringing the thermocouple into contact with the first pad electrode, the calibration parameter is generated on the basis of the measured temperature, and the temperature code is corrected using the calibration parameter. Therefore, the temperature detection accuracy can be improved.

Note that the effects described here are not necessarily limited, and any of effects described in the present disclosure may be exhibited.

BRIEF DESCRIPTION OF DRAWINGS

FIG. 1 is a block diagram illustrating a configuration example of an imaging device according to an embodiment of the present disclosure.

FIG. 2 is a circuit diagram illustrating a configuration example of a pixel array illustrated in FIG. 1.

FIG. 3 is an explanatory diagram illustrating a configuration example of the pixel array illustrated in FIG. 1.

FIG. 4 is a circuit diagram illustrating a configuration example of a reading unit illustrated in FIG. 1.

FIG. 5 is a circuit diagram illustrating a configuration example of a temperature sensor illustrated in FIG. 1.

FIG. 6 is an explanatory diagram illustrating an operation example of a temperature calculation unit illustrated in FIG. 1.

FIG. 7 is an explanatory diagram illustrating another operation example of the temperature calculation unit illustrated in FIG. 1.

FIG. 8A is an explanatory diagram illustrating another operation example of the temperature calculation unit illustrated in FIG. 1.

FIG. 8B is an explanatory diagram illustrating another operation example of the temperature calculation unit illustrated in FIG. 1.

FIG. 9 is an explanatory diagram illustrating an implementation example of the imaging device illustrated in FIG. 1.

FIG. 10 is a configuration diagram illustrating a configuration example of an inspection system that inspects the imaging device illustrated in FIG. 1.

FIG. 11 is an explanatory diagram illustrating an example of a temperature measurement operation.

FIG. 12 is another explanatory diagram illustrating an example of the temperature measurement operation.

FIG. 13 is a timing chart illustrating an operation example of the imaging device illustrated in FIG. 1.

FIG. 14 is a timing waveform chart illustrating an operation example of the imaging device illustrated in FIG. 1.

FIG. 15A is another timing waveform chart illustrating an operation example of the imaging device illustrated in FIG. 1.

FIG. 15B is another timing waveform chart illustrating an operation example of the imaging device illustrated in FIG. 1.

FIG. 16A is an explanatory diagram illustrating an operation state of the imaging device illustrated in FIG. 1.

FIG. 16B is an explanatory diagram illustrating another operation state of the imaging device illustrated in FIG. 1.

FIG. 16C is an explanatory diagram illustrating another operation state of the imaging device illustrated in FIG. 1.

FIG. 17 is an explanatory diagram illustrating an example of image synthesis in the imaging device illustrated in FIG. 1.

FIG. 18 is a timing waveform chart illustrating an example of a temperature detection operation in a vertical blanking period.

FIG. 19 is a flowchart illustrating an example of calibration processing.

FIG. 20 is a block diagram illustrating a configuration example of an imaging device according to a modification.

FIG. 21 is a circuit diagram illustrating a configuration example of a dummy pixel illustrated in FIG. 20.

FIG. 22 is a circuit diagram illustrating a configuration example of a reading unit illustrated in FIG. 20.

FIG. 23 is a block diagram illustrating a configuration example of an imaging device according to another modification.

FIG. 24 is an explanatory view illustrating an implementation example of the imaging device according to the another modification.

FIG. 25 is an explanatory diagram illustrating an implementation example of the imaging device illustrated in FIG. 24.

FIG. 26 is a block diagram illustrating a configuration example of an imaging device according to another modification.

FIG. 27 is a circuit diagram illustrating a configuration example of an imaging pixel illustrated in FIG. 26.

FIG. 28 is an explanatory diagram illustrating a configuration example of a pixel array illustrated in FIG. 26.

FIG. 29 is a timing waveform chart illustrating an operation example of the imaging device illustrated in FIG. 26.

FIG. 30 is another timing waveform chart illustrating an operation example of the imaging device illustrated in FIG. 26.

FIG. 31 is a block diagram illustrating a configuration example of an imaging device according to another modification.

FIG. 32 is an explanatory diagram illustrating an implementation example of the imaging device according to the another modification.

FIG. 33 is an explanatory diagram illustrating use examples of an imaging device.

FIG. 34 is a block diagram illustrating an example of a schematic configuration of a vehicle control system.

FIG. 35 is an explanatory diagram illustrating an example of installation positions of a vehicle exterior information detection unit and imaging units.

DESCRIPTION OF EMBODIMENTS

Hereinafter, embodiments of the present disclosure will be described in detail with reference to the drawings. Note that the description will be given in the following order.
 1. Embodiment
 2. Use Examples of Imaging Device
 3. Application Examples to Moving Body 1. Embodiment Configuration Example FIG. 1 illustrates a configuration example of an imaging device (imaging device 1) according to an embodiment. The imaging device 1 includes a pixel array 9, a scanning unit 10, a reading unit 20, an imaging control unit 30, a signal processing unit 40, and a storage unit 8.

The pixel array 9 has a plurality of imaging pixels P1 arranged in a matrix manner. The imaging pixel P1 includes a photodiode and generates a pixel voltage VP regarding the imaging pixel P1.

FIG. 2 illustrates a configuration example of the imaging pixel P1. The pixel array 9 includes a plurality of control lines TGLL, a plurality of control lines FDGL, a plurality of control lines RSTL, a plurality of control lines FCGL, a plurality of control lines TGSL, a plurality of control lines SELL, and a plurality of signal lines SGL. The control line TGLL extends in a horizontal direction (cross direction in FIG. 1), and a signal STGL is applied to the control line TGLL by the scanning unit 10. The control line FDGL extends in the horizontal direction, and a signal SFDG is applied to the control line FDGL by the scanning unit 10. The control line RSTL extends in the horizontal direction, and a signal SRST is applied to the control line RSTL by the scanning unit 10. The control line FCGL extends in the horizontal direction, and a signal SFCG is applied to the control line FCGL by the scanning unit 10. The control line TGSL extends in the horizontal direction, and a signal STGS is applied to the control line TGSL by the scanning unit 10. The control line SELL extends in the horizontal direction, and a signal SSEL is applied to the control line SELL by the scanning unit 10. The signal line SGL extends in a vertical direction (vertical direction in FIG. 1) and is connected to the reading unit 20.

The imaging pixel P1 includes a photodiode PD1, a transistor TGL, a photodiode PD2, a transistor TGS, a capacitive element FC, transistors FCG, RST, and FDG, a floating diffusion FD, and transistors AMP and SEL. In this example, the transistors TGL, TGS, FCG, RST, FDG, AMP, and SEL are N-type metal oxide semiconductor (MOS) transistors.

The photodiode PD1 is a photoelectric conversion element that generates an amount of electric charges according to the amount of received light and accumulates the electric charges. A light receiving region where the photodiode PD1 can receive light is wider than a light receiving region where the photodiode PD2 can receive light. An anode of the photodiode PD1 is grounded and a cathode is connected to a source of the transistor TGL.

A gate of the transistor TGL is connected to the control line TGLL, the source of the transistor TGL is connected to the cathode of the photodiode PD1, and a drain of the transistor TGL is connected to the floating diffusion FD.

The photodiode PD2 is a photoelectric conversion element that generates an amount of electric charges according to the amount of received light and accumulates the electric charges. The light receiving region where the photodiode PD2 can receive light is narrower than the light receiving region where the photodiode PD1 can receive light. An anode of the photodiode PD2 is grounded, and a cathode is connected to a source of the transistor TGS.

A gate of the transistor TGS is connected to the control line TGSL, the source of the transistor TGS is connected to the cathode of the photodiode PD2, and a drain of the transistor TGS is connected to one end of the capacitive element FC and a source of the transistor FCG.

The one end of the capacitive element FC is connected to the drain of the transistor TGS and the source of the transistor FCG, and a power supply voltage VDD is supplied to the other end of the capacitive element FC.

A gate of the transistor FCG is connected to the control line FCGL, the source of the transistor FCG is connected to the one end of the capacitive element FC and the drain of the transistor TGS, and a drain of the transistor FCG is connected to a source of the transistor RST and a drain of the transistor FDG.

A gate of the transistor RST is connected to the control line RSTL, the power supply voltage VDD is supplied to a drain of the transistor RST, and the source of the transistor RST is connected to the drains of the transistors FCG and FDG.

A gate of the transistor FDG is connected to the control line FDGL, the drain of the transistor FDG is connected to the source of the transistor RST and the drain of the transistor FCG, and a source of the transistor FDG is connected to the floating diffusion FD.

The floating diffusion FD accumulates the electric charges supplied from the photodiodes PD1 and PD2, and is configured using, for example, a diffusion layer formed on a surface of a semiconductor substrate. FIG. 2 illustrates the floating diffusion FD, using a symbol of a capacitive element.

A gate of the transistor AMP is connected to the floating diffusion FD, the power supply voltage VDD is supplied to a drain of the transistor AMP, and a source of the transistor AMP is connected to a drain of the transistor SEL.

A gate of the transistor SEL is connected to the control line SELL, the drain of the transistor SEL is connected to the source of the transistor AMP, and a source of the transistor SEL is connected to the signal line SGL.

With this configuration, in the imaging pixel P1, the transistor SEL becomes an ON state on the basis of the signal SSEL applied to the control line SELL, so that the imaging pixel P1 is electrically connected to the signal line SGL. With the connection, the transistor AMP is connected to a current source 23 (described below) of the reading unit 20 and operates as so-called source follower. Then, the imaging pixel P1 outputs the pixel voltage VP according to the voltage at the floating diffusion FD as a signal SIG to the signal line SGL. Specifically, as will be described below, the imaging pixel P1 sequentially outputs eight pixel voltages VP (VP1 to VP8) in eight periods (conversion periods T1 to T8) in a so-called horizontal period H.

FIG. 3 illustrates an example of arrangement of the photodiodes PD1 and PD2 in the pixel array 9. In FIG. 3, "R" represents a red color filter, "G" represents a green color filter, and "B" represents a blue color filter. In each imaging pixel P1, the photodiode PD2 is formed on the upper right of the photodiode PD1. Color filters of the same color are formed on the two photodiodes PD1 and PD2 in each imaging pixel P1. In this example, the photodiode PD1 has an octagonal shape, and the photodiode PD2 has a quadrangular shape. As illustrated in this drawing, the light receiving region where the photodiode PD1 can receive light is wider than the light receiving region where the photodiode PD2 can receive light.

The scanning unit 10 (FIG. 1) sequentially drives the imaging pixels P1 in the pixel array 9 in units of pixel line L on the basis of an instruction from the imaging control unit 30. The scanning unit 10 includes an address decoder 11, a logic unit 12, and a driver unit 13.

The address decoder 11 selects the pixel line L according to an address indicated by an address signal supplied from the imaging control unit 30, in the pixel array 9, on the basis of the address signal. The logic unit 12 generates signals STGL1, SFDG1, SRST1, SFCG1, STGS1, and SSEL1 corresponding to the pixel lines L, respectively, on the basis of an instruction from the address decoder 11. The driver unit 13 generates the signals STGL, SFDG, SRST, SFCG, STGS, and SSEL corresponding to the pixel lines L, respectively, on the basis of the signals STGL1, SFDG1, SRST1, SFCG1, STGS1, and SSEL1 corresponding to the pixel lines L.

The reading unit 20 performs AD conversion on the basis of the signal SIG supplied from the pixel array 9 via the signal line SGL to generate an image signal DATA0.

FIG. 4 illustrates a configuration example of the reading unit 20. Note that FIG. 4 also illustrates the imaging control unit 30 and the signal processing unit 40 in addition to the reading unit 20. The reading unit 20 includes a plurality of analog to digital (AD) conversion units ADC (AD conversion units ADC[0], ADC[1], ADC[2], . . . ), a plurality of switch units SW (switch units SW[0], SW[1], SW[2], . . . ), and a bus line BUS.

The AD conversion unit ADC performs AD conversion on the basis of the signal SIG supplied from the pixel array 9 to convert the voltage of the signal SIG into a digital code CODE. The plurality of AD conversion units ADC is provided corresponding to the plurality of signal lines SGL. Specifically, the 0th AD conversion unit ADC[0] is provided corresponding to the 0th signal line SGL[0], the 1st AD conversion unit ADC[1] is provided corresponding to the 1st signal line SGL[1], and the 2nd AD conversion unit ADC[2] is provided corresponding to the 2nd signal line SGL[2].

Furthermore, the AD conversion unit ADC has a function to perform AD conversion on the basis of a signal SIGT supplied from a temperature sensor 32 (described below) of the imaging control unit 30 to convert a voltage of the signal SIGT into the digital code CODE in a vertical blanking period (blanking period T20 described below). The signal SIGT is a signal including the power supply voltage VDD and a voltage Vtemp according to the temperature, as described below.

The AD conversion unit ADC includes capacitive elements 21 and 22, transistors 28 and 29, the current source 23, a comparator 24, a counter 25, and a latch 26. The capacitive element 21 has one end to which a reference signal REF is supplied and the other end connected to a positive input terminal of the comparator 24. The reference signal REF is generated by a reference signal generation unit 31 (described below) of the imaging control unit 30 and has a so-called ramp waveform in which a voltage level gradually decreases over time in the eight periods (conversion periods T1 to T8) in which the AD conversion is performed, as described below. The capacitive element 22 has one end connected to the signal line SGL and the other end connected to a negative input terminal of the comparator 24. The transistors 28 and 29 are N-type MOS transistors. The signal SIGT is supplied to a gate of the transistor 28, the power supply voltage VDD is supplied to a drain of the transistor 28, and a source of the transistor 28 is connected to a drain of the transistor 29. A signal SSELT is supplied to a gate of the transistor 29, the drain of the transistor 29 is connected to the source of the transistor 28, and a source of the transistor 29 is connected to the one end of the capacitive element 22. The current source 23 allows a current having a predetermined current value to flow from the signal line SGL to the ground. The comparator 24 compares an input voltage at the positive input terminal with an input voltage at the negative input terminal and outputs a comparison result as a signal CMP. The reference signal REF is supplied to the positive input terminal of the comparator 24 via the capacitive element 21 and the signal SIG is supplied to the negative input terminal via the capacitive element 22. The comparator 24 also has a function to perform zero adjustment to electrically connect the positive input terminal and the negative input terminal in a predetermined period described below. The counter 25 performs a count operation to count pulses of a clock signal CLK supplied from the imaging control unit 30 on the basis of the signal CMP supplied from the comparator 24 and a control signal CC. The latch 26 holds a count value CNT obtained by the counter 25 as a digital code CODE having a plurality of bits.

The switch unit SW supplies the digital code CODE output from the AD conversion unit ADC to the bus line BUS on the basis of a control signal SSW supplied from the imaging control unit 30. The plurality of switch units SW is provided corresponding to the plurality of AD conversion units ADC. Specifically, the 0th switch part SW[0] is provided corresponding to the 0th AD conversion unit ADC[0], the 1st switch unit SW[1] is provided corresponding to the 1st AD conversion unit ADC[1], and the 2nd switch unit SW[2] is provided corresponding to the 2nd AD conversion unit ADC[2].

In this example, the switch unit SW is configured using the same number of transistors as the bit depth of the digital code CODE. These transistors are on/off controlled on the basis of the bits (control signals SSW[0], SSW[1], SSW[2], . . . ) of the control signals SSW supplied from the imaging control unit 30. Specifically, for example, the 0th switch unit SW[0] supplies the digital code CODE output from the 0th AD conversion unit ADC[0] to the bus line BUS as the transistors become the ON state on the basis of the control signal SSW[0]. Similarly, for example, the 1st switch unit SW[1] supplies the digital code CODE output from the 1st AD conversion unit ADC[1] to the bus line BUS as the transistors become the ON state on the basis of the control signal SSW[1]. Other switch units SW similarly operate.

The bus line BUS has a plurality of lines and transmits the digital code CODE output from the AD conversion unit ADC. The reading unit 20 sequentially transfers a plurality of the digital codes CODE supplied from the AD conversion unit ADC to the signal processing unit 40 as the image signal DATA0, using the bus line BUS (data transfer operation).

The imaging control unit 30 (FIG. 1) supplies the control signals to the scanning unit 10, the reading unit 20, and the signal processing unit 40 to control the operations of these circuits to control the operation of the imaging device 1. Specifically, for example, the imaging control unit 30 supplies an address signal to the scanning unit 10, so that the scanning unit 10 sequentially drives the imaging pixels P1 in the pixel array 9 in units of pixel line L. Furthermore, the imaging control unit 30 supplies the reference signal REF, the clock signal CLK, the control signal CC, and the control signals SSW (control signals SSW[0], SSW[1], SSW[2], . . . ) to the reading unit 20, so that the reading unit 20 performs control to generate the image signal DATA0 on the basis of the signals SIG and SIGT. Furthermore, the imaging control unit 30 supplies the control signal to the signal processing unit 40 to control the operation of the signal processing unit 40. The imaging control unit 30 includes the reference signal generation unit 31 and the temperature sensor 32.

The reference signal generation unit 31 generates the reference signal REF. The reference signal REF has the so-called ramp waveform in which the voltage level gradually decreases over time in the eight periods (conversion periods T1 to T8) in which the AD conversion is performed. Then, the reference signal generation unit 31 supplies the generated reference signal REF to the plurality of AD conversion units ADC of the reading unit 20.

The temperature sensor 32 generates the signal SIGT. The signal SIGT is a signal including the power supply voltage VDD and the voltage Vtemp according to the temperature.

FIG. 5 illustrates a configuration example of the temperature sensor 32. Note that FIG. 5 illustrates the AD conversion unit ADC[0] of the reading unit 20 in addition to the temperature sensor 32. The temperature sensor 32 generates the voltage Vtemp according to the temperature, using a technology similar to a so-called band gap voltage reference circuit. The temperature sensor 32 includes transistors MP1 and MP2, an operational amplifier OPA, a resistive element R1, bipolar transistors BJT1 and BJT2, a resistive element R2, transistors MP3, MN1 and MN2, a resistive element R3, and a switch SWT.

The transistors MP1 and MP2 are P-type MOS transistors. A gate of the transistor MP1 is connected to an output terminal of the operational amplifier OPA and gates of the transistors MP2 and MP3, the power supply voltage VDD is supplied to a source of the transistor MP1, and a drain of the transistor MP1 is connected to a positive input terminal of the operational amplifier OPA and one end of the resistive element R1. A gate of the transistor MP2 is connected to the output terminal of the operational amplifier OPA and gates of the transistors MP1 and MP3, the power supply voltage VDD is supplied to a source of the transistor MP2, and a drain of the transistor MP2 is connected to a negative input terminal of the operational amplifier OPA and an emitter of the bipolar transistor BJT2. The positive input terminal of the operational amplifier OPA is connected to the drain of the transistor MP1 and the one end of the resistive element R1, the negative input terminal of the operational amplifier OPA is connected to the drain of the transistor MP2 and the emitter of the bipolar transistor BJT2, and the output terminal of the operational amplifier OPA is connected to the gates of the transistors MP1, MP2, and MP3. The one end of the resistive element R1 is connected to the drain of the transistor MP1 and the positive input terminal of the operational amplifier OPA, and the other end of the resistive element R1 is connected to an emitter of the bipolar transistor BJT1. The bipolar transistors BJT1 and BJT2 are PNP bipolar junction transistors. The emitter of the bipolar transistor BJT1 is connected to the other end of the resistive element R1, and a base and a collector of the bipolar transistor BJT1 are connected to each other and are also connected to a base and a collector of the bipolar transistor BJT2 and one end of the resistive element R2. The emitter of the bipolar transistor BJT2 is connected to the drain of the transistor MP2 and the negative input terminal of the operational amplifier OPA, and the base and the collector of the bipolar transistor BJT2 are connected to each other and are also connected to the base and the collector of the bipolar transistor BJT1 and the one end of the resistive element R2. The one end of the resistive element R2 is connected to the bases and the collectors of the bipolar transistors BJT1 and BJT2, and the other end of the resistive element R2 is grounded.

The transistor MP3 is a P-type MOS transistor, the gate of the transistor MP3 is connected to the output terminal of the operational amplifier OPA and the gates of the transistors MP1 and MP2, the power supply voltage VDD is supplied to a source of the transistor MP3, and a drain of the transistor MP3 is connected to a gate and a drain of the transistor MN1 and a gate of the transistor MN2. The transistors MN1 and MN2 are N-type MOS transistors. The gate and the drain of the transistor MN1 are connected to each other and are connected to the drain of the transistor MP3 and the gate of the transistor MN2, and a source of the transistor MN1 is grounded. The gate of the transistor MN2 is connected to the gate and the drain of the transistor MN1 and is also connected to the drain of the transistor MP3, a drain of the transistor MN2 is connected to one end of the resistive element R3 and to the switch SWT, and a source of the transistor MN2 is grounded. The one end of the resistive element R3 is connected to the drain of the transistor MN2 and to the switch SWT, and the power supply voltage VDD is supplied to the other end of the resistive element R3. With the configuration, the voltage Vtemp according to the temperature is generated at the one end of the resistive element R3. In this example, the voltage Vtemp is higher as the temperature is lower, and is lower as the temperature is higher. The voltage Vtemp desirably linearly changes with change in temperature. However, the voltage Vtemp may not linearly change. As will be described below, the imaging device 1 enhances linearity of temperature characteristics by performing arithmetic processing by a temperature calculation unit 42 (described below).

The switch SWT selects one of the power supply voltage VDD and the voltage Vtemp on the basis of a control signal SSWT generated by the imaging control unit 30 to generate the signal SIGT.

With such a configuration, the temperature sensor 32 generates the signal SIGT. Then, the temperature sensor 32 supplies the generated signal SIGT to the plurality of AD conversion units ADC of the reading unit 20.

The signal processing unit 40 performs signal processing for the image signal DATA0. The signal processing unit 40 includes an image processing unit 41 and the temperature calculation unit 42.

The image processing unit 41 performs predetermined image processing for an image indicated by the image signal DATA0. The predetermined image processing includes, for example, image synthesis processing. In the image synthesis processing, the image processing unit 41 generates four images PIC (images PIC1, PIC2, PIC3, and PIC4) on the basis of the eight digital codes CODE (digital codes CODE1 to CODE8) obtained in the eight periods (conversion periods T1 to T8) in which the AD conversion is performed, the digital codes CODE having been supplied from the reading unit 20. Then, the image processing unit 41 synthesizes the four images PIC to generate one captured image PICA. Then, the image processing unit 41 outputs the captured image PICA as the image signal DATA.

The temperature calculation unit 42 generates a temperature code TC indicating a temperature value on the basis of the digital code CODE obtained on the basis of the signal SIGT in the vertical blanking period included in the image signal DATA0. Specifically, the temperature calculation unit 42 performs arithmetic processing on the basis of each of a plurality of digital values VALT obtained from the plurality of AD conversion units ADC to generate a temperature code TC1 that linearly changes with the change in temperature. Then, the temperature calculation unit 42 performs correction processing for each of the temperature codes TC1 on the basis of a calibration parameter PCAL (described below) stored in the storage unit 8. Then, the temperature calculation unit 42 obtains an average value of values indicated by the plurality of corrected temperature codes TC1 to generate one temperature code TC.

FIG. 6 schematically illustrates an example of the arithmetic processing in the temperature calculation unit 42. (A) of FIG. 6 illustrates change in the digital value VALT when the temperature is changed and (B) of FIG. 6 illustrates change in the temperature code TC1 when the temperature is changed. The digital value VALT is obtained by subtracting the digital code CODE corresponding to the power supply voltage VDD from the digital code CODE corresponding to the voltage Vtemp, of the power supply voltage VDD and the voltage Vtemp output from the temperature sensor 32. As described above, the voltage Vtemp generated by the temperature sensor 32 desirably linearly changes with the change in temperature. However, the voltage Vtemp may not linearly change in some cases. In a case where the voltage Vtemp does not linearly change, the digital value VALT also does not linearly change with the change in temperature, as illustrated in (A) of FIG. 6. The temperature calculation unit 42 performs the arithmetic processing on the basis of such a digital value VALT to generate the temperature code TC1 that linearly changes with the change in temperature, as illustrated in (B) of FIG. 6. Specifically, the temperature calculation unit 42 divides a temperature range detectable by the temperature sensor 32 into a plurality of temperature ranges (two temperature ranges Trange1 and Trange2 in this example), and converts the digital value VALT into the temperature code TC1, using linear functions having different slopes from each other in the plurality of respective temperature ranges. In this example, as illustrated in (A) of FIG. 6, since the temperature slope of the digital value VALT in the temperature range Trange2 is lower than the temperature slope of the digital value VALT in the temperature range Trange1, the slope of the linear function used in the temperature range Trange2 of the voltage Vtemp is made larger than the slope of the linear function used in the temperature range Trange1. As a result, the temperature calculation unit 42 can generate the temperature code TC1 that linearly changes with the change in temperature, as illustrated in (B) of FIG. 6. In this manner, the temperature calculation unit 42 generates a plurality of the temperature codes TC1 on the basis of the plurality of digital values VALT obtained from the plurality of AD conversion units ADC.

FIG. 7 schematically illustrates an example of the correction processing in the temperature calculation unit 42. There is a possibility that the voltage Vtemp generated by the temperature sensor 32 varies due to so-called manufacturing variation of the imaging device 1. In this case, as illustrated in FIG. 7, the temperature code TC1 also varies. Therefore, in the imaging device 1, for example, a wafer before dicing on which the imaging device 1 is formed is set to a predetermined temperature Ttemp (for example, 60 degrees), and the temperature code TC generated when the imaging device 1 is operated at the temperature and information about an actual temperature of the imaging device 1 measured using a thermocouple as described below are stored in the storage unit 8 in advance. Then, for example, the temperature calculation unit 42 obtains the calibration parameter PCAL indicating a temperature difference between the temperature indicated by the temperature code TC and the temperature measured using the thermocouple, which are stored in the storage unit 8, and from then onward, shifts the temperature code TC1 by a value indicated by the calibration parameter PCAL to correct the temperature code TC1. In this manner, the temperature calculation unit 42 performs the correction processing for each of the plurality of temperature codes TC1 generated by the arithmetic processing.

Then, the temperature calculation unit 42 obtains the average value of the values indicated by the plurality of corrected temperature codes TC1 to generate one temperature code TC. Since the plurality of AD conversion units ADC performs the AD conversion on the basis of one signal SIGT in the blanking period, the values indicated by the plurality of temperature codes TC1 are expected to be approximately the same value. However, for example, in a case where a certain AD conversion unit ADC (AD conversion unit ADCA) of the plurality of AD conversion units ADC is broken down, the value indicated by the temperature code TC1 (temperature code TC1A) generated on the basis of the digital code CODE generated by the AD conversion unit ADC may be substantially different from the value indicated by another temperature code TC1. Therefore, for example, in a case where the value of a certain temperature code TC1 (temperature code TC1A) substantially deviates from the values of the plurality of temperature codes TC1 other than the temperature code TC1A, for example, the temperature calculation unit 42 performs, for example, interpolation operation using the temperature code TC1 related to the AD conversion unit ADC adjacent to the AD conversion unit ADCA related to the temperature code TC1A to correct the temperature code TC1A, as illustrated in FIG. 8A, for example. Then, the temperature calculation unit 42 obtains the average value of the values indicated by all the temperature codes TC1 including the corrected temperature code TC1A to generate one temperature code TC.

Note that the embodiment is not limited to this example, and in the case where the value of a certain temperature code TC1 (temperature code TC1A) substantially deviates from the values of the plurality of temperature codes TC1 other than the temperature code TC1A, for example, the temperature calculation unit 42 may obtain an average value of values indicated by a plurality of temperature codes TC1 other than the temperature code TC1A, of all the temperature codes TC1, to generate one temperature code TC, as illustrated in FIG. 8B, for example.

In this manner, the temperature calculation unit 42 generates one temperature code TC and outputs the generated temperature code TC.

Furthermore, the temperature calculation unit 42 has a function to check whether or not a value (temperature value) indicated by the temperature code TC obtained in this way falls within a predetermined range and make an error flag signal ER active in a case where the value does not fall within the predetermined range. This predetermined temperature range is, for example, a temperature range in which the imaging device 1 can normally operate, and can be set to, for example, from −40 to 125 degrees, both inclusive.

The storage unit 8 (FIG. 1) is, for example, a nonvolatile storage unit, and stores the temperature code TC generated when the imaging device 1 is operated at the predetermined temperature Ttemp (for example, 60 degrees) and the information about actual temperature of the imaging device 1 measured using a thermocouple to be described below. Then, the storage unit 8 supplies the information to the temperature calculation unit 42.

Next, mounting of the imaging device 1 will be described. In the imaging device 1, the blocks illustrated in FIG. 1 may be formed on one semiconductor substrate, for example.

FIG. 9 illustrates an example of a circuit arrangement on a semiconductor substrate 200. The pixel array 9 is mounted on the semiconductor substrate 200. Then, in FIG. 9, the scanning unit 10 is formed on the left of the pixel array 9, and the reading unit 20 and a peripheral circuit unit 201 are formed above the pixel array 9 in this order. The peripheral circuit unit 201 corresponds to the imaging control unit 30 and the signal processing unit 40. Furthermore, a terminal unit 202 in which a plurality of pad electrodes PAD is installed side by side is provided on a left end of the semiconductor substrate 200. Similarly, a terminal unit 203 in which a plurality of pad electrodes PAD is installed side by side is provided on a right end of the semiconductor substrate 200.

The temperature sensor 32 is formed in a region where the peripheral circuit unit 201 is formed. In other words, in this example, since the block having the highest temperature during operation is the signal processing unit 40 that is a logic circuit in the peripheral circuit unit 201 in the imaging device 1, the temperature sensor 32 is formed in the region where the signal processing unit 40 is formed so as to detect the temperature in the signal processing unit 40. In this example, the temperature sensor 32 is arranged in the vicinity of the center of the region where the peripheral circuit unit 201 is formed.

A terminal unit 204 in which two pad electrodes PAD2 are installed side by side is provided above the peripheral circuit unit 201. The two pad electrodes PAD2 are not connected to any of circuits formed on the semiconductor substrate 200 and are electrically insulated from these circuits. These two pad electrodes PAD2 are connected to each other, for example, via metal wiring. In this example, the area of the pad electrode PAD2 is the same as the area of the pad electrode PAD. These two pad electrodes PAD2 are electrodes with which two probe needles (probe needles 111A and 111B described below) constituting a thermocouple are brought into contact when calibrating the temperature. With the configuration, the imaging device 1 can detect the actual temperature of the wafer. The terminal unit 204 is desirably arranged near the temperature sensor 32. Specifically, the distance between the terminal unit 204 and the temperature sensor 32 is desirably made shorter than the distance between the terminal unit 204 and the pixel array 9, as illustrated in FIG. 9, and in particular, the distance between the terminal unit 204 and the temperature sensor 32 is desirably made shorter than the distance between the terminal unit 204 and the reading unit 20.

Note that, in this example, the area of the pad electrode PAD2 is made the same as the area of the pad electrode PAD. However, the embodiment is not limited to the example, and the area of the pad electrode PAD2 may be larger than the area of the pad electrode PAD. In other words, in temperature measurement using a thermocouple, it is favorable that the contact area between the pad electrodes PAD2 and the two probe needles constituting the thermocouple is large, and thus the area of the pad electrode PAD2 may be made large.

Furthermore, in this example, the pad electrodes PAD2 are not connected to any of circuits formed on the semiconductor substrate 200 and are electrically insulated from these circuits. However, the embodiment is not limited to the example, and the pad electrodes PAD2 may be connected to one or more circuits formed on the semiconductor substrate 200. Specifically, for example, a power supply voltage may be supplied to the imaging device 1 via the two pad electrodes PAD2. With the configuration, the number of pad electrodes for supplying the power supply voltage can be increased. Therefore, for example, power supply impedance can be decreased and electrical characteristics of the imaging device 1 can be improved.

As illustrated by the arrow in FIG. 9, the error flag signal ER output from the signal processing unit 40 (peripheral circuit unit 201) is, for example, output from the imaging device 1 via the pad electrode PAD in the terminal unit 202, the pad electrode PAD being nearest to the signal processing unit 40.

FIG. 10 illustrates a configuration example of an inspection system 100 that performs temperature calibration. The inspection system 100 includes a wafer 101 on which the imaging device 1 to be inspected is formed, and an inspection device 110. The inspection device 110 includes a probe 111, an inspection unit 112, and a heater 113.

The probe 111 includes a plurality of probe needles arranged in a contactable manner with the plurality of pad electrodes PAD of the imaging device 1. Furthermore, the probe 111 includes two probe needles 111A and 111B arranged in a contactable manner with the two pad electrodes PAD2, respectively. The probe needles 111A and 111B constitute a thermocouple. The probe needle 111A is configured using, for example, chromel, and the probe needle 111B is configured using, for example, alumel.

The inspection unit 112 brings the probe needles of the probe 111 into contact with the pad electrodes PAD and supplies the power supply voltage and various signals to the imaging device 1 of the wafer 101 via the probe 111 to operate the imaging device 1, and inspects that the imaging device 1 normally operates on the basis of various signals supplied from the imaging device 1 via the probe 111. Furthermore, the inspection unit 112 has a function to bring the probe needles 111A and 111B into contact with the two pad electrodes PAD2 to detect a difference between a potential in the probe needle 111A and a potential in the probe needle 111B (potential difference), and to detect the wafer temperature on the basis of the potential difference.

The heater 113 sets the temperature of the wafer 101.

FIG. 11 schematically illustrates an operation to detect the wafer temperature. In this example, the two probe needles 111A and 111B constituting the thermocouple are in contact with the two pad electrodes PAD2, respectively. As a result, thermoelectromotive force is generated in the probe needles 111A and 111B. The inspection unit 112 can detect the potential difference between the probe needles 111A and 111B and detect the wafer temperature on the basis of the potential difference.

Note that, in this example, the two pad electrodes PAD2 are provided. However, the embodiment is not limited to the example, and a large one pad electrode PAD3 may be provided in place of the two pad electrodes PAD2, as illustrated in FIG. 12, for example. The pad electrode PAD3 is not connected to any of circuits formed on the semiconductor substrate 200 and is electrically insulated from these circuits. The area of the pad electrode PAD3 is favorably larger than the area of pad electrode PAD. In this example, the probe needles 111A and 111B are in contact with the one pad electrode PAD3. Even in this case, the inspection unit 112 can detect the potential difference between the probe needles 111A and 111B and detect the wafer temperature on the basis of the potential difference. Note that the pad electrode PAD3 may be connected to one or more circuits formed on the semiconductor substrate 200.

Here, the pixel array 9 corresponds to a specific example of an "imaging unit" in the present disclosure. The image processing unit 41 corresponds to a specific example of a "processing unit" in the present disclosure. The temperature calculation unit 42 corresponds to a specific example of a "calculation unit" in the present disclosure. The temperature code TC corresponds to a specific example of a "temperature code" in the present disclosure. The pad electrode PAD2 corresponds to a specific example of a "first pad electrode" and a "second pad electrode" in the present disclosure. The pad electrode PAD corresponds to a specific example of an "input/output pad electrode" in the present disclosure. The reading unit 20 corresponds to a specific example of a "conversion unit" in the present disclosure. The semiconductor substrate 200 corresponds to a specific example of a "first semiconductor substrate" in the present disclosure.

Operations and Effects

Next, operations and effects of the imaging device 1 of the present embodiment will be described.

(Overall Operation Outline)

First, an overall operation outline of the imaging device 1 will be described with reference to FIGS. 1 and 4. The scanning unit 10 sequentially drives the imaging pixels P1 in the pixel array 9 in units of pixel line L. The imaging pixel P1 sequentially outputs eight pixel voltages VP1 to VP8 in the eight conversion periods T1 to T8. The AD conversion unit ADC of the reading unit 20 performs AD conversion on the basis of the eight pixel voltages VP1 to VP8, and outputs the eight digital codes CODE (digital codes CODE1 to CODE8), respectively. The image processing unit 41 of the signal processing unit 40 generates the four images PIC (images PIC1 to PIC4) on the basis of the eight digital codes CODE1 to CODE8 included in the image signal DATA0. Then, the signal processing unit 40 synthesizes the four images PIC to generate one captured image PICA, and outputs the captured image PICA as the image signal DATA. Furthermore, the AD conversion unit ADC performs the AD conversion on the basis of the signal SIGT supplied from the temperature sensor 32 of the imaging control unit 30 to convert the voltage of the signal SIGT into the digital code CODE in the vertical blanking period. The temperature calculation unit 42 of the signal processing unit 40 generates the temperature code TC indicating a temperature value on the basis of the digital code CODE obtained on the basis of the signal SIGT in the vertical blanking period included in the image signal DATA0, and outputs the temperature code TC. Furthermore, the temperature calculation unit 42 checks whether or not the value (temperature value) indicated by the temperature code TC falls within a predetermined range and outputs a confirmation result as the error flag signal ER.

(Detailed Operation)

In the imaging device 1, each of the imaging pixels P1 in the pixel array 9 accumulates electric charges according to the amount of received light, and outputs the pixel voltage VP as the signal SIG. This operation will be described in detail below.

FIG. 13 illustrates an example of an operation to scan the plurality of imaging pixels P1 in the pixel array 9.

In the period of timing t0 to t1, the imaging device 1 performs accumulation start drive D1 for the plurality of imaging pixels P1 in the pixel array 9 in order from the top in the vertical direction. Specifically, for example, the scanning unit 10 sets the transistors TGL, RST, FDG, TGS, and FCG to the ON state in a predetermined period within the horizontal period H in units of pixel line L in order from the top in the vertical direction. As a result, the electric charges are accumulated in the plurality of imaging pixels P1 in an accumulation period T10 until read drive D2 is performed.

Then, in the period of timing t10 to t11, the imaging device 1 performs the read drive D2 for the plurality of imaging pixels P1 in order from the top in the vertical direction. As a result, each of the plurality of imaging pixels P1 sequentially outputs the eight pixel voltages VP1 to VP8. The reading unit 20 performs the AD conversion on the basis of the eight pixel voltages VP1 to VP8, and outputs the eight digital codes CODE (digital codes CODE1 to CODE8), respectively.

Then, the signal processing unit 40 generates the four images PIC (images PIC1, PIC2, PIC3, and PIC4) on the basis of the eight digital codes CODE1 to CODE8 supplied from the reading unit 20, and synthesizes the four images PIC to generate one captured image PICA.

The imaging device 1 repeats the accumulation start drive D1 and the read drive D2. Specifically, as illustrated in FIG. 13, the imaging device 1 performs the accumulation start drive D1 in the period of timing t2 to t3 and performs the read drive D2 in the period of timing t12 to t13. Furthermore, the imaging device 1 performs the accumulation start drive D1 in the period of timing t4 to t5 and performs the read drive D2 in the period of timing t14 to t15.

(Read Drive D2)

Next, the read drive D2 will be described in detail. Hereinafter, focusing on an imaging pixel P1A of the plurality of imaging pixels P1, an operation of the imaging pixel P1A will be described in detail.

FIGS. 14, 15A, and 15B illustrate an operation example of the imaging device 1. In FIG. 14, (A) illustrates a waveform of a horizontal synchronization signal XHS, (B) illustrates a waveform of the signal SSEL supplied to the imaging pixel P1A, (C) illustrates a waveform of the signal SRST supplied to the imaging pixel P1A, (D) illustrates a waveform of the signal SFDG supplied to the imaging pixel P1A, (E) illustrates a waveform of the signal STGL supplied to the imaging pixel P1A, (F) illustrates a waveform of the signal SFCG supplied to the imaging pixel P1A, (G) illustrates a waveform of the signal STGS supplied to the imaging pixel P1A, (H) illustrates a waveform of the reference signal REF, (I) illustrates a waveform of the signal SIG output from the imaging pixel P1A, and (J) illustrates an operation of the counter 25 in the AD conversion unit ADC connected to the imaging pixel P1A. FIG. 15A illustrates the first half of the operation illustrated in FIG. 14, and FIG. 15B illustrates the second half of the operation illustrated in FIG. 14. In FIGS. 14(H) and (I), 15A(H) and (I), and 15B(H) and (I), the waveforms of the signals are illustrated on the same voltage axis. The reference signal REF in FIGS. 14(H), 15A(H), and 15B(H) illustrates a waveform at the positive input terminal of the comparator 24. The signal SIG in FIGS. 14(I), 15A(I), and 15B(I) illustrates a waveform at the negative input terminal of the comparator 24. Furthermore, in FIGS. 14(J), 15A(J), and 15B(J), shaded areas indicate that the counter 25 is performing a count operation.

FIGS. 16A to 16C illustrate states of the imaging pixel P1A. In FIGS. 16A to 16C, the transistors TGL, RST, FDG, TGS, FCG, and SEL are illustrated using switches according to operation states of the transistors.

In the read drive D2, the imaging control unit 30 changes the signal SSELT (FIG. 4) to a low level. With the change, in the reading unit 20, the transistor 29 becomes an OFF state in each of the plurality of AD conversion units ADC. With the change, the AD conversion unit ADC performs the AD conversion on the basis of the signal SIG supplied via the signal line SGL.

In the imaging device 1, in a certain horizontal period H, the scanning unit 10 first selects the pixel line L including the imaging pixel P1A using the signal SSEL, and electrically connects the imaging pixel P1A to the signal line SGL corresponding to the imaging pixel P1A. Then, the scanning unit 10 controls the operation of the imaging pixel P1A using the signals SRST, SFDG, STGL, SFCG, and STGS, and the imaging pixel P1A sequentially outputs the eight pixel voltages VP1 to VP8 in the eight conversion periods T1 to T8. Then, the AD conversion unit ADC of the reading unit 20 performs the AD conversion on the basis of the eight pixel voltages VP1 to VP8, and outputs the eight digital codes CODE1 to CODE8. This operation will be described in detail below.

First, when the horizontal period H starts at the timing t1, the scanning unit 10 changes the voltage of the signal SSEL from a low level to a high level at the timing t2 (FIG. 15A(B)). With the change, in the imaging pixel P1A, the transistor SEL becomes the ON state, and the imaging pixel P1A is electrically connected to the signal line SGL.

In the period up to the timing t11, the scanning unit 10 changes both the signals SRST and SFDG to the high level (FIGS. 15A(C) and (D)). With the change, in the imaging pixel P1A, both the transistors RST and FDG become the ON state, the voltage of the floating diffusion FD is set to the power supply voltage VDD, and the floating diffusion FD is reset.

(Operation in Timing t11 to t21)

Next, at the timing t11, the scanning unit 10 changes the voltage of the signal SFDG from the high level to the low level (FIG. 15A(D)). With the change, in the imaging pixel P1A, the transistor FDG becomes the OFF state. Next, at the timing t12, the scanning unit 10 changes the voltage of the signal SRST from the high level to the low level (FIG. 15A(C)). With the change, in the imaging pixel P1A, the transistor RST becomes the OFF state. Next, at the timing t13, the scanning unit 10 changes the voltage of the signal SFDG from the low level to the high level (FIG. 15A(D)). With the change, in the imaging pixel P1A, the transistor FDG becomes the ON state. Furthermore, the comparator 24 performs the zero adjustment to electrically connect the positive input terminal and the negative input terminal in the period of timing t13 to t14.

Next, at the timing t14, the comparator 24 terminates the zero adjustment and electrically disconnects the positive input terminal and the negative input terminal. Then, at the timing t14, the reference signal generation unit 31 changes the voltage of the reference signal REF to a voltage V1 (FIG. 15A(H)).

With the change, in the imaging pixel P1A, as illustrated in FIG. 16A, the transistors FDG and SEL become the ON state and all the other transistors become the OFF state. Since the transistor FDG is the ON state, the floating diffusion FD and the transistor FDG constitute a combined capacitance. This combined capacitance functions as a conversion capacitance for converting electric charges to a voltage in the imaging pixel P1A. In the imaging pixel P1A, since the transistor FDG is the ON state, a capacitance value of the conversion capacitance in the imaging pixel P1A is large and thus the conversion efficiency from the electric charge to the voltage is low. This conversion capacitance holds the electric charges of when the floating diffusion FD has been reset in the period up to the timing t12. The imaging pixel P1A outputs a pixel voltage VP (pixel voltage VP1) corresponding to the voltage at the floating diffusion FD at this time.

Next, in the period of timing t15 to t17 (conversion period T1), the AD conversion unit ADC performs the AD conversion on the basis of the pixel voltage VP1. Specifically, at the timing t15, the imaging control unit 30 starts generating the clock signal CLK, and at the same time, the reference signal generation unit 31 starts decreasing the voltage of the reference signal REF from the voltage V1 at a predetermined change degree (FIG. 15A(H)). In response to the change, the counter 25 of the AD conversion unit ADC starts the count operation (FIG. 15A(J)).

Then, at the timing t16, the voltage of the reference signal REF goes below the voltage (pixel voltage VP1) of the signal SIG (FIGS. 15A (H) and (I)). In response to the change, the comparator 24 of the AD conversion unit ADC changes the voltage of the signal CMP. As a result, the counter 25 stops the count operation (FIG. 15A(J)). The count value CNT of the counter 25 when the count operation is stopped corresponds to the pixel voltage VP1. The AD conversion unit ADC performs the AD conversion on the basis of the pixel voltage VP1 in this manner, and the latch 26 of the AD conversion unit ADC outputs the count value CNT of the counter 25 as the digital code CODE1 (FIG. 15A(J)).

Then, at the timing t17, the imaging control unit 30 stops the generation of the clock signal CLK with the end of the conversion period T1, the reference signal generation unit 31 stops the change of the voltage of the reference signal REF (FIG. 15A(H)), and the counter 25 resets the count value CNT.

(Operation in Timing t21 to t31)

Next, at the timing t21, the scanning unit 10 changes the voltage of the signal SFDG from the high level to the low level (FIG. 15A(D)). With the change, in the imaging pixel P1A, the transistor FDG becomes the OFF state. Furthermore, the comparator 24 performs the zero adjustment to electrically connect the positive input terminal and the negative input terminal in the period of timing t21 to t22.

Next, at the timing t22, the comparator 24 terminates the zero adjustment and electrically disconnects the positive input terminal and the negative input terminal. Then, at the timing t22, the reference signal generation unit 31 changes the voltage of the reference signal REF to a voltage V1 (FIG. 15A(H)).

With the change, in the imaging pixel HA, as illustrated in FIG. 16B, the transistor SEL becomes the ON state and all the other transistors become the OFF state. In the imaging pixel HA, since the transistor FDG is the OFF state, the capacitance value of the conversion capacitance in the imaging pixel HA is small and thus the conversion efficiency from the electric charge to the voltage is high. This conversion capacitance holds the electric charges of when the floating diffusion FD has been reset in the period up to the timing t12. The imaging pixel HA outputs a pixel voltage VP (pixel voltage VP2) corresponding to the voltage at the floating diffusion FD at this time.

Next, in the period of timing t23 to t25 (conversion period T2), the AD conversion unit ADC performs the AD conversion on the basis of the pixel voltage VP2. This operation is similar to the operation in the conversion period T1. The AD conversion unit ADC performs the AD conversion on the basis of the pixel voltage VP2, and the latch 26 of the AD conversion unit ADC outputs the count value CNT of the counter 25 as the digital code CODE2 (FIG. 15A(J)).

(Operation in Timing t31 to t41)

Next, at the timing t31, the scanning unit 10 changes the voltage of the signal STGL from the low level to the high level (FIG. 15A(E)). With the change, in the imaging pixel P1A, the transistor TGL becomes the ON state. With the change, the electric charge generated in the photodiode PD1 is transferred to the floating diffusion FD. Furthermore, at the timing t31, the reference signal generation unit 31 changes the voltage of the reference signal REF to a voltage V1 (FIG. 15A(H)).

Next, at the timing t32, the scanning unit 10 changes the voltage of the signal STGL from the high level to the low level (FIG. 15A(E)). With the change, in the imaging pixel P1A, the transistor TGL becomes the OFF state.

With the change, in the imaging pixel HA, since the transistor FDG is the OFF state, as illustrated in FIG. 16B, the capacitance value of the conversion capacitance in the imaging pixel P1A is small and thus the conversion efficiency from the electric charge to the voltage is high. The conversion capacitance holds the electric charges transferred from the photodiode PD1 in the timing t31 to t32. The imaging pixel HA outputs a pixel voltage VP (pixel voltage VP3) corresponding to the voltage at the floating diffusion FD at this time.

Next, in the period of timing t33 to t35 (conversion period T3), the AD conversion unit ADC performs the AD conversion on the basis of the pixel voltage VP3. This operation is similar to the operation in the conversion period T1. The AD conversion unit ADC performs the AD conversion on the basis of the pixel voltage VP3, and the latch 26 of the AD conversion unit ADC outputs the count value CNT of the counter 25 as the digital code CODE3 (FIG. 15A(J)). This digital code CODE3 corresponds to the digital code CODE2 obtained when the conversion efficiency is high as well (conversion period T2).

(Operation in Timing t41 to t51)

Next, at the timing t41, the scanning unit 10 changes the voltage of the signal SFDG from the low level to the high level and changes the voltage of the signal STGL from the low level to the high level (FIGS. 15A(D) and (E)). With the change, in the imaging pixel P1A, both the transistors FDG and TGL become the ON state. Furthermore, at the timing t41, the reference signal generation unit 31 changes the voltage of the reference signal REF to a voltage V1 (FIG. 15A(H)). Next, at the timing t42, the scanning unit 10 changes the voltage of the signal STGL from the high level to the low level (FIG. 15A(E)). With the change, in the imaging pixel P1A, the transistor TGL becomes the OFF state.

With the change, in the imaging pixel P1A, as illustrated in FIG. 16A, the transistor FDG is the ON state, and thus the floating diffusion FD and the transistor FDG constitute a combined capacitance (conversion capacitance). Therefore, since the capacitance value of the conversion capacitance in the imaging pixel P1A is large, the conversion efficiency from the electric charge to the voltage is low. The conversion capacitance holds the electric charges transferred from the photodiode PD1 in the timing t31 to t32 and t41 to t42. The imaging pixel P1A outputs a pixel voltage VP (pixel voltage VP4) corresponding to the voltage at the floating diffusion FD at this time.

Next, in the period of timing t43 to t45 (conversion period T4), the AD conversion unit ADC performs the AD conversion on the basis of the pixel voltage VP4. This operation is similar to the operation in the conversion period T1. The AD conversion unit ADC performs the AD conversion on the basis of the pixel voltage VP4, and the latch 26 of the AD conversion unit ADC outputs the count value CNT of the counter 25 as the digital code CODE4 (FIG. 15A(J)). This digital code CODE4 corresponds to the digital code CODE1 obtained when the conversion efficiency is low as well (conversion period T1).

(Operation in Timing t51 to t61)

Next, at the timing t51, the scanning unit 10 changes the voltage of the signal SRST from the low level to the high level (FIG. 15B(C)). With the change, in the imaging pixel HA, the transistor RST becomes the ON state. Since the transistor FDG is the ON state, the voltage of the floating diffusion FD is set to the power supply voltage VDD, and the floating diffusion FD is reset. Next, at the timing t52, the scanning unit 10 changes the voltage of the signal SRST from the high level to the low level (FIG. 15B(C)). With the change, in the imaging pixel P1A, the transistor RST becomes the OFF state. Furthermore, at the timing t52, the reference signal generation unit 31 changes the voltage of the reference signal REF to the voltage V1 (FIG. 15B(H)).

Next, at the timing t53, the scanning unit 10 changes the voltage of the signal SFCG from the low level to the high level (FIG. 15B(F)). With the change, in the imaging pixel HA, the transistor FCG becomes the ON state. Furthermore, the comparator 24 performs the zero adjustment to electrically connect the positive input terminal and the negative input terminal in the period of timing t53 to t54.

Next, at the timing t54, the comparator 24 terminates the zero adjustment and electrically disconnects the positive input terminal and the negative input terminal. Furthermore, at the timing t54, the reference signal generation unit 31 changes the voltage of the reference signal REF to the voltage V1 (FIG. 15A(H)).

With the change, in the imaging pixel HA, as illustrated in FIG. 16C, the transistors FDG, FCG, and SEL become the ON state and all the other transistors become the OFF state. Since both the transistors FDG and FCG are the ON state, the floating diffusion FD, the transistors FDG and FCG, and the capacitive element FC constitute a combined capacitance (conversion capacitance). This conversion capacitance holds the electric charge generated in the photodiode PD2 before the timing t53 and supplied and accumulated to the capacitive element FC via the transistor TGS. The imaging pixel P1A outputs a pixel voltage VP (pixel voltage VP5) corresponding to the voltage at the floating diffusion FD at this time.

Next, in the period of timing t55 to t57 (conversion period T5), the AD conversion unit ADC performs the AD conversion on the basis of the pixel voltage VP5. This operation is similar to the operation in the conversion period T1. The AD conversion unit ADC performs the AD conversion on the basis of the pixel voltage VP5, and the latch 26 of the AD conversion unit ADC outputs the count value CNT of the counter 25 as the digital code CODE5 (FIG. 15B(J)).

(Operation in Timing t61 to t71)

Next, at the timing t61, the scanning unit 10 changes the voltage of the signal STGS from the low level to the high level (FIG. 15B(G)). With the change, in the imaging pixel P1A, the transistor TGS becomes the ON state. With the change, the electric charge generated in the photodiode PD2 is transferred to the floating diffusion FD and the capacitive element FC. Furthermore, at the timing t61, the reference signal generation unit 31 changes the voltage of the reference signal REF to the voltage V1 (FIG. 15B(H)).

Next, at the timing t62, the scanning unit 10 changes the voltage of the signal STGS from the high level to the low level (FIG. 15B(G)). With the change, in the imaging pixel P1A, the transistor TGS becomes the OFF state.

With the change, in the imaging pixel HA, as illustrated in FIG. 16C, both the transistors FDG and FCG are the ON state, and thus the floating diffusion FD, the transistors FDG and FCG, and the capacitive element FC constitute a combined capacitance (conversion capacitance). This conversion capacitance holds the electric charges transferred from the photodiode PD2 in the timing t61 to t62, in addition to the electric charge generated in the photodiode PD2 before the timing t53 and supplied and accumulated to the capacitive element FC via the transistor TGS. The imaging pixel HA outputs a pixel voltage VP (pixel voltage VP6) corresponding to the voltage at the floating diffusion FD at this time.

Next, in the period of timing t63 to t65 (conversion period T6), the AD conversion unit ADC performs the AD conversion on the basis of the pixel voltage VP6. This operation is similar to the operation in the conversion period T1. The AD conversion unit ADC performs the AD conversion on the basis of the pixel voltage VP6, and the latch 26 of the AD conversion unit ADC outputs the count value CNT of the counter 25 as the digital code CODE6 (FIG. 15B(J)). This digital code CODE6 corresponds to the digital code CODE5 obtained when the floating diffusion FD, the transistors FDG and FCG, and the capacitive element FC constitute a combined capacitance.

(Operation in Timing t71 to t81)

Next, the comparator 24 performs the zero adjustment to electrically connect the positive input terminal and the negative input terminal in the period of timing t71 to t72.

Next, at the timing t72, the comparator 24 terminates the zero adjustment and electrically disconnects the positive input terminal and the negative input terminal. Furthermore, at the timing t72, the reference signal generation unit 31 changes the voltage of the reference signal REF to the voltage V1 (FIG. 15B(H)).

With the change, in the imaging pixel P1A, as illustrated in FIG. 16C, both the transistors FDG and FCG are the ON state, and thus the floating diffusion FD, the transistors FDG and FCG, and the capacitive element FC constitute a combined capacitance (conversion capacitance). This conversion capacitance holds the electric charges transferred from the photodiode PD2 in the timing t61 to t62, in addition to the electric charge generated in the photodiode PD2 before the timing t53 and supplied and accumulated to the capacitive element FC via the transistor TGS. The imaging pixel P1A outputs a pixel voltage VP (pixel voltage VP7) corresponding to the voltage at the floating diffusion FD at this time.

Next, in the period of timing t73 to t75 (conversion period T7), the AD conversion unit ADC performs the AD conversion on the basis of the pixel voltage VP7. This operation is similar to the operation in the conversion period T1. The AD conversion unit ADC performs the AD conversion on the basis of the pixel voltage VP7, and the latch 26 of the AD conversion unit ADC outputs the count value CNT of the counter 25 as the digital code CODE7 (FIG. 15B(J)).

(Operation in Timing t81 to t7)

Next, at the timing t81, the scanning unit 10 changes the voltage of the signal SRST from the low level to the high level (FIG. 15B(C)). With the change, in the imaging pixel P1A, the transistor RST becomes the ON state. Since the transistors FDG and FCG are the ON state, the voltage of the floating diffusion FD and the voltage of the capacitive element FC are set to the power supply voltage VDD, and the floating diffusion FD and the capacitive element FC are reset.

Next, at the timing t82, the scanning unit 10 changes the voltage of the signal SFCG from the high level to the low level (FIG. 15B(F)). With the change, in the imaging pixel P1A, the transistor FCG becomes the OFF state.

Next, at the timing t83, the scanning unit 10 changes the voltage of the signal SRST from the high level to the low level (FIG. 15B(C)). With the change, in the imaging pixel P1A, the transistor RST becomes the OFF state.

Next, at the timing t84, the scanning unit 10 changes the voltage of the signal SFCG from the low level to the high level (FIG. 15B(F)). With the change, in the imaging pixel P1A, the transistor FCG becomes the ON state. Furthermore, at the timing t84, the reference signal generation unit 31 changes the voltage of the reference signal REF to the voltage V1 (FIG. 15B(H)).

With the change, in the imaging pixel P1A, as illustrated in FIG. 16C, both the transistors FDG and FCG are the ON state, and thus the floating diffusion FD, the transistors FDG and FCG, and the capacitive element FC constitute a combined capacitance (conversion capacitance). This conversion capacitance holds the electric charge of when the floating diffusion FD and the capacitive element FC have been reset in the timing t81 to t82. The imaging pixel P1A outputs a pixel voltage VP (pixel voltage VP8) corresponding to the voltage at the floating diffusion FD at this time.

Next, in the period of timing t85 to t87 (conversion period T8), the AD conversion unit ADC performs the AD conversion on the basis of the pixel voltage VP8. This operation is similar to the operation in the conversion period T1. The AD conversion unit ADC performs the AD conversion on the basis of the pixel voltage VP8, and the latch 26 of the AD conversion unit ADC outputs the count value CNT of the counter 25 as the digital code CODE8 (FIG. 15B(J)). This digital code CODE8 corresponds to the digital code CODE7 obtained when the floating diffusion FD, the transistors FDG and FCG, and the capacitive element FC constitute a combined capacitance.

Next, at the timing t7, the scanning unit 10 changes the voltage of the signal SFDG from the high level to the low level and changes the voltage of the signal SFCG from the high level to the low level (FIGS. 15B(D) and (F)). With the change, in the imaging pixel P1A, the transistors FDG and FCG become the OFF state.

Then, at the timing t8, the scanning unit 10 changes the voltage of the signal SSEL from the high level to the low level (FIG. 15B(B)). With the change, in the imaging pixel P1A, the transistor SEL becomes the OFF state, and the imaging pixel P1A is electrically disconnected from the signal line SGL.

Next, image synthesis processing in the image processing unit 41 of the signal processing unit 40 will be described. The image processing unit 41 generates the four images PIC (images PIC1 to PIC4) on the basis of the digital code CODE supplied from the reading unit 20. Then, the image processing unit 41 synthesizes the four images PIC to generate one captured image PICA.

FIG. 17 schematically illustrates the image synthesis processing. The waveforms illustrated in FIGS. 17(A) to (G) are similar to the waveforms illustrated in FIGS. 14(A) to (G). As described with reference to FIGS. 14, 15A, and 15B, the reading unit 20 generates the digital code CODE1 on the basis of the operation in the period of the timing t11 to t21, the digital code CODE2 on the basis of the operation in the period of the timing t21 to t31, the digital code CODE3 on the basis of the operation in the period of the timing t31 to t41, the digital code CODE4 on the basis of the operation in the period of the timing t41 to t51, the digital code CODE5 on the basis of the operation in the period in the timing t51 to t61, the digital code CODE6 on the basis of the operation in the period of the timing t61 to t71, the digital code CODE7 on the basis of the operation in the period of timing t71 to t81, and the digital code CODE8 on the basis of the operation in the period of the timing t81 to t7.

The image processing unit 41 generates a pixel value VAL1 on the basis of the digital code CODE2 and the digital code CODE3. Specifically, the image processing unit 41 subtracts the digital code CODE2 from the digital code CODE3 (CODE3–CODE2) to calculate the pixel value VAL1. In other words, the imaging device 1 calculates the pixel value VAL1 using the digital code CODE2 corresponding to pre-charge phase (P-phase) data and the digital code CODE3 corresponding to data phase (D-phase) data using the principle of so-called correlated double sampling (CDS).

Similarly, the image processing unit 41 generates a pixel value VAL2 on the basis of the digital code CODE1 and the digital code CODE4. Specifically, the image processing unit 41 subtracts the digital code CODE1 from the digital code CODE4 (CODE4–CODE1) to calculate the pixel value VAL2. In other words, the imaging device 1 calculates the pixel value VAL2 using the digital code CODE1 corresponding to the P-phase data and the digital code CODE4 corresponding to the D-phase data using the principle of correlated double sampling.

Similarly, the image processing unit 41 generates a pixel value VAL3 on the basis of the digital code CODE5 and the digital code CODE6. Specifically, the image processing unit 41 subtracts the digital code CODE5 from the digital code CODE6 (CODE6−CODE5) to calculate the pixel value VAL3. In other words, the imaging device 1 calculates the pixel value VAL3 using the digital code CODE5 corresponding to the P-phase data and the digital code CODE6 corresponding to the D-phase data using the principle of correlated double sampling.

Then, the image processing unit 41 generates a pixel value VAL4 on the basis of the digital code CODE7 and the digital code CODE8. Specifically, the image processing unit 41 subtracts the digital code CODE8 from the digital code CODE7 (CODE7−CODE8) to calculate the pixel value VAL4. In other words, the imaging device 1 calculates the pixel value VAL4 using the digital code CODE7 before resetting the floating diffusion FD and the capacitive element FC and the digital code CODE8 after resetting the floating diffusion FD and the capacitive element FC using the principle of so-called double data sampling (DDS).

Then, the image processing unit 41 generates the image PIC1 on the basis of the pixel values VAL1 in all the imaging pixels P1 in the pixel array 9, the image PIC2 on the basis of the pixel values VAL2 in all the imaging pixels P1 in the pixel array 9, the image PIC3 on the basis of the pixel values VAL3 in all the imaging pixels P1 in the pixel array 9, and the image PIC4 on the basis of the pixel values VAL4 in all the imaging pixels P1 in the pixel array 9. Then, the image processing unit 41 synthesizes the four images PIC1 to PIC4 to generate the captured image PICA.

(Temperature Detection Operation)

In FIG. 13, for example, the blanking period T20 in the timing t11 to t12 is a so-called vertical blanking period, and the imaging device 1 does not perform the read drive D2. In other words, during this period, the signal line SGL does not transmit the pixel voltage VP related to the imaging pixel P1. The imaging device 1 performs temperature detection using the blanking period T20. Hereinafter, this temperature detection operation will be described in detail.

The AD conversion unit ADC of the reading unit 20 performs the AD conversion on the basis of the signal SIGT in a detection period M having the same length as the horizontal period H (FIG. 14) in the blanking period T20. In the detection period M, the reference signal generation unit 31 and the reading unit 20 perform a similar operation to the operation in the horizontal period H (FIG. 14). In the detection period M, the imaging control unit 30 changes the signal SSELT (FIG. 4) to the high level. With the change, in the reading unit 20, the transistor 29 becomes the ON state, and a signal corresponding to the signal SIGT generated by the temperature sensor 32 is supplied to the negative input terminal of the comparator 24 via the transistor 29 and the capacitive element 22, in each of the plurality of AD conversion units ADC. In this manner, the AD conversion unit ADC performs the AD conversion on the basis of the signal SIGT. In this example, the imaging device 1 performs the temperature detection in a period corresponding to the period of the timing t21 to t41 of the horizontal period H (FIG. 14).

FIG. 18 illustrates an example of the temperature detection operation in the imaging device 1. FIG. 18 corresponds to FIG. 15A illustrating the first half operation in the horizontal period H. In FIG. 18, (A) illustrates a waveform of the reference signal REF, (B) illustrates a waveform of the signal SIGT, (C) illustrates the operation of the counter 25 in the AD conversion unit ADC when the temperature is low, and (D) illustrates the operation of the counter 25 in the AD conversion unit ADC when the temperature is high. Timing t111 corresponds to the timing t11 in FIG. 15A, timing t112 corresponds to the timing t12 in FIG. 15A, timing t113 corresponds to the timing t13 in FIG. 15A, timing t141 corresponds to the timing t41 in FIG. 15A, and timing t151 corresponds to the timing t51 in FIG. 15A.

(Operation in Timing t121 to t131)

In a period of the timing t121 to t131, the switch SWT (FIG. 5) of the temperature sensor 32 selects the power supply voltage VDD, of the power supply voltage VDD and the voltage Vtemp. The temperature sensor 32 outputs the power supply voltage VDD thus selected as the signal SIGT. With the output, a voltage VDD2 corresponding to the power supply voltage VDD is supplied to the negative input terminal of the comparator 24 (FIG. 18(B)).

The comparator 24 performs the zero adjustment to electrically connect the positive input terminal and the negative input terminal in a period of timing t121 to t122. Next, at the timing t122, the comparator 24 terminates the zero adjustment and electrically disconnects the positive input terminal and the negative input terminal. Then, at the timing t122, the reference signal generation unit 31 changes the voltage of the reference signal REF to the voltage V1 (FIG. 18(A)).

Then, in a period of the timing t123 to t125 (conversion period TA), the AD conversion unit ADC performs the AD conversion on the basis of the voltage VDD2. This operation is similar to the operation in the conversion period T2 of the horizontal period H (FIG. 15A). The AD conversion unit ADC performs the AD conversion on the basis of the voltage VDD2, and the latch 26 of the AD conversion unit ADC outputs the count value CNT of the counter 25 as a digital code CODEA (FIGS. 18(C) and (D)).

(Operation in Timing t131 to t141)

In a period of the timing t131 to t141, the switch SWT (FIG. 5) of the temperature sensor 32 selects the voltage Vtemp, of the power supply voltage VDD and the voltage Vtemp. The temperature sensor 32 outputs the voltage Vtemp thus selected as the signal SIGT. With the output, a voltage Vtemp2 corresponding to the voltage Vtemp is supplied to the negative input terminal of the comparator 24 (FIG. 18(B)). The voltage Vtemp2 is high when the temperature is low and is low when the temperature is high.

Then, in a period of timing t132 to t135 (conversion period TB), the AD conversion unit ADC performs the AD conversion on the basis of the voltage Vtemp2. This operation is similar to the operation in the conversion period T3 of the horizontal period H (FIG. 15A). The AD conversion unit ADC performs the AD conversion on the basis of the voltage Vtemp2, and the latch 26 of the AD conversion unit ADC outputs the count value CNT of the counter 25 as a digital code CODEB (FIGS. 18(C) and (D)). A value indicated by the digital code CODEB (digital code CODEB2) in a case where the temperature is high is larger than a value indicated by the digital code CODEB (digital code CODEB1) in a case where the temperature is low.

Next, the processing in the temperature calculation unit 42 of the signal processing unit will be described.

First, the temperature calculation unit 42 calculates the digital value VALT on the basis of the digital codes CODEA and CODEB supplied from the reading unit 20. Specifically, the temperature calculation unit 42 subtracts the digital code CODEA from the digital code CODEB (CODEB-CODEA) to calculate the digital value VALT. In other words, the imaging device 1 calculates the digital value VALT using the digital code CODEA corresponding to pre-charge phase (P-phase) data and the digital code CODEB corresponding to data phase (D-phase) data using the principle of so-called correlated double sampling. In this manner, the temperature calculation unit 42 calculates a plurality of the digital values VALT on the basis of the digital codes CODEA and CODEB obtained from the plurality of AD conversion units ADC.

Next, the temperature calculation unit 42 performs the arithmetic processing on the basis of the digital value VALT to generate the temperature code TC1 that linearly changes with the change in temperature, as illustrated in (B) of FIG. 6. Specifically, the temperature calculation unit 42 divides the entire temperature range into a plurality of temperature ranges (two temperature ranges Trange1 and Trange2 in this example), and converts the digital values VALT into the temperature codes TC1, using linear functions having different slopes from each other in the plurality of respective temperature ranges. In this manner, the temperature calculation unit 42 generates the plurality of temperature codes TC1 on the basis of the plurality of digital values VALT obtained from the plurality of AD conversion units ADC.

Next, the temperature calculation unit 42 uses the calibration parameter PCAL stored in the storage unit 8 and shifts the temperature code TC1 by the value indicated by the calibration parameter PCAL, as illustrated in FIG. 7, to correct the temperature code TC1. In this manner, the temperature calculation unit 42 performs the correction processing for each of the plurality of temperature codes TC1 generated by the arithmetic processing.

Then, the temperature calculation unit 42 obtains the average value of the values indicated by the plurality of corrected temperature codes TC1 to generate one temperature code TC. For example, in a case where the value of a certain temperature code TC1 (temperature code TC1A) substantially deviates from the values of the plurality of temperature codes TC1 other than the temperature code TC1A, the temperature calculation unit 42 performs, for example, the interpolation operation using the temperature code TC1 related to the AD conversion unit ADC adjacent to the AD conversion unit ADCA related to the temperature code TC1A to correct the temperature code TC1A, as illustrated in FIG. 8A, for example. Then, the temperature calculation unit 42 obtains the average value of the values indicated by all the temperature codes TC1 including the corrected temperature code TC1A to generate one temperature code TC.

Furthermore, the temperature calculation unit 42 checks whether or not the value (temperature value) indicated by the temperature code TC obtained in this way falls within a predetermined range and makes the error flag signal ER active in a case where the value does not fall within the predetermined range.

(Calibration)

There is a possibility that the voltage Vtemp generated by the temperature sensor 32 varies due to so-called manufacturing variation of the imaging device 1. In this case, the temperature detection accuracy in the imaging device 1 is lowered. Therefore, in the imaging device 1, calibration is performed using the inspection system 100 illustrated in FIG. 10, for example. With the calibration, the temperature detection accuracy in the imaging device 1 can be improved. Hereinafter, calibration processing in the inspection system 100 will be described in detail.

FIG. 19 illustrates an example of the calibration processing in the inspection system 100.

First, the inspection device 110 sets the temperature of the wafer 101 to a predetermined temperature Ttemp (for example, 60 degrees) using the heater 113 and measures the actual temperature in the imaging device 1 to be calibrated using the thermocouple (step S101). Specifically, the inspection unit 112 brings the probe needles of the probe 111 into contact with the pad electrodes PAD (FIG. 9) and supplies the power supply voltage and various signals to the imaging device 1 of the wafer 101 via the probe 111 to operate the imaging device 1. Furthermore, the inspection unit 112 brings the probe needles 111A and 111B into contact with the two pad electrodes PAD2 to detect the difference between the potential in the probe needle 111A and the potential in the probe needle 111B (potential difference), and measures the actual temperature of the imaging device 1 on the basis of the potential difference.

Next, the inspection device 110 causes the storage unit 8 to store the temperature code TC generated by the imaging device 1 to be calibrated, and the information about the temperature measured using the thermocouple in step S101 (step S102). Then, the temperature calculation unit 42 of the imaging device 1 calculates the calibration parameter PCAL on the basis of the temperature code TC generated by the imaging device 1 and the temperature measured using the thermocouple stored in the storage unit 8 (step S103). The calibration parameter PCAL can indicate the temperature difference between, for example, the temperature indicated by the temperature code TC and the temperature measured using the thermocouple in step S101.

Therefore, the temperature calculation unit 42 of the imaging device 1 to be calibrated can correct, from then onward, the temperature code TC1 by shifting the temperature code TC1 by the value indicated by the calibration parameter PCAL, as illustrated in FIG. 7, for example, using the calibration parameter PCAL generated in step S103. Then, the temperature calculation unit 42 obtains the average value of the values indicated by the plurality of corrected temperature codes TC1 to generate the temperature code TC.

Next, the inspection device 110 acquires the temperature code TC generated by the imaging device 1 to be calibrated, and checks that the temperature difference between the temperature indicated by the temperature code TC and the temperature measured using the thermocouple in step S101 falls within an allowable range (step S104).

With the above steps, the flow ends.

As described above, in the imaging device 1, the terminal unit 204 in which the electrically connected two pad electrodes PAD2 are installed side by side is provided as illustrated in FIG. 9. With the configuration, in the imaging device 1, the two pad electrodes PAD2 are brought into contact with the thermocouple to measure the actual temperature. Therefore, the calibration can be performed on the basis of the measurement result, and thus the temperature detection accuracy can be improved.

Furthermore, in the imaging device 1, the terminal unit 204 is arranged near the temperature sensor 32. Specifically, as illustrated in FIG. 9, the distance between the terminal unit 204 and the temperature sensor 32 is made shorter than the distance between the terminal unit 204 and the reading unit 20. With the configuration, the arranged position of the temperature sensor 32 can be brought close to the place measured using the thermocouple. Therefore, the calibration can be performed with higher accuracy, and thus the temperature detection accuracy can be improved.

Furthermore, in the imaging device 1, as illustrated in FIGS. 6A and 6B, the temperature range detectable by the temperature sensor 32 is divided into the plurality of temperature ranges (two temperature ranges Trange1 and Trange2 in this example), and the different types of arithmetic processing are respectively performed in the plurality of temperature ranges. Specifically, in the imaging device 1, the digital value VALT is converted into the temperature code TC1, using the linear functions having different slopes from each other in the plurality of temperature ranges. With the operation, in the imaging device 1, the temperature code TC1 that linearly changes with the change in temperature can be generated, and the temperature detection accuracy can be improved.

Furthermore, in the imaging device 1, the temperature code TC1 is corrected by being shifted by the amount indicated by the calibration parameter PCAL, as illustrated in FIG. 7, using the calibration parameter PCAL. Therefore, the temperature detection accuracy can be improved.

Furthermore, in the imaging device 1, the temperature code TC is generated by obtaining the average value of the values indicated by the plurality of corrected temperature codes TC1. Therefore, for example, even in a case where some of the plurality of AD conversion units ADC has broken down, the influence due to the breakdown can be suppressed, and thus the temperature detection accuracy can be improved. Furthermore, for example, in the imaging device 1, in the case where the value of a certain temperature code TC1 (temperature code TC1A) substantially deviates from the values of the plurality of temperature codes TC1 other than the temperature code TC1A, the temperature code TC1A is corrected, for example, by performing the interpolation operation using the temperature code TC1 related to the AD conversion unit ADC adjacent to the AD conversion unit ADCA related to the temperature code TC1A, as illustrated in FIG. 8A. Therefore, the temperature detection accuracy can be improved.

Effects

In the above-described present embodiment, the terminal unit in which the electrically connected two pad electrodes are installed side by side is provided. Therefore, the actual temperature can be measured using the thermocouple and the calibration can be performed on the basis of the measurement result, and thus the temperature detection accuracy can be improved.

In the present embodiment, the terminal unit 204 is arranged near the temperature sensor. Therefore, the calibration can be performed with higher accuracy, and the temperature detection accuracy can be improved.

In the present embodiment, the temperature range detectable by the temperature sensor is divided into the plurality of temperature ranges, and the different types of arithmetic processing are respectively performed in the plurality of temperature ranges. Therefore, the temperature code that linearly changes with the change in temperature can be generated, and thus the temperature detection accuracy can be improved.

In the present embodiment, the temperature code is corrected using the calibration parameter, and therefore the temperature detection accuracy can be improved.

In the present embodiment, the temperature code TC is generated by obtaining the average value of the values indicated by the plurality of corrected temperature codes TC1. Therefore, for example, even in a case where some of the plurality of AD conversion units has broken down, the influence due to the breakdown can be suppressed, and thus the temperature detection accuracy can be improved.

First Modification

In the above-described embodiment, the temperature sensor 32 directly supplies the signal SIGT to the AD conversion unit ADC of the reading unit 20, as illustrated in FIGS. 4 and 5. However, the embodiment is not limited to the example. In place of the case, for example, a signal SIGT may be supplied to an AD conversion unit of a reading unit via a pixel array. Hereinafter, the present modification will be described in detail by giving some examples.

FIG. 20 illustrates a configuration example of an imaging device 1A according to the present modification. The imaging device 1A includes a pixel array 9A, a reading unit 20A, and an imaging control unit 30A.

The pixel array 9A is provided with an imaging pixel region RG1 and a dummy pixel region RG2. A plurality of imaging pixels P1 is arranged in the imaging pixel region RG1. A plurality of dummy pixels P2 of one row is arranged in the dummy pixel region RG2. In this example, the dummy pixel region RG2 is arranged above the imaging pixel region RG1 in a vertical direction (vertical direction in FIG. 20).

FIG. 21 illustrates a configuration example of the dummy pixel P2 in the dummy pixel region RG2. The pixel array 9A includes a control line SIGTL and a control line SELL in the dummy pixel region RG2. The control line SIGTL extends in a horizontal direction (cross direction in FIG. 21), and a signal SIGT is applied to the control line SIGTL by a temperature sensor 32 of the imaging control unit 30A. The control line SELL extends in the horizontal direction, and a signal SSEL is applied to the control line SELL by a scanning unit 10.

The dummy pixel P2 includes transistors AMP and SEL. A gate of the transistor AMP is connected to the control line SIGTL, a power supply voltage VDD is supplied to a drain of the transistor AMP, and a source of the transistor AMP is connected to a drain of the transistor SEL. A gate of the transistor SEL is connected to the control line SELL, the drain of the transistor SEL is connected to the source of the transistor AMP, and a source of the transistor SEL is connected to a signal line SGL. With the configuration, in the dummy pixel P2, the transistor AMP outputs a signal SIG according to a voltage of the signal SIGT to the signal line SGL via the transistor SEL as the transistor SEL becomes an ON state.

FIG. 22 illustrates a configuration example of the reading unit 20A. The reading unit 20A includes a plurality of AD conversion units ADC2 (AD conversion units ADC2[0], ADC2[1], ADC2[2], . . . ). The AD conversion unit ADC2 is obtained by omitting the transistors 28 and 29 from the AD conversion unit ADC (FIG. 4) according to the above embodiment. This transistor 28 corresponds to the transistor AMP in the dummy pixel P2 (FIG. 21), and the transistor 29 corresponds to the transistor SEL in the dummy pixel P2.

The imaging control unit 30A (FIG. 20) supplies control signals to the scanning unit 10, the reading unit 20A, and a signal processing unit 40 to control operations of these circuits to control operation of the imaging device 1A. The temperature sensor 32 of the imaging control unit 30A applies the generated signal SIGT to the control line SIGTL in the dummy pixel region RG2 of the pixel array 9A to supply the signal SIGT to the plurality of dummy pixels P2.

With the configuration, in the imaging device 1A, temperature detection can be performed by operating the dummy pixels P2 using a blanking period T20, similarly to the imaging device 1 according to the above embodiment.

FIG. 23 illustrates a configuration example of another imaging device 1B according to the present modification.

The imaging device 1B includes a pixel array 9B, a reading unit 20A, an imaging control unit 30B, and a signal processing unit 40B.

The pixel array 9B is provided with an imaging pixel region RG1 and a dummy pixel region RG3. In the dummy pixel region RG3, a plurality of dummy pixels P2 of one column is arranged. In this example, the dummy pixel region RG3 is arranged on the left in a horizontal direction (cross direction in FIG. 23) of the imaging pixel region RG1.

The imaging control unit 30B supplies control signals to a scanning unit 10, the reading unit 20A, and the signal processing unit 40B to control operations of these circuits to control operation of the imaging device 1B. A temperature sensor 32 of the imaging control unit 30B supplies a generated signal SIGT to the plurality of dummy pixels P2 in the dummy pixel region RG3 of the pixel array 9B.

The signal processing unit 40B includes a temperature calculation unit 42B. The temperature calculation unit 42B generates a temperature code TC indicating a temperature value on the basis of a digital code CODE obtained on the basis of the signal SIGT included in image signal DATA0. Specifically, the temperature calculation unit 42B performs arithmetic processing on the basis of a digital value VALT obtained from an AD conversion unit ADC to generate a temperature code TC1 that linearly changes with change in temperature. Then, the temperature calculation unit 42B performs correction processing for the temperature code TC1 on the basis of a calibration parameter PCAL (described below) stored in a storage unit 8 to generate the temperature code TC.

With the configuration, in the imaging device 1B, temperature detection can be performed while a capture operation is performed in a period other than a blanking period T20.

Second Modification

In the above embodiment, as illustrated in FIG. 9, the imaging device 1 has been formed on one semiconductor substrate 200. However, the embodiment is not limited to the example. In place of the embodiment, an imaging device may be formed on a plurality of (two in this example) semiconductor substrates (semiconductor substrates 301 and 302) as in an imaging device 1C illustrated in FIG. 24, for example. In this example, the semiconductor substrate 301 and the semiconductor substrate 302 are overlaid and connected to each other via a plurality of vias 303. A pixel array 9 can be formed on the semiconductor substrate 301, for example. Furthermore, a scanning unit 10, a reading unit 20, an imaging control unit 30, and a signal processing unit 40 can be formed on the semiconductor substrate 302. For example, a plurality of control lines TGLL, FDGL, RSTL, FCGL, TGSL, and SELL in the semiconductor substrate 301 is connected to the scanning unit 10 in the semiconductor substrate 302 via a plurality of vias 303A. Furthermore, for example, a plurality of signal lines SGL in the semiconductor substrate 301 is connected to the reading unit 20 in the semiconductor substrate 302 via a plurality of vias 303B. Note that arrangement of the circuits is not limited to the example, and the scanning unit 10 may be formed on the semiconductor substrate 301, for example.

FIG. 25 illustrates an example of the circuit arrangement on the semiconductor substrate 302. A peripheral circuit unit 311 is formed in the vicinity of the center of the semiconductor substrate 302. This peripheral circuit unit 311 corresponds to the imaging control unit 30 and the signal processing unit 40. Then, in FIG. 25, the scanning unit 10 is formed on the left of the peripheral circuit unit 311, and the reading unit 20 is formed above the peripheral circuit unit 311. Furthermore, a terminal unit 312 in which a plurality of pad electrodes PAD is installed side by side is provided on a left end of the semiconductor substrate 302. Similarly, a terminal unit 313 in which a plurality of pad electrodes PAD is installed side by side is provided on a right end of the semiconductor substrate 302. A temperature sensor 32 is formed in a region where the peripheral circuit unit 311 is formed.

A terminal unit 314 in which two pad electrodes PAD2 are installed side by side is provided below the peripheral circuit unit 311. The terminal unit 314 is desirably arranged near the temperature sensor 32. Specifically, the distance between the terminal unit 314 and the temperature sensor 32 is desirably shorter than the distance between the terminal unit 314 and the reading unit 20, as illustrated in FIG. 25.

Third Modification

In the above embodiment, the two photodiodes PD1 and PD2 have been provided in each of the plurality of imaging pixels P11. However, the embodiment is not limited to the example. Hereinafter, an imaging device 2 according to the present modification will be described in detail.

FIG. 26 illustrates a configuration example of the imaging device 2. The imaging device 2 includes a pixel array 59, a scanning unit 50, a reading unit 20, an imaging control unit 60, and a signal processing unit 70.

In the pixel array 59, a plurality of imaging pixels P11 is arranged in a matrix manner.

FIG. 27 illustrates a configuration example of the imaging pixel P11. The pixel array 59 includes a plurality of control lines TGLL, a plurality of control lines RSTL, a plurality of control lines SELL, and a plurality of signal lines SGL. The control line TGLL extends in a horizontal direction (cross direction in FIG. 26), and a signal STG is applied to the control line TGLL by the scanning unit 50. The control line RSTL extends in the horizontal direction, and a signal SRST is applied to the control line RSTL by the scanning unit 50. The control line SELL extends in the horizontal direction, and a signal SSEL is applied to the control line SELL by the scanning unit 50. The signal line SGL extends in a vertical direction (vertical direction in FIG. 27) and is connected to the reading unit 20.

The imaging pixel P11 includes a photodiode PD, a transistor TG, a transistor RST, a floating diffusion FD, and transistors AMP and SEL. The transistors TG, RST, and SEL are N-type MOS transistors in this example. The photodiode PD is a photoelectric conversion element that generates an amount of electric charges according to the amount of received light and accumulates the electric charges. An anode of the photodiode PD is grounded, and a cathode is connected to a source of the transistor TG. A gate of the transistor TG is connected to the control line TGLL, the source of the transistor TG is connected to the cathode of the photodiode PD, and a drain of the transistor TG is connected to the floating diffusion FD. A gate of the transistor RST is connected to the control line RSTL, a power supply voltage VDD is supplied to a drain of the transistor RST, and a source of the transistor RST is connected to the floating diffusion FD.

With this configuration, in the imaging pixel P11, the transistor SEL becomes an ON state on the basis of a signal SSEL applied to the control line SELL, so that the imaging pixel P11 is electrically connected to the signal line SGL. Then, the imaging pixel P11 outputs a pixel voltage VP according to a voltage at the floating diffusion FD as a signal SIG to the signal line SGL. Specifically, as will be described below, the imaging pixel P11 sequentially outputs two pixel voltages VP (VP11 and VP12) in two periods (a P-phase period TP and a D-phase period TD) within a so-called horizontal period H.

FIG. 28 illustrates an example of arrangement of the photodiodes PD. In FIG. 28, "R" represents a red color filter, "G" represents a green color filter, and "B" represents a blue color filter. The photodiodes PD are arranged in a matrix manner.

The scanning unit 50 (FIG. 26) sequentially drives the imaging pixels P11 in the pixel array 59 in units of pixel line L on the basis of an instruction from the imaging control unit 60. The scanning unit 50 includes an address decoder 11, a logic unit 52, and a driver unit 53. The logic unit 52 generates signals STG1, SRST1, and SSEL1 corresponding to the pixel lines L, respectively, on the basis of an instruction from the address decoder 11. The driver unit 53 generates signals STG, SRST, and SSEL corresponding to the pixel lines L on the basis of the signals STG1, SRST1, and SSEL1 corresponding to the pixel lines L, respectively.

The imaging control unit 60 (FIG. 26) supplies control signals to the scanning unit 50, the reading unit 20, and the signal processing unit 70 to control operations of these circuits to control operation of the imaging device 2. The imaging control unit 60 includes a reference signal generation unit 61. The reference signal generation unit 61 generates a reference signal REF. The reference signal REF has the so-called ramp waveform in which the voltage level gradually decreases over time in the two periods (the P-phase period TP and the D-phase period TD) in which the AD conversion is performed.

The signal processing unit 70 includes an image processing unit 71. The image processing unit 71 performs predetermined image processing for an image indicated by image signal DATA0.

In the imaging device 2, accumulation start drive D1 and read drive D2 are performed similarly to the case of the imaging device 1 (FIG. 13).

FIG. 29 illustrates an operation example of the imaging device 2, (A) illustrates a waveform of a horizontal synchronization signal XHS, (B) illustrates a waveform of a signal SRST(0) in a control line RSTL(0) related to the 0th pixel line L, (C) illustrates a waveform of a signal STG(0) in a control line TGLL(0) related to the 0th pixel line L, (D) illustrates a waveform of a signal SSEL(0) in a control line SELL(0) related to the 0th pixel line L, (E) illustrates a waveform of a signal SRST(1) in a control line RSTL (1) related to the 1st pixel line L, (F) illustrates a waveform of a signal STG(1) in a control line TGLL(1) related to the 1st pixel line L, (G) illustrates a waveform of a signal SSEL(1) in a control line SELL(1) related to the 1st pixel line L, (H) illustrates a waveform of a signal SRST(2) in a control line RSTL(2) related to the 2nd pixel line L, (I) illustrates a waveform of a signal STG(2) in a control line TGLL(2) related to the 2nd pixel line L, and (J) illustrates a waveform of a signal SSEL(2) in a control line SELL(2) related to the 2nd pixel line L.

In the accumulation start drive D1, the scanning unit 50 sets the transistors TG and RST to an ON state in a predetermined period within the horizontal period H in units of pixel line L in order from the top in the vertical direction, for example. As a result, electric charges are accumulated in the plurality of imaging pixels P in an accumulation period T10 until the read drive D2 is performed.

Then, in the read drive D2, the scanning unit 50 controls the operations of the transistors TG, RST, and SEL in units of pixel line L in order from the top in the vertical direction, for example. With the control, each of the plurality of pixels P sequentially outputs two pixel voltages VP (VP11 and VP12). The reading unit 20 performs AD conversion on the basis of each of the two pixel voltages VP11 and VP12 to output a digital code CODE.

FIG. 30 illustrates an operation example of the read drive D2 in a focused imaging pixel P11A, and (A) illustrates a waveform of the horizontal synchronization signal XHS, (B) illustrates a waveform of the signal SRST, (C) illustrates a waveform of the signal STG, (D) illustrates a waveform of the signal SSEL, (E) illustrates a waveform of the reference signal REF, (F) illustrates a waveform of the signal SIG, (G) illustrates a waveform of a signal CMP output from a comparator 24 of an AD conversion unit ADC, (H) illustrates a waveform of a clock signal CLK, and (I) illustrates a count value CNT in a counter 25 of the AD conversion unit ADC. Here, the reference signal REF in FIG. 30(E) illustrates a waveform in a positive input terminal of the comparator 24, and the signal SIG in FIG. 30(F) illustrates a waveform in a negative input terminal of the comparator 24.

In the imaging device 2, in a certain horizontal period (H), the scanning unit 50 first performs a reset operation of the imaging pixel PHA, and the AD conversion unit ADC performs AD conversion on the basis of the pixel voltage VP11 output by the imaging pixels PHA in the subsequent P-phase period TP. Then, the scanning unit 50 performs an electric charge transfer operation for the imaging pixel PHA, and the AD conversion unit ADC performs AD conversion on the basis of the pixel voltage VP12 output by the imaging pixel PHA in the D-phase period TD. This operation will be described in detail below.

First, when the horizontal period H starts at timing t91, the scanning unit 50 changes the voltage of the signal SSEL from a low level to a high level at timing t92 (FIG. 30(D)). With the change, in the imaging pixel PHA, the transistor SEL becomes the ON state, and the imaging pixel PHA is electrically connected to the signal line SGL.

Next, at timing t93, the scanning unit 50 changes the voltage of the signal SRST from the low level to the high level (FIG. 30(B)). With the change, in the imaging pixel PHA, the transistor RST becomes the ON state, and the voltage of the floating diffusion FD is set to the power supply voltage VDD (reset operation).

Next, at timing t94, the scanning unit 50 changes the voltage of the signal SRST from the high level to the low level (FIG. 30(B)). With the change, in the imaging pixel P11A, the transistor RST becomes an OFF state. Then, the comparator 24 performs zero adjustment to electrically connect the positive input terminal and the negative input terminal in a period of timing t94 to t95.

Next, at timing t95, the comparator 24 terminates the zero adjustment and electrically disconnects the positive input terminal and the negative input terminal. Then, at the timing t95, the reference signal generation unit 61 changes the voltage of the reference signal REF to a voltage V1 (FIG. 30(E)).

With the change, in the imaging pixel PHA, the transistor SEL becomes the ON state and the transistors TG and RST become the OFF state. The floating diffusion FD holds the electric charge of when the floating diffusion FD has been reset in the period of timing t93 to t94. The imaging pixel PHA outputs a pixel voltage VP (pixel voltage VP11) corresponding to the voltage at the floating diffusion FD at this time.

Next, in a period of timing t96 to t98 (P-phase period TP), the reading unit 20 performs AD conversion on the basis of the pixel voltage VP11. Specifically, at the timing t96, the imaging control unit 60 first starts generating the clock signal CLK (FIG. 30(H)), and at the same time, the reference signal generation unit 61 starts decreasing the voltage of the reference signal REF from the voltage V1 at a predetermined change degree (FIG. 30(E)). In response to the change, the counter 25 of the AD conversion unit ADC starts a count operation and sequentially changes the count value CNT (FIG. 30(I)).

Then, at the timing t97, the voltage of the reference signal REF goes below the pixel voltage VP11 (FIGS. 30(E) and (F)). In response to the change, the comparator 24 of the AD conversion unit ADC changes the voltage of the signal CMP from the high level to the low level (FIG. 30(G)). As a result, the counter 25 stops the count operation (FIG. 30(I)).

Next, at the timing t98, the imaging control unit 60 stops generation of the clock signal CLK with the end of the P-phase period TP (FIG. 30(H)). At the same time, the reference signal generation unit 61 stops the voltage change of the reference signal REF, and at subsequent timing t99, the reference signal generation unit 61 changes the voltage of the reference signal REF to a voltage V1 (FIG. 30(E)). With the change, the voltage of the reference signal REF exceeds the pixel voltage VP11 (FIGS. 30(E) and (F), and thus the comparator 24 of the AD conversion unit ADC changes the voltage of the signal CMP from the low level to the high level (FIG. 30(G)).

Next, at timing t100, the counter 25 of the AD conversion unit ADC inverts polarity of the count value CNT on the basis of a control signal CC (FIG. 30(I)).

Next, at timing t101, the scanning unit 50 changes the voltage of the signal STG from the low level to the high level (FIG. 30(C)). With the change, in the imaging pixel P11A, the transistor TG becomes the ON state. As a result, the electric charge generated in the photodiode PD is transferred to the floating diffusion FD (charge transfer operation). In response to the transfer, the voltage of the signal SIG is lowered (FIG. 30(F)).

Then, at timing t102, the scanning unit 50 changes the voltage of the signal STG from the high level to the low level (FIG. 30(C)). With the change, in the imaging pixel PHA, the transistor TG becomes the OFF state.

With the change, in the imaging pixel PHA, the transistor SEL becomes the ON state and the transistors TG and RST become the OFF state. The floating diffusion FD holds the electric charge transferred from the photodiode PD in the period of timing t101 to t102. The imaging pixel PHA outputs a pixel voltage VP (pixel voltage VP12) corresponding to the voltage at the floating diffusion FD at this time.

Next, in a period of timing t103 to t105 (D-phase period TD), the reading unit 20 performs the AD conversion on the basis of the pixel voltage VP12. Specifically, at the timing t103, the imaging control unit 60 first starts generating the clock signal CLK (FIG. 30(H)), and at the same time, the reference signal generation unit 61 starts decreasing the voltage of the reference signal REF from the voltage V1 at a predetermined change degree (FIG. 30(E)). In response to the change, the counter 25 of the AD conversion unit ADC starts a count operation and sequentially changes the count value CNT (FIG. 30(I)).

Then, at the timing t104, the voltage of the reference signal REF goes below the pixel voltage VP12 (FIGS. 30(E) and (F)). In response to the change, the comparator 24 of the AD conversion unit ADC changes the voltage of the signal CMP from the high level to the low level (FIG. 30(G)). As a result, the counter 25 stops the count operation (FIG. 30(I)). In this manner, the AD conversion unit ADC obtains the count value CNT according to the difference between the pixel voltages VP11 and VP12 Then, the latch 26 of the AD conversion unit ADC outputs the count value CNT as a digital code CODE.

Next, at the timing t105, the imaging control unit 60 stops generation of the clock signal CLK with the end of the D-phase period TD (FIG. 30(H)). At the same time, the reference signal generation unit 61 stops the voltage change of the reference signal REF, and at subsequent timing t106, the reference signal generation unit 61 changes the voltage of the reference signal REF to a voltage V2 (FIG. 30(E)). With the change, the voltage of the reference signal REF exceeds the pixel voltage VP12 (FIGS. 30(E) and (F)), and thus the comparator 24 of the AD conversion unit ADC changes the voltage of the signal CMP from the low level to the high level (FIG. 30(G)).

Next, at timing t107, the scanning unit 50 changes the voltage of the signal SSEL from the high level to the low level (FIG. 30(D)). With the change, in the imaging pixel P11A, the transistor SEL becomes the OFF state, and the imaging pixel P11A is electrically disconnected from the signal line SGL.

Then, at timing t108, the counter 25 of the AD conversion unit ADC resets the count value CNT to "0" on the basis of the control signal CC (FIG. 30(I)).

As described above, in the imaging device 2, the count operation is performed on the basis of the pixel voltage VP11 in the P-phase period TP and the polarity of the count value CNT is inverted, and then, the count operation is performed on the basis of the pixel voltage VP12 in the D-phase period TD. With the operation, the imaging device 2 can acquire the digital code CODE according to the difference voltage between the pixel voltages VP11 and VP12. In the imaging device 2, since such correlated double sampling is performed, noise components included in the pixel voltage VP12 can be removed, and as a result, the image quality of a captured image can be enhanced.

The imaging device 2 performs temperature detection using a blanking period T20, similarly to the imaging device 1 according to the above-described embodiment. Specifically, the AD conversion unit ADC of the reading unit 20 performs the AD conversion on the basis of the signal SIGT in a detection period M having the same length as the horizontal period H (FIG. 30) in the blanking period T20. In the detection period M, the reference signal generation unit 61 and the reading unit 20 perform a similar operation to the operation in the horizontal period H (FIG. 30). In the detection period M, the imaging control unit 30 changes the signal SSELT (FIG. 4) to the high level. With the change, in the reading unit 20, the transistor 29 becomes the ON state, and a signal corresponding to the signal SIGT generated by the temperature sensor 32 is supplied to the negative input terminal of the comparator 24 via the transistor 29 and the capacitive element 22, in each of the plurality of AD conversion units ADC. Then, the AD conversion unit ADC performs the AD conversion on the basis of a voltage VDD2 in the signal SIGT in the P-phase period TP and performs the AD conversion on the basis of a voltage Vtemp2 in the signal SIGT in the D-phase period TD to generate the digital code CODE, similarly to the above-described embodiment (FIG. 18).

A temperature calculation unit 42 uses the digital code CODE as a digital value VALT, and performs arithmetic processing on the basis of the digital value VALT, as illustrated in (B) of FIG. 6, to generate a temperature code TC1 that linearly changes with change in temperature. In this manner, the temperature calculation unit 42 generates a plurality of the temperature codes TC1 on the basis of the plurality of digital values VALT obtained from the plurality of AD conversion units ADC.

Next, the temperature calculation unit 42 uses the calibration parameter PCAL stored in the storage unit 8 and shifts the temperature code TC1 by the value indicated by the calibration parameter PCAL, as illustrated in FIG. 7, to correct the temperature code TC1. In this manner, the temperature calculation unit 42 performs the correction processing for each of the plurality of temperature codes TC1 generated by the arithmetic processing.

Then, the temperature calculation unit 42 obtains the average value of the values indicated by the plurality of corrected temperature codes TC1 to generate the temperature code TC.

Fourth Modification

In the above-described embodiment, the plurality pixels connected to the same control lines TGLL, FDGL, RSTL, FCGL, TGSL, and SELL is installed side by side in the horizontal direction in the pixel array 9, for example. However, the embodiment is not limited to the example. In place of the embodiment, for example, a plurality of (four in this example) pixels connected to the same control lines TGLL, FDGL, RSTL, FCGL, TGSL, and SELL may be installed up and down in a vertical direction, as in an imaging device 1D illustrated in FIG. 31. The imaging device 1D includes a pixel array 9D, a scanning unit 10D, reading units 20D1 and 20D2, an imaging control unit 30D, and a signal processing unit 40D. Even-numbered (0th, 2nd, 4th, . . . ) signal lines SGL of the pixel array 9D are connected to the reading unit 20D1, and odd-numbered (1st, 3rd, 5th, . . . ) signal lines SGL of the pixel array 9D are connected to the reading unit 20D2. The control lines TGLL, FDGL, RSTL, FCGL, TGSL, and SELL are connected to the scanning unit 10D. In this example, four pixels P connected to the same control lines TGLL, FDGL, RSTL, FCGL, TGSL, and SELL are installed up and down in the vertical direction (vertical direction in FIG. 31). The scanning unit 10D includes a logic unit 12D and a driver unit 13D. The reading unit 20D1 performs AD conversion on the basis of a signal SIG supplied from the pixel array 9D via the even-numbered signal line SGL to generate an image signal DATAD1. The reading unit 20D2 performs AD conversion on the basis of a signal SIG supplied from the pixel array 9D via the odd-numbered signal line SGL to generate an image signal DATAD2. The signal processing unit 40D performs signal processing for images indicated by the image signals DATAD1 and DATAD2.

Fifth Modification

In the above-described embodiment, the AD conversion units ADC are connected to the plurality of pixels P of one column in the pixel array 9. However, the embodiment is not limited to the example. In place of the embodiment, for example, AD conversion units ADC may be connected to a plurality of imaging pixels P1 belonging to a predetermined area, as in an imaging device 1E illustrated in FIG. 32. The imaging device 1E is formed on two semiconductor substrates 401 and 402. A pixel array 9 is formed on the semiconductor substrate 401. The pixel array 9 is divided into a plurality (21 in this example) of areas AR, and each area AR includes a plurality of (160 in this example) imaging pixels P1. A reading unit 20 is formed on the semiconductor substrate 402. Specifically, on the semiconductor substrate 402, an AD conversion unit ADC to be connected to the plurality of imaging pixels P1 belonging to an area AR is formed in each of a plurality of regions corresponding to the plurality of areas AR on the semiconductor substrate 401. The semiconductor substrate 401 and the semiconductor substrate 402 are overlaid and are electrically connected to each other by a connection portion 403 using, for example, Cu—Cu connection. Note that, in this example, the pixel array 9 is divided into 21 areas AR, but the modification is not limited to this example. In place of the example, the pixel array 9 may be divided into 20 or less areas AR, or 22 or more areas AR, for example. Furthermore, in this example, 160 imaging pixels P1 are provided in each area AR. However, the modification is not limited to the example. In place of this example, 159 or less imaging pixels P1, or 161 or more imaging pixels P1 may be provided, for example.

Other Modifications

Furthermore, two or more of these modifications may be combined.

2. Use Example of Imaging Device

FIG. 33 illustrates use examples of the imaging device 1 and the like according to the above embodiments. The above-described imaging device 1 and the like can be used in various cases of sensing light such as visible light, infrared light, ultraviolet light, and an X-rays as described below.

- Devices that capture images provided for appreciation, such as digital cameras, and portable devices with a camera function
- Devices provided for transportation, such as in-vehicle sensors that capture the front, rear, peripheries, an interior of the vehicle, etc. for safe driving such as automatic stop, recognition of a state of a driver, or the like, monitoring cameras that monitor traveling vehicles and roads, distance measuring sensors that measure a distance between vehicles, and the like
- Devices provided for home appliances such as televisions, refrigerators, and air conditioners to capture gestures of users and perform device operations according to the gestures
- Devices provided for medical and healthcare, such as endoscopes, and devices that perform angiography by receiving infrared light
- Devices provided for security, such as monitoring cameras for crime prevention and cameras for person authentication use
- Devices for beauty, such as skin measuring instruments that captures skin and microscopes that captures scalp
- Devices provided for sports or the like, such as action cameras and wearable cameras for sport use
- Devices provided for agriculture, such as cameras for monitoring the condition of fields and crops

3. Application Example to Mobile Body

The technology according to the present disclosure (present technology) can be applied to various products. For example, the technology according to the present disclosure may be realized as a device mounted on any type of moving bodies including an automobile, an electric automobile, a hybrid electric automobile, an electric motorcycle, a bicycle, a personal mobility, an airplane, a drone, a ship, a robot and the like.

FIG. 34 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 34, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle and the like.

The body system control unit 12020 controls operations of devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters or the like on a road surface on the basis of the received image.

The imaging unit 12031 is an optical sensor that receives light and outputs an electrical signal according to the amount of received light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether the driver falls asleep on the basis of the detection information input from the driver state detection unit 12041.

The microcomputer 12051 calculates a control target value of the drive power generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle and the like.

Furthermore, the microcomputer 12051 controls the drive power generation device, the steering mechanism, the braking device or the like on the basis of the information of a vicinity of the vehicle acquired in the vehicle exterior information detection unit 12030 or the vehicle interior information detection unit 12040 to perform cooperative control for the purpose of automatic driving of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify information to a passenger of the vehicle or an outside of the vehicle. In the example in FIG. 34, as the output device, an audio speaker 12061, a display unit 12062, and an instrument panel 12063 are exemplarily illustrated. The display unit 12062 may include, for example, at least one of an on-board display and a head-up display.

FIG. 35 is a diagram illustrating an example of an installation position of the imaging unit 12031.

In FIG. 35, a vehicle 12100 includes, as the imaging unit 12031, imaging units 12101, 12102, 12103, 12104, and 12105.

The imaging units 12101, 12102, 12103, 12104, and 12105 are provided at positions such as a front nose, side mirrors, a rear bumper or a back door, and an upper portion of a windshield in an interior of the vehicle 12100, for example. The imaging unit 12101 provided at the front nose and the imaging unit 12105 provided at an upper portion of the windshield in an interior of the vehicle mainly acquire front images of the vehicle 12100. The imaging units 12102 and 12103 provided at the side mirrors mainly acquire side images of the vehicle 12100. The imaging unit 12104 provided at the rear bumper or the back door mainly acquires a rear image of the vehicle 12100. The front images acquired in the imaging units 12101 and 12105 are mainly used for detection of a leading vehicle, a pedestrian, an obstacle, a traffic light, a traffic sign, a lane or the like.

Note that FIG. 35 illustrates an example of imaging ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured in the imaging units 12101 to 12104.

At least one of the imaging units 12101 to 12104 may have a function to acquire distance information. For example, at least one of the imaging units 12101 to 12104 may be a stereo camera including a plurality of imaging elements or may be an imaging element having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic driving of autonomous travel without depending on an operation of the driver or the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. Then, the microcomputer 12051 then determines a collision risk indicating a risk of collision with each of the obstacles, and can perform drive assist for collision avoidance by outputting a warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. The recognition of a pedestrian is performed by a process of extracting characteristic points in the captured images of the imaging units 12101 to 12104, as the infrared camera, for example, and by a process of performing pattern matching processing for the series of characteristic points indicating a contour of an object and discriminating whether or not the object is a pedestrian. When the microcomputer 12051 determines that a pedestrian exists in the captured images of the imaging units 12101 to 12104 and recognizes the pedestrian, the sound image output unit 12052 controls the display unit 12062 to superimpose and display a square contour line for emphasis on the recognized pedestrian. Furthermore, the sound image output unit 12052 may control the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations. With the application, the vehicle control system 12000 can detect whether or not the temperature in the imaging unit 12031 is normal. Then, in a case where the temperature is abnormal, for example, the vehicle control system 12000 can grasp that trouble has occurred in the imaging unit 12031 by notifying the detection result to the microcomputer 12051. With the notification, the vehicle control system 12000 can perform appropriate processing such as calling the driver's attention, thereby to enhance the reliability. Furthermore, the vehicle control system 12000 can restrict the function to control the vehicle on the basis of the detection result. Specific examples of the function to control the vehicle include a vehicle collision avoidance or collision mitigation function, a following travel function based on the inter-vehicle distance, a vehicle speed maintaining travel function, a vehicle collision warning function, a vehicle lane out warning function, and the like. In a case where the temperature in the imaging unit 12031 is determined to be abnormal, the function to control the vehicle can be restricted or prohibited. Specifically, the vehicle control system 12000 can control the brake, the engine output, and the transmission. With the control, the vehicle control system 12000 can prevent accidents caused by erroneous detection based on the fact that the temperature in the imaging unit 12031 is abnormal.

Furthermore, for example, in a case where the vehicle control system 12000 includes two redundant imaging units 12031 (imaging units 12031A and 12031B) and in a case where the temperature of one imaging unit 12031A is determined to be abnormal and trouble of the imaging unit 12031A is suspected, the other imaging unit 12031B may be operated. Furthermore, for example, in a case where the vehicle control system 12000 includes a distance measuring unit (for example, a light detection and ranging (LIDAR) device or a time of flight (TOF) image sensor) that detects the distance to an object, in addition to the imaging unit 12031, the distance measuring unit may be operated in a case where the temperature in the imaging unit 12031 is determined to be abnormal. In this case, since at least the distance to the object can be detected, the accidents caused by erroneous detection based on abnormality of the temperature in the imaging unit 12031 can be prevented.

Although the present technology has been described with reference to the embodiments, modifications, and specific application examples, the present technology is not limited to these embodiments and the like, and various modifications can be made.

For example, in the imaging device 1, the reading unit 20 outputs the digital codes CODE2 and CODE3, and the image processing unit 41 subtracts the digital code CODE2 from the digital code CODE3 (CODE3–CODE2) to calculate the pixel value VAL1, as illustrated in FIG. 17. However, an embodiment is not limited to the example. In place of the above process, the reading unit 20 may invert the polarity of the count value CNT after the conversion period T2 to output the digital code CODE corresponding to the difference between the digital codes CODE2 and CODE3, similarly to the case (FIG. 30) of the imaging device 2 according to the third modification. This process is similarly applied to the digital codes CODE5 and CODE6, and also to the digital codes CODE7 and CODE8, and also to the digital codes CODEA and CODEB.

Furthermore, for example, in the imaging device 1, the reading unit 20 outputs the digital codes CODE1 and CODE4, and the image processing unit 41 subtracts the digital code CODE1 from the digital code CODE4 (CODE4−CODE1) to calculate the pixel value VAL2, as illustrated in FIG. 12. However, an embodiment is not limited to the example. In place of the process, the reading unit 20 may temporarily store the count value CNT at that time after the conversion period T1, set the count value CNT to the counter 25 before the conversion period T4, and invert the polarity of the count value CNT. Even in this case, as in the case (FIG. 30) of the imaging device 2 according to the second embodiment, the reading unit 20 can output the digital code CODE corresponding to the difference between the digital codes CODE1 and CODE4.

Furthermore, for example, the imaging device 1 is not limited to the configuration illustrated in FIG. 1 and the like and may be modified as appropriate. Similarly, for example, the imaging device 2 is not limited to the configuration illustrated in FIG. 26 and the like and may be modified as appropriate.

Note that the effects described in this specification are merely examples and are not limited, and other effects may be exhibited.

Note that the present technology can have the following configurations.

(1) An imaging device including:
a processing unit formed on a first semiconductor substrate and capable of performing predetermined image processing on the basis of image data obtained by an imaging unit;
a temperature sensor formed on the first semiconductor substrate and capable of generating a detection signal according to a temperature; and
a first pad electrode formed on the first semiconductor substrate and electrically insulated from a circuit formed on the first semiconductor substrate.

(2) The imaging device according to (1), in which
the temperature sensor is formed in a region in which the processing unit is formed, the region being of the first semiconductor substrate.

(3) The imaging device according to (1) or (2), further including:
a conversion unit formed on the first semiconductor substrate, in which
the imaging unit has an imaging pixel,
the conversion unit is capable of generating the image data by performing AD conversion on the basis of a pixel signal supplied from the imaging pixel, and
a distance between the first pad electrode and the temperature sensor is shorter than a distance between the first pad electrode and the conversion unit.

(4) The imaging device according to any one of (1) to (3), further including:
a plurality of input/output pad electrodes installed side by side in a peripheral region of the first semiconductor substrate, in which
an area of the first pad electrode is larger than an area of the plurality of input/output pad electrodes.

(5) The imaging device according to any one of (1) to (4), further including:
a second pad electrode formed at a position adjacent to the first pad electrode on the first semiconductor substrate, and electrically insulated from a circuit formed on the first semiconductor substrate and electrically connected to the first pad electrode.

(6) The imaging device according to any one of (1) to (5), further including:
the imaging unit formed on the first semiconductor substrate.

(7) The imaging device according to any one of (1) to (5), further including:
the imaging unit formed on a second semiconductor substrate, in which
the second semiconductor substrate is overlaid on the first semiconductor substrate.

(8) An imaging device including:
an imaging unit;
a processing unit capable of performing predetermined image processing on the basis of image data obtained by the imaging unit;
a temperature sensor capable of generating a detection signal according to a temperature; and
a calculation unit capable of generating a temperature code by respectively performing different types of arithmetic processing from one another in a plurality of divided temperature ranges in each of which the temperature sensor is operable, on the basis of the detection signal.

(9) The imaging device according to (8), in which
the plurality of temperature ranges includes a first temperature range and a second temperature range, and
the arithmetic processing
is capable of generating the temperature code, using a first function, on the basis of the detection signal in the first temperature range, and
is capable of generating the temperature code, using a second function, on the basis of the detection signal in the second temperature range.

(10) The imaging device according to (9), in which
the first function and the second function are linear functions.

(11) The imaging device according to any one of (8) to (10), further including:
a storage unit configured to store information about a temperature of the imaging device, the temperature having been detected by an inspection device of the imaging device, in which
the calculation unit is capable of further performing correction processing of correcting the temperature code, using the information stored in the storage unit.

(12) The imaging device according to (11), further including:
a conversion unit capable of generating a first digital code by performing AD conversion on the basis of the detection signal, in which
the calculation unit is capable of generating the temperature code on the basis of the first digital code.

(13) The imaging device according to (12), in which
the conversion unit includes a plurality of conversion circuits capable of generating a plurality of the first digital codes by performing AD conversion on the basis of the detection signal, and
the calculation unit is capable of generating the temperature code on the basis of the plurality of first digital codes.

(14) The imaging device according to (13), in which
the calculation unit is capable of obtaining a plurality of first temperature codes by performing the arithmetic processing on the basis of the plurality of first digital codes, obtaining a plurality of second temperature codes by performing the correction processing on the basis of the plurality of first temperature codes, and generating the temperature code on the basis of an average value of values indicated by the plurality of second temperature codes.

(15) The imaging device according to (14), in which
the calculation unit is capable of selecting one of the plurality of second temperature codes on the basis of the plurality of second temperature codes, correcting the selected second temperature code, using a second temperature code generated by a conversion circuit adjacent to a conversion circuit that has generated the selected second temperature code, of the plurality of conversion circuits, and generating the temperature code on the basis of an average value of values indicated by the plurality of second temperature codes including the corrected second temperature code.

(16) The imaging device according to (14), in which
the calculation unit is capable of selecting one of the plurality of second temperature codes on the basis of the plurality of second temperature codes, and generating the temperature code on the basis of an average value of values indicated by the plurality of second temperature codes other than the selected second temperature code, of the plurality of second temperature codes.

(17) The imaging device according to any one of (13) to (16), in which
the imaging unit includes a plurality of imaging pixels,
the plurality of conversion circuits is capable of respectively generating a plurality of second digital codes by performing AD conversion on the basis of a plurality of pixel signals supplied from the plurality of imaging pixels, and
the processing unit is capable of performing the predetermined image processing on the basis of the plurality of second digital codes.

(18) A calibration method including:
by an inspection device, bringing a thermocouple into contact with a first pad electrode to measure a temperature, the first pad electrode being formed on a first semiconductor substrate on which a processing unit capable of performing predetermined image processing on the basis of image data obtained by an imaging unit is formed, and electrically insulated from a circuit formed on the first semiconductor substrate;
by the inspection device, causing a storage unit formed on the first semiconductor substrate to store information about the measured temperature;
by a temperature sensor formed on the first semiconductor substrate, generating a detection signal according to a temperature;
by a calculation unit formed on the first semiconductor substrate, generating a temperature code by respectively performing different types of arithmetic processing from one another in a plurality of divided temperature ranges in each of which the temperature sensor is operable, on the basis of the detection signal;
by the calculation unit, performing correction processing of correcting the temperature code, using the information stored in the storage unit; and
by the inspection device, acquiring the corrected temperature code.

(A1)
An imaging device comprising:
a processing unit formed on a first semiconductor substrate and configured to perform predetermined image processing on the basis of image data obtained by an imaging unit;
a first temperature sensor formed on the first semiconductor substrate and capable of generating a detection signal according to a temperature; and
a first pad electrode formed on the first semiconductor substrate and electrically insulated from a circuit formed on the first semiconductor substrate, the circuit being utilized for generating the image data.

(A2)
The imaging device according to claim A1, wherein the first pad electrode is configured to contact a probe needle to detect a temperature by a second temperature sensor.

(A3)
The imaging device according to claim A1, wherein
the first temperature sensor is formed in a region in which the processing unit is formed, the region being of the first semiconductor substrate.

(A4)
The imaging device according to claim A1, further comprising:
a conversion unit formed on the first semiconductor substrate, wherein
the imaging unit has an imaging pixel,
the conversion unit is capable of generating the image data by performing analog-to-digital conversion on the basis of a pixel signal supplied from the imaging pixel, and a distance between the first pad electrode and the first temperature sensor is shorter than a distance between the first pad electrode and the conversion unit.

(A5)
The imaging device according to claim A1, further comprising:
a plurality of input/output pad electrodes in a peripheral region of the first semiconductor substrate, wherein
an area of the first pad electrode is larger than an area of each of the plurality of input/output pad electrodes.

(A6)
The imaging device according to claim A1, further comprising:
a second pad electrode formed at a position adjacent to the first pad electrode on the first semiconductor substrate, electrically insulated from the circuit formed on the first semiconductor substrate and electrically connected to the first pad electrode.

(A7)
The imaging device according to claim A1, wherein the imaging unit is formed on the first semiconductor substrate.

(A8)
The imaging device according to claim A1,
wherein the imaging unit is formed on a second semiconductor substrate which is overlaid on the first semiconductor substrate.

(A9)
The imaging device according to claim A1, further comprising:
a calculation unit capable of generating a temperature code on the basis of the detection signal generated by the first temperature sensor.

(A10)
The imaging device according to claim A9, wherein
the calculation unit
is capable of generating the temperature code, using a first function on the basis of the detection signal in a first temperature range, and
is capable of generating the temperature code, using a second function on the basis of the detection signal in a second temperature range.

(A11)
The imaging device according to claim A10, wherein the first function and the second function are linear functions.

(A12)

The imaging device according to claim A9, wherein the first pad electrode is configured to contact a probe needle to detect a temperature by a second temperature sensor.

(A13)

The imaging device according to claim A12, further comprising:

a storage unit configured to store information about a temperature detected by the second temperature sensor, wherein the calculation unit is capable of performing correction processing of correcting the temperature code, using the information stored in the storage unit.

(A14)

The imaging device according to claim A13, further comprising:

a conversion unit capable of generating a first digital code by performing analog-to-digital conversion on the basis of the detection signal, wherein the calculation unit is capable of generating the temperature code on the basis of the first digital code.

(A15)

The imaging device according to claim A14, wherein the conversion unit includes a plurality of conversion circuits capable of generating a plurality of the first digital codes by performing AD conversion on the basis of the detection signal, and the calculation unit is capable of generating the temperature code on the basis of the plurality of first digital codes.

(A16)

The imaging device according to claim A15, wherein the calculation unit is capable of obtaining a plurality of first temperature codes on the basis of the plurality of first digital codes, obtaining a plurality of second temperature codes by performing the correction processing on the basis of the plurality of first temperature codes, and generating the temperature code on the basis of an average value of the plurality of second temperature codes.

(A17)

The imaging device according to claim A16, wherein the calculation unit is capable of selecting one of the plurality of second temperature codes on the basis of the plurality of second temperature codes, correcting the selected second temperature code, using a second temperature code generated by a conversion circuit adjacent to a conversion circuit that has generated the selected second temperature code, of the plurality of conversion circuits, and generating the temperature code on the basis of an average value of the plurality of second temperature codes including the corrected second temperature code.

(A18)

The imaging device according to claim A16, wherein the calculation unit is capable of selecting one of the plurality of second temperature codes on the basis of the plurality of second temperature codes, and generating the temperature code on the basis of an average value of the plurality of second temperature codes other than the selected second temperature code, of the plurality of second temperature codes.

(A19)

The imaging device according to claim A15, wherein the imaging unit includes a plurality of imaging pixels, the plurality of conversion circuits is capable of respectively generating a plurality of second digital codes by performing AD conversion on the basis of a plurality of pixel signals supplied from the plurality of imaging pixels, and the processing unit is capable of performing the predetermined image processing on the basis of the plurality of second digital codes.

(A20)

A calibration method comprising:

by an inspection device, bringing a thermocouple into contact with a first pad electrode to measure a temperature, the first pad electrode being formed on a first semiconductor substrate on which a processing unit capable of performing predetermined image processing on the basis of image data obtained by an imaging unit is formed, and electrically insulated from a circuit formed on the first semiconductor substrate; by the inspection device, causing a storage unit formed on the first semiconductor substrate to store information about the measured temperature;

by a temperature sensor formed on the first semiconductor substrate, generating a detection signal according to a temperature;

by a calculation unit formed on the first semiconductor substrate, generating a temperature code by respectively performing different types of arithmetic processing from one another in a plurality of divided temperature ranges in each of which the temperature sensor is operable, on the basis of the detection signal;

by the calculation unit, performing correction processing of correcting the temperature code, using the information stored in the storage unit.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 1A, 1B, 1C, 1D, 1E, 2 Imaging device
8 Storage unit
9, 9A, 9D, 59 Pixel array
10, 10D, 50 Scanning unit
11 Address decoder
12, 12D, 52 Logic unit
13, 13D, 53 Driver unit
20, 20A, 20D1, 20D2 Reading unit
21, 22 Capacitive element
23 Current source
24 Comparator
25 Counter
26 Latch
28, 29 Transistor
30, 30A, 30B, 30D, 60 Imaging control unit
31, 61 Reference signal generation unit
32 Temperature sensor
40, 40B, 40D, 70 Signal processing unit
41, 71 Image processing unit
42, 42B Temperature calculation unit
100 Inspection system
101 Wafer
110 Inspection device
111 Probe
111A, 111B Probe needle
112 Inspection unit
113 Heater
200 Semiconductor substrate
201 Peripheral circuit unit
202 to 204 Terminal unit 301, 302 Semiconductor substrate
303 Via
311 Peripheral circuit unit
312 to 314 Terminal unit
401, 402 Semiconductor substrate
403 Connection portion
ADC, ADC2 AD conversion unit
AMP, FCG, FDG, RST, SEL, TG, TGL, TGS Transistor
AR Area
BJT1, BJT2 Bipolar transistor
BUS Bus line
CC Control signal
CLK Clock signal
CODE, CODE1 to CODE8, CODEA, CODEB Digital code
DATA0, DATA, DATAD1, DATAD2 Image signal
D1 Accumulation start drive
D2 Read drive
ER Error flag signal
FC Capacitive element
FCGL, FDGL, RSTL, SELL, SIGTL, TGLL, TGSL Control line
FD Floating diffusion
MP1 to MP3, MN1, MN2 Transistor
PAD, PAD2, PAD3 Pad electrode
PCAL Calibration parameter
PD, PD1, PD2 Photodiode
P1, P111 Imaging pixel
P2 Dummy pixel
REF Reference signal
RG1 Imaging pixel region
RG2, RG3 Dummy pixel region
R1 to R3 Resistive element
SFCG, SFDG, SIG, SIGT, SRST, SSEL, SSELT, STG, STGL, STGS Signal
SSW Control signal
SW Switch unit
SWT Switch
TC, TC1 Temperature code
Trange1, Trange2 Temperature range
T1 to T8, TA, TB Conversion period
T10 Accumulation period
T20 Blanking period
VAL1 to VAL4 Pixel value
VALT Digital value
VDD Power supply voltage
VP1 to VP8, VP11, VP12 Pixel voltage
Vtemp Voltage
XHS Horizontal synchronization signal

The invention claimed is:

1. An imaging device comprising:
    a processing unit formed on a first semiconductor substrate and configured to perform predetermined image processing on the basis of image data obtained by an imaging unit;
    a first temperature sensor formed on the first semiconductor substrate and capable of generating a detection signal according to a first temperature;
    a first pad electrode formed on the first semiconductor substrate, wherein the first pad electrode is configured to contact a probe needle to detect a second temperature by a second temperature sensor;
    a storage unit configured to store information about the second temperature detected by the second temperature sensor; and
    a calculation unit capable of generating a temperature code by respectively performing different types of arithmetic processing from one another in a plurality of divided temperature ranges in each of which the first temperature sensor is operable, on the basis of the detection signal,
    wherein the calculation unit is capable of performing correction processing of correcting the temperature code, using the information stored in the storage unit.

2. The imaging device according to claim 1, wherein the first temperature sensor is formed in a region in which the processing unit is formed, the region being of the first semiconductor substrate.

3. The imaging device according to claim 1, further comprising:
    a conversion unit formed on the first semiconductor substrate, wherein the imaging unit has an imaging pixel,
    the conversion unit is capable of generating the image data by performing analog-to-digital conversion on the basis of a pixel signal supplied from the imaging pixel, and
    a distance between the first pad electrode and the first temperature sensor is shorter than a distance between the first pad electrode and the conversion unit.

4. The imaging device according to claim 1, further comprising:
    a plurality of input/output pad electrodes in a peripheral region of the first semiconductor substrate, wherein an area of the first pad electrode is larger than an area of each of the plurality of input/output pad electrodes.

5. The imaging device according to claim 1, further comprising:
    a second pad electrode formed at a position adjacent to the first pad electrode on the first semiconductor substrate.

6. The imaging device according to claim 1, wherein the imaging unit is formed on the first semiconductor substrate.

7. The imaging device according to claim 1, wherein the imaging unit is formed on a second semiconductor substrate which is overlaid on the first semiconductor substrate.

8. The imaging device according to claim 1, wherein the calculation unit is capable of generating the temperature code, using a first function on the basis of the detection signal in a first temperature range, and is capable of generating the temperature code, using a second function on the basis of the detection signal in a second temperature range.

9. The imaging device according to claim 8, wherein the first function and the second function are linear functions.

10. The imaging device according to claim 1, further comprising:
    a conversion unit capable of generating a first digital code by performing analog-to-digital conversion on the basis of the detection signal, wherein the calculation unit is capable of generating the temperature code on the basis of the first digital code.

11. The imaging device according to claim 10, wherein the conversion unit includes a plurality of conversion circuits capable of generating a plurality of the first digital codes by performing AD conversion on the basis of the detection signal, and the calculation unit is capable of generating the temperature code on the basis of the plurality of first digital codes.

12. The imaging device according to claim 11, wherein the calculation unit is capable of obtaining a plurality of first temperature codes on the basis of the plurality of first digital codes, obtaining a plurality of second temperature codes by performing the correction processing on the basis of the plurality of first temperature codes, and generating the temperature code on the basis of an average value of the plurality of second temperature codes.

13. The imaging device according to claim 12, wherein the calculation unit is capable of selecting one of the plurality of second temperature codes on the basis of the plurality of second temperature codes, correcting the selected second temperature code, using a second temperature code generated by a conversion circuit adjacent to a conversion circuit that has generated the selected second temperature code, of the plurality of conversion circuits, and generating the temperature code on the basis of an average value of the plurality of second temperature codes including the corrected second temperature code.

14. The imaging device according to claim 12, wherein the calculation unit is capable of selecting one of the plurality of second temperature codes on the basis of the plurality of second temperature codes, and generating the temperature code on the basis of an average value of the plurality of second temperature codes other than the selected second temperature code, of the plurality of second temperature codes.

15. The imaging device according to claim 11, wherein the imaging unit includes a plurality of imaging pixels, the plurality of conversion circuits is capable of respectively generating a plurality of second digital codes by performing AD conversion on the basis of a plurality of pixel signals supplied from the plurality of imaging pixels, and the processing unit is capable of performing the predetermined image processing on the basis of the plurality of second digital codes.

16. A calibration method comprising:
by an inspection device, bringing a thermocouple into contact with a first pad electrode to measure a temperature, the first pad electrode being formed on a first semiconductor substrate on which a processing unit capable of performing predetermined image processing on the basis of image data obtained by an imaging unit is formed;
by the inspection device, causing a storage unit formed on the first semiconductor substrate to store information about the measured temperature;
by a temperature sensor formed on the first semiconductor substrate, generating a detection signal according to a temperature;
by a calculation unit formed on the first semiconductor substrate, generating a temperature code by respectively performing different types of arithmetic processing from one another in a plurality of divided temperature ranges in each of which the temperature sensor is operable, on the basis of the detection signal; and
by the calculation unit, performing correction processing of correcting the temperature code, using the information stored in the storage unit.

* * * * *